United States Patent [19]

Hibi et al.

[11] Patent Number: 5,343,312
[45] Date of Patent: Aug. 30, 1994

[54] COLOR IMAGE OUTPUTTING SYSTEM FOR AN IMAGE PROCESSING APPARATUS

[75] Inventors: Yoshiharu Hibi; Yoshihiro Terada, both of Kanagawa, Japan

[73] Assignee: Fuji Xerox Co., Ltd., Tokyo, Japan

[21] Appl. No.: 895,814

[22] Filed: Jun. 9, 1992

Related U.S. Application Data

[62] Division of Ser. No. 537,623, Jun. 13, 1990, Pat. No. 5,187,570.

[30] Foreign Application Priority Data

Jun. 14, 1989 [JP] Japan .................. 1-152778

[51] Int. Cl.⁵ .......................... H04N 1/00; G03F 3/08
[52] U.S. Cl. .......................... 358/520; 348/35
[58] Field of Search ............ 358/80, 75, 426, 456, 358/401, 11, 12, 133, 520, 523, 524, 529, 530; 348/35; 3/155, 153

[56] References Cited

U.S. PATENT DOCUMENTS

| | | | |
|---|---|---|---|
| 4,335,393 | 6/1982 | Pearson | 358/4 |
| 4,893,180 | 1/1990 | Shigaki et al. | 358/80 |
| 4,899,216 | 2/1990 | Tatsumi et al. | 358/80 |
| 4,984,071 | 1/1991 | Yonezawa | 358/80 |
| 5,016,097 | 5/1991 | Shimano | 358/79 |
| 5,057,937 | 10/1991 | Muramatsu et al. | 358/426 |
| 5,130,786 | 7/1992 | Murata et al. | 358/13 |
| 5,132,786 | 7/1992 | Ishiwata | 358/75 |

FOREIGN PATENT DOCUMENTS

| | | | |
|---|---|---|---|
| 0216353 | 10/1985 | Japan | 358/80 |
| 61-10362A | 1/1986 | Japan | H04N 1/40 |
| 63-42576A | 2/1988 | Japan | H04N 1/46 |
| 63-258796 | 10/1988 | Japan | . |
| 0120966 | 5/1989 | Japan | 358/80 |

*Primary Examiner*—Edward L. Coles, Sr.
*Assistant Examiner*—Jerome Grant, II
*Attorney, Agent, or Firm*—Finnegan, Henderson Farabow, Garrett & Dunner

[57] ABSTRACT

A mono color image outputting system for an image processing apparatus applies a color correction separated color signals in the input section converts them into recording signals of color material, before outputting a color image. In the mono color outputting system, a gradation property of value data in the input section is linearly compressed to correspond to a gradation property of value data in the output section.

3 Claims, 39 Drawing Sheets

← - - - → : SERIAL COMMUNICATION INTERFACE

←——→ : MODULE INTERFACE

FIG. 16(d)₁
FIG. 16(d)₂
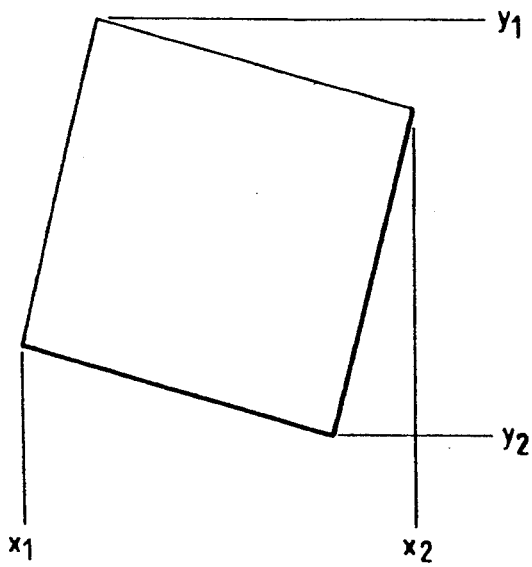
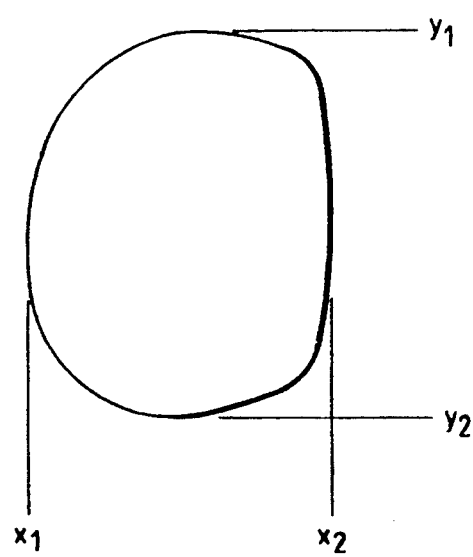
FIG. 16(e)₁
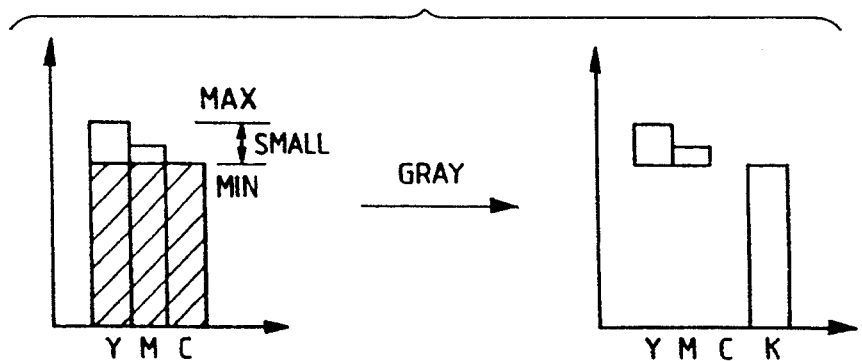
FIG. 16(e)₂
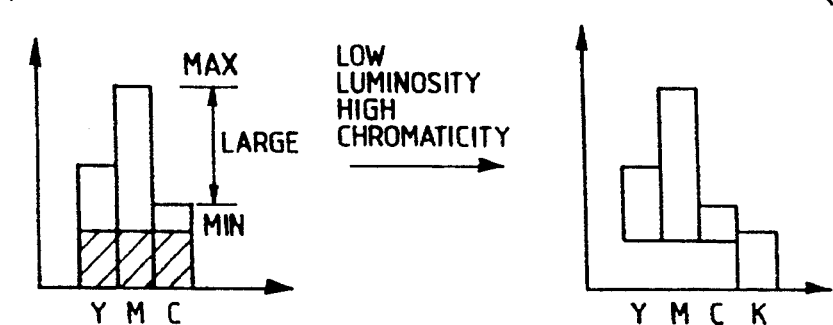

FIG. 16(j)₁
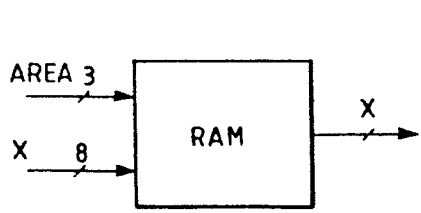
FIG. 16(j)₂
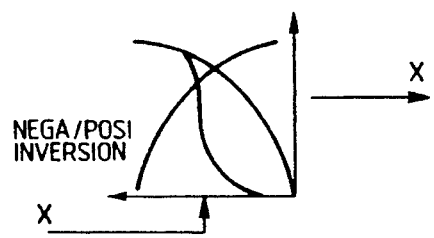
FIG. 16(k)
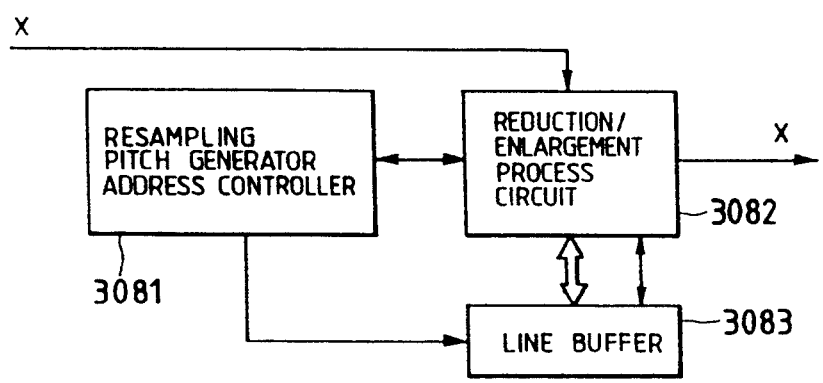
FIG. 16(l)
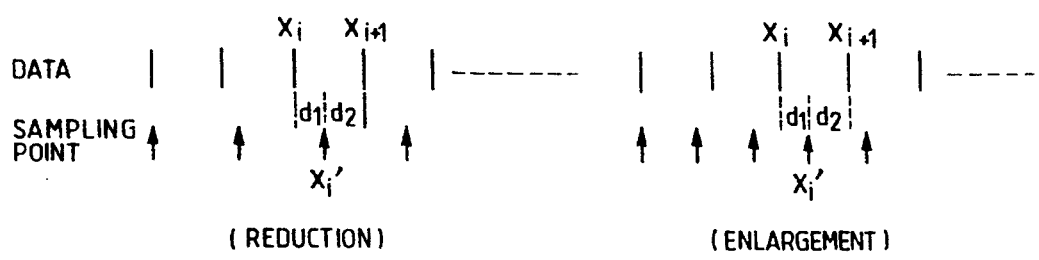

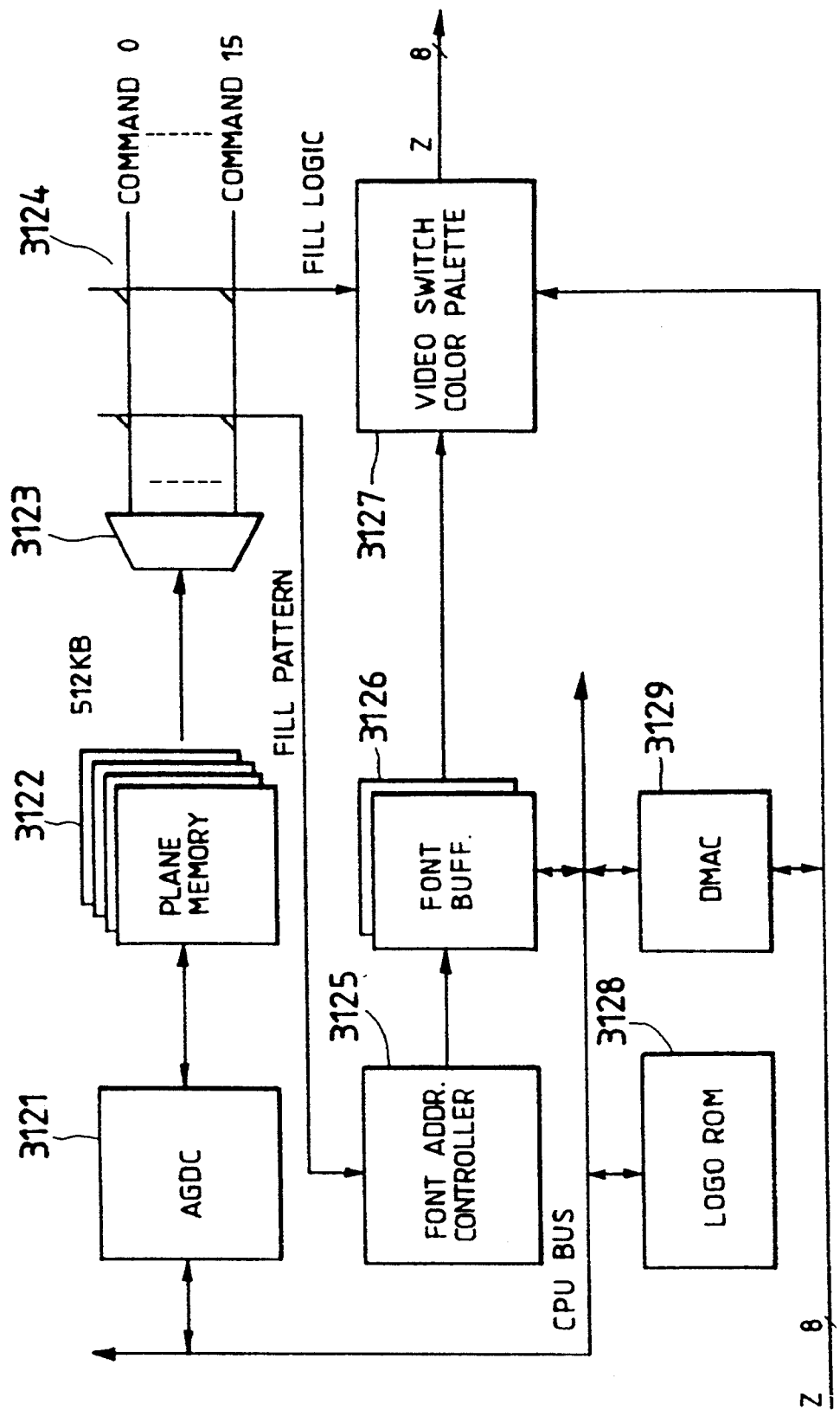

FIG. 16(n)₁
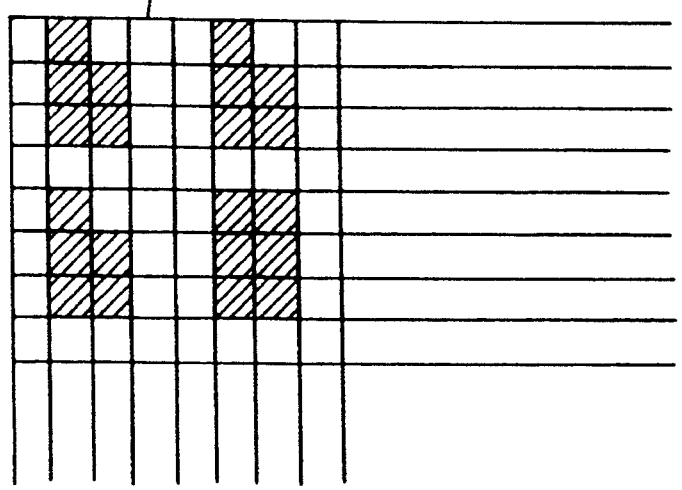
FIG. 16(n)₂
FIG. 16(o)₁
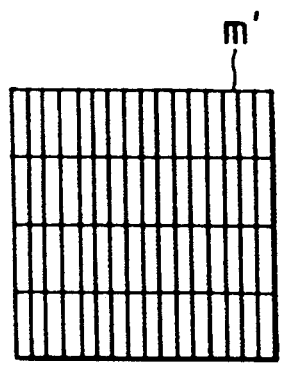
FIG. 16(o)₂
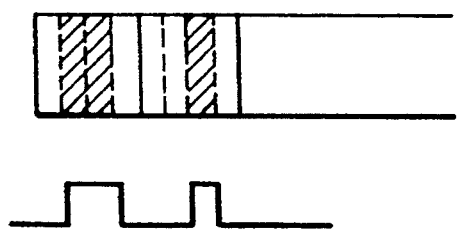

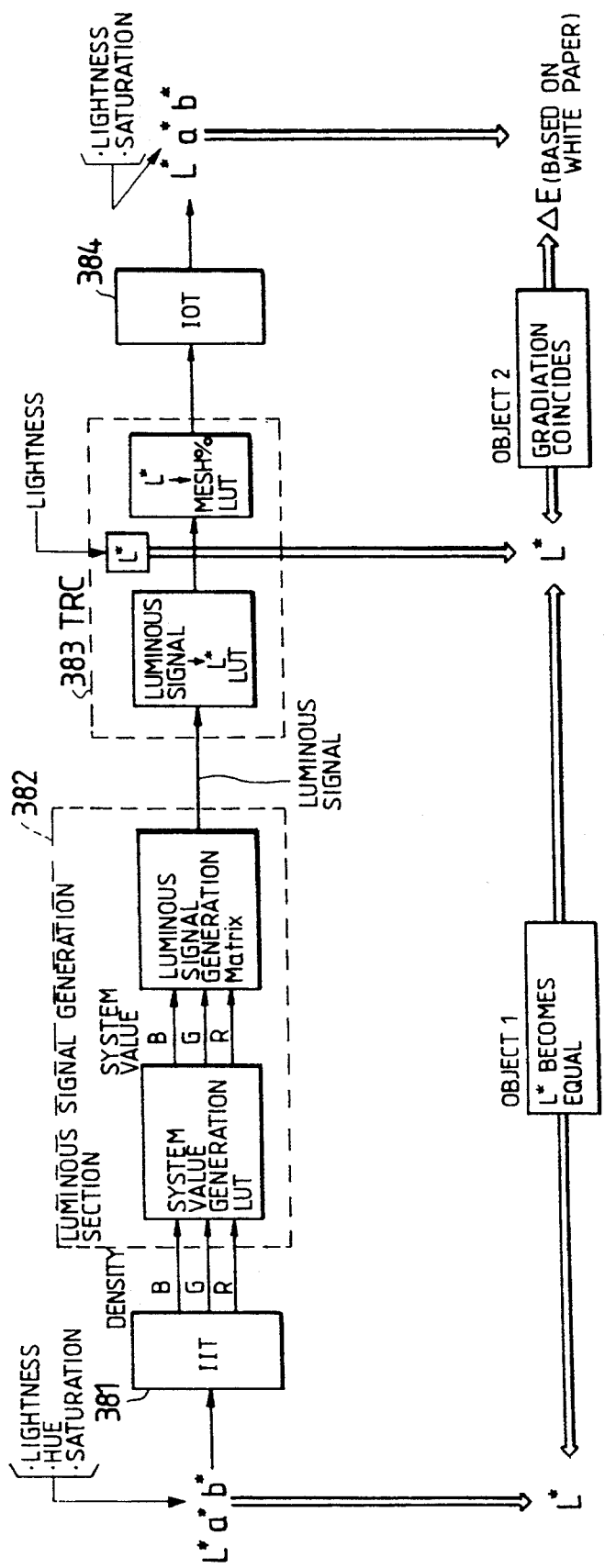
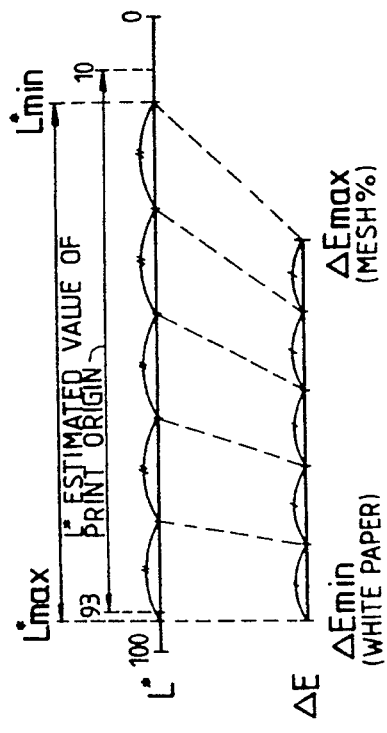
FIG. 18
FIG. 19

DENSITY-L*
CONVERSION LUT

L*-L* CONVERSION LUT

L*-MESH%
CONVERSION LUT

COMPOSED TRC

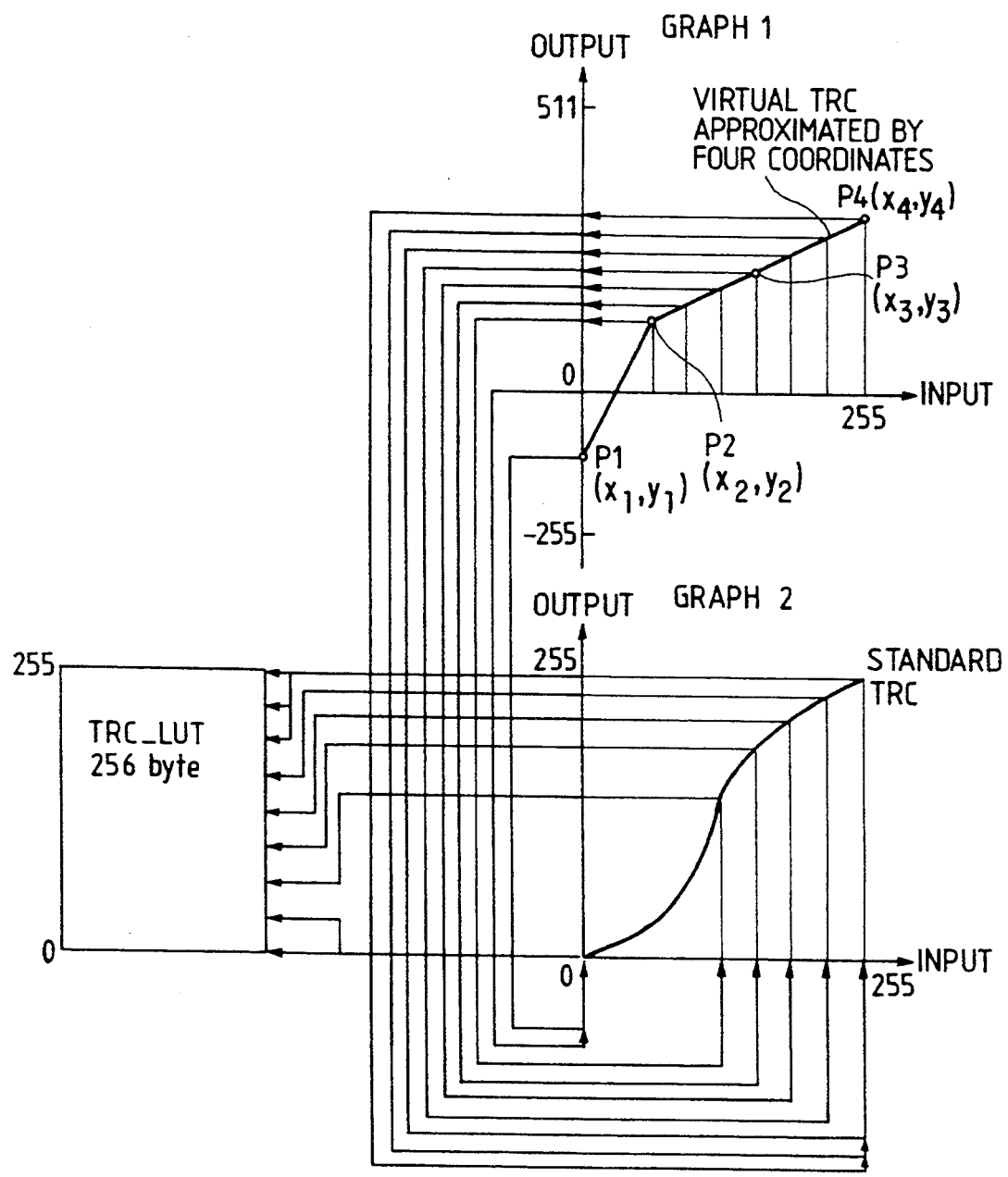

COLOR IMAGE OUTPUTTING SYSTEM FOR AN IMAGE PROCESSING APPARATUS

This is a division of application Ser. No. 07/537,623, filed Jun. 13, 1990 now U.S. Pat. No. 5,187,570.

BACKGROUND OF THE INVENTION

1. Field of the Invention

The present invention relates to an image processing apparatus, such as a color copying machine, color printer, and color facsimile, which applies color correction to separated color signals in the input section and converts them into recording signals used for applying a recording color material, and outputs a color image.

2. Background of the Invention

Referring to FIG. 33, there is shown an arrangement of a color balance/color correction circuit in an image processing apparatus, which is disclosed in Japanese Patent Application No. 63-273857, filed by the applicant of the present patent application.

In FIG. 33, an IIT (image input terminal) 700 contains a CCD line sensor with color filters, for example, and reads a color original in terms of separated color signals of B (blue), G (green), and R (red). An END converting circuit 701 corrects variations in the spectrum of an illumination light source, characteristics of a dichroic mirror, and color characteristics of photo-electric converting elements, color filters, lenses, and the like. The same further applies correction to the negative to positive conversion when a filter projector is used, and difference of film transmittances that are different for different film makers. After such corrections, the END converting circuit produces gray-balanced, separated color signals ENDB, ENDG, and ENDR. A color masking circuit 701 operates matrices involving the gray balance process, such as 3×3, 3×6, and 3×9 matrices, into which the gray balance method is applied in accordance with ratios of the gray-balanced, separated color signals ENDB, ENDG, and ENDR as output from the END converting circuit 701. In a full color mode, the color masking circuit generates gray-balanced, pixel (picture element) data of three color toner signals ENDY, ENDM, and ENDC. In a mono color mode, it generates a luminescent signal. A UCR (under color) circuit 703 generates a color signal of K depending on ratios of the toner signals ENDY, ENDM, and ENDC in a 4-color full color mode, and applies the subtraction to the toner signals ENDY, ENDM, and ENDC in accordance with a value of K. In the process of generating the K, a maximum/minimum detector 7031 detects maximum and minimum values of the toner signals ENDY, ENDM, and ENDC. A subtractor 7032 works out a difference between the maximum and minimum value of each toner signal. A value as converted in a chroma function 7033 in accordance with each difference, is subtracted from the minimum value in another subtractor 7034. In the under color process, a value as covered from the K in an UCR function 7034 is subtracted from the values of the toner signals ENDY, ENDM, and ENDC respectively in subtractors 7036Y, 7036M, 7036C. In 3-color full color mode and the mono color mode, the generation of K and the under color removal of ENDY, ENDM, and ENDC are not carried out. The UCR circuit 703 is by-passed. A TRC (tone reproduction control) determines values of output pixel data for the input pixel data on the basis of TRC curves. An IOT (image output terminal) 705 reproduces the color original in the form of a mesh point as described by tone adjusted tone signals.

As described above, a color image process apparatus is capable of generating a mono color image by generating a luminance signal on the basis of the separated color signals of B, G and R, and by using an image of single toner or superposed images of two different toners. So far as we know, there is no prior art clearly describing how to process the image data or what toner is used for forming an output image in the mono color mode.

When the parameters as used in the full color mode are directly applied to the TRC circuit, there occurs no problem in particular in reproducing an image, such as a graph. In a half tone image, such as photograph and printing, a shadow part (high density or dark part) in an original is defaced. Accordingly, the resultant image is not always good in quality. In other words, when the normal parameters are used, the gamma characteristic works excessively. The contrast is poor, and a gradation of the half tone image is unnatural. Then, an image reproduced lacks natural feeling.

Recently, computer graphics, for example, frequently employs a method wherein much visual information is presented in an area painted out by a half tone, and other visual information such as image and characters is additionally displayed in the painted out area. In this case, poor gradation properties of the half tone provide illegible presentation of the visual information in the half tone or painted out area. Consequently, advantages arising from the color display cannot fully be utilized.

SUMMARY OF THE INVENTION

Accordingly, an object of the present invention is to provide a mono color image in which a highlight portion and a shadow portion are both natural in visual feeling.

Another object of the present invention is to provide a mono color image with good gradation.

Yet another object of the present invention is to provide a mono color image whose gradation is uniform in proportion to the Munsel value.

Still another object of the present invention is to make it easy to set parameters in the mono color mode.

To achieve the above objects, there is provided an image processing apparatus which applies color correction to separated color signals in the input section and converts them into recording signals for applying a color recording material, and outputs a color image. Referring to FIG. 1, the image processing apparatus, according to an embodiment of the present invention, includes an image input terminal 1, luminance signal generating section 2, converting section 3, and image output terminal 4. In the image processing apparatus, a gradation property of value (lightness) information $L^*$ in the input section is linearly compressed to correspond to value information $L^*$ in the output section. In the output section, it is made to correspond to the gradation property of the color difference starting from a white paper state. The luminance signal generating section 2, makes a conversion to an equivalent neutral density on the basis of the separated color signals, thereby forming a luminance signal. In the converting section 3, the luminance signal is converted into a mesh % signal.

With such an arrangement, a value range in the input section matches that in the output section, providing a reproduced image of high quality.

The parameters used in a matrix for generating a luminance signal are formed by regressing the separated color signals after the equivalent neutral density conversion process, using the equally divided density luminance data as anticipated from predictive value information on an input original and the method of least squares. The converting section 3 is formed by composing a first table for converting from a luminance signal to a value signal and a second table for converting a value signal into a mesh % signal.

Further, a value converting table intervenes between the first and second tables, and saturates a high value part and a low value part. These points are a maximum value/minimum value of the value in the input section, and a maximum value/minimum value of the color difference in the output section.

This feature eliminates disadvantages that a reproduced mono color image is foggy in the high value portion and is defaced in the low value portion. Accordingly, the reproduced mono color image has good contrast.

Other objects, features and advantages of the present invention will become apparent from the following description read in connection with the accompanying drawings, in which:

BRIEF DESCRIPTION OF THE DRAWINGS

FIG. 18 shows a schematic illustration for explaining a mono color image output processing in the IPS;

FIG. 19 shows an explanatory diagram for explaining relationship between value information and color difference;

FIG. 26 is an explanatory diagram showing a basic algorithm for generating a TRC conversion table;

DETAILED DESCRIPTION OF THE PREFERRED EMBODIMENTS

The present invention will be described in more detail by reference to specific embodiments thereof in connection with the accompanying drawings.

In the following description, a color copying machine will be used as an example of the image processing apparatus. It should be understood, however, that the present invention is not limited to the color copying machine, but may be applied to other types of image recording apparatuses, such as printers and facsimiles.

The description of the preferred embodiments is divided into the following sections and subsections. Sections (I) and (II) describe an overall system of a color copying machine incorporating the present invention, and an outline of an IPS (image processing system) contained in a copying machine according to an embodiment of the present invention. Section (III) describes in detail the essential portions of the present invention which are realized in the color copying machine.

| | |
|---|---|
| (I) | SYSTEM DESCRIPTION |
| (I-1) | System Configuration |
| (I-2) | Functions and Features |
| (I-3) | Electrical Control System |
| (I-4) | Image Input Terminal (IIT) |
| (I-5) | Image Output Terminal (IOT) |
| (I-6) | user Interface (U/I) |
| (I-7) | Film Image Reader |
| (II) | IMAGE PROCESSING SYSTEM (IPS) |
| (II-1) | IPS Modules |
| (II-2) | IPS Hardware |
| (III) | MONO COLOR IMAGE OUTPUTTING SYSTEM |
| (III-1) | Outline |
| (III-2) | IPS Processing |
| (III-3) | TRC |
| (III-4) | Monocolor Output by a Designated Color |
| (III-5) | Circuit Arrangement |

SYSTEM DESCRIPTION

(I-1) System Configuration

Figure 2:
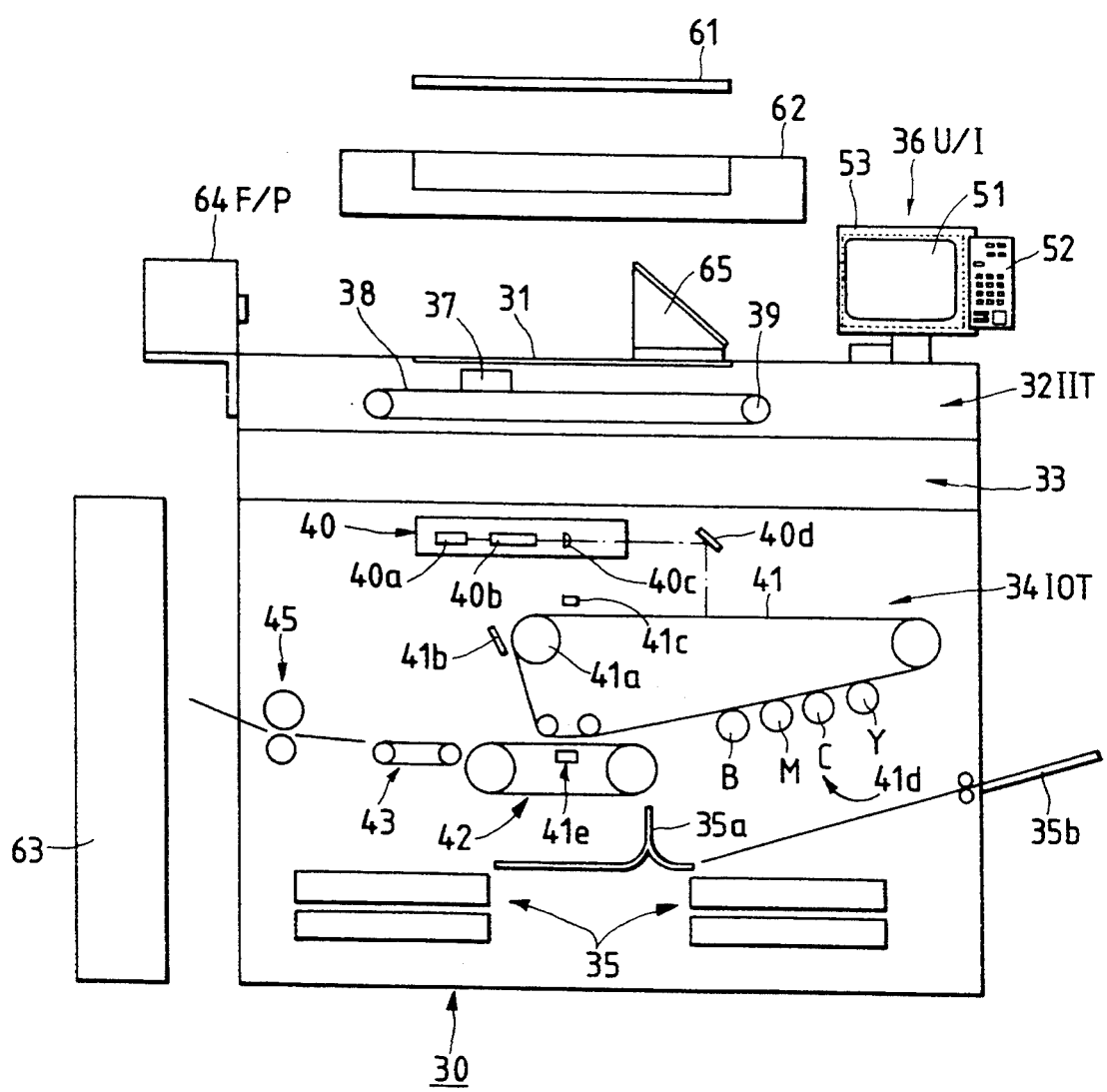
FIG. 2 is a longitudinal sectional view showing an overall structure of a color copying machine incorporating the present invention.

FIG. 2 shows a configuration of a color copying machine into which the present invention is incorporated.

In the color copying machine incorporating the present invention, a base machine 30 is made up of a platen glass 31, image input terminal (IIT) 32, electric control housing 33, image output terminal (IOT) 34, tray 35, and user interface (U/I) 36. The base machine 30 optionally includes an edit pad 61, auto document feeder (ADF) 62, sorter 63, and film projector (F/P) 64.

Electrical hardware is required for controlling the IIT, IOT, U/I, etc. The electrical hardware is divided into a plurality of circuit sections with different signal/data processing functions, such as IIT, IPS for processing the output image signals of the IIT, U/I, and F/P. These circuit sections are assembled into circuit boards, respectively. Together with an SYS board for controlling the above circuit boards, and an MCB (master control board) for controlling the IOT, ADF, sorter, etc., these circuit boards are housed in the electrical control housing 33.

A mirror unit (M/U) 65 may further be installed. In this instance, it is placed on the platen glass 31. In association with this, the F/P 64 is installed. A color image of a color film, for example, that is projected by the F/P 64, is read by the imaging unit 37 of the IIT 32. With the combination of the M/U 65 and F/P 64, the images of a color film can be copied directly from the color film. The object to be imaged may contain negative and positive films, and slides. Additionally, an auto focusing device and a correction-filter auto exchanging device are installed to the copying machine under discussion.

(I-2) Functions and Features

(A) High Quality Full Color

A high quality full color copier providing a clear and distinctive color image of a color document is attained. A copier according to an embodiment of the present invention has the following advantages: improvements of black image reproduction, light color reproduction, generation copy quality, OHP image quality, thin line reproduction, image quality reproduction of film copies, and a sustained copied image.

(B) Cost Reduction

The cost of image forming materials and expendables such as a photosensitive drum, developing unit and toner is reduced. The service cost including UMR and parts cost is also reduced. The color copying machine is operable as a mono color copying machine. The copying speed for mono color copies is 30 copies/min in A4 size and is increased about to three times that of the conventional copying machine in A4 size. In this respect, the running cost is reduced.

(C) Improved Reproducibility

Input/output devices such as an ADF and a sorter are optionally available, and hence a large number of documents can be copied. A magnification may be set in a broad range of 50% to 400%. The maximum size of a document that can be copied is A3. Three stages of paper trays are used, the upper tray accommodating B5 to B4 size, the medium tray accommodating B5 to B4, and the lower tray accommodating B5 to A3 and SS1B5 to A3. The copy speed for the full color (4-pass color) copy is 4 5CPM for A4, 4.8CPM for B4, and 2.4CPM for A3. The copy speed for the mono color copy is 19.2CPM for A4, 19.2CPM for B4, and 9.6CPM for A3. A warm-up time is within 8 minutes. FCOT is 28 seconds or less for the 4-color full color copy, and 7 seconds or less for the mono color copy. A continuous copy speed is 7.5 copies/A4 for the full color copy and 30 copies/A4 for the mono color copy.

(D) Improved Operability

Two types of operation buttons are used, hard buttons on the hard control panel and soft buttons on the soft panel of the CRT display screen. Use of these buttons provides an easy operation for beginners and simple operation for experts, and further enables operators to directly select desired functions. As for the layout of controls including these buttons, the controls are concentrated at one location for easy of operations. Effective use of colors correctly sends necessary information to operators. A high fidelity copy can be obtained by using the operations on the hard control panel and the basic display. The hard button is used for the operations out of an operation flow, such as start, stop, all clear, and interrupt. The operations on the soft panel of the basic display are used for paper size select, reduction/enlargement, copy density, picture quality adjustment, color mode, color balance adjustment, and the like. Such soft panel operations would smoothly be accepted by users accustomed to the mono color copying machine. To access the various edit functions, a pathway is opened by merely touching a pathway tab in a pathway area on the soft panel, and an operator may readily access the edit modes. Storage of copy modes and conditions for exercising them in a memory card realizes automation in relation to manual operations.

(E) Variety of Functions

The CRT display is used for the user interface. The CRT display displays functions and execution conditions (for example) in the form of a menu. Any user including beginners and professionals can make an easy access to the copying machine by the aid of the menu on the display. The copying machine has a variety of functions satisfying a variety of user's needs. The procedural steps ranging from the start to the end of a copying operation are almost entirely automated.

Manual operations on a hard control panel are used for other control items than those that can be defined by operation flows, such as start, stop, all clear, ten keys, interrupt, information, and language select. A variety of control functions can be used by touching soft buttons on a basic display. Further, any of various editing functions, such as a maker edit, business edit, and creative edit, can be selected by opening a pathway by touching a pathway tab corresponding to a pathway as a function select region. The area specified when the editing functions are used is displayed in the form of bit map area, providing a visual confirmation of the specified area. With such various editing functions and color creation, a smart expression by sentences is secured.

(F) Power Saving

A high performance color copying machine of the full color (4-pass color) realized by the present invention is operable at 1.5 kVA. A control system realizing the 1.5 kVA specification in the respective operation modes is decided. A power distribution to the circuit systems for different functions is also decided. An energy transmission system table for confirming energy transmission systems is prepared. The management and verification of power consumption are carried out by using the energy transmission system table.

(I-3) Electrical Control System

This section will handle hardware architecture, software architecture and state division in an electrical control system of the color copying machine according to the present invention.

Figure 3:
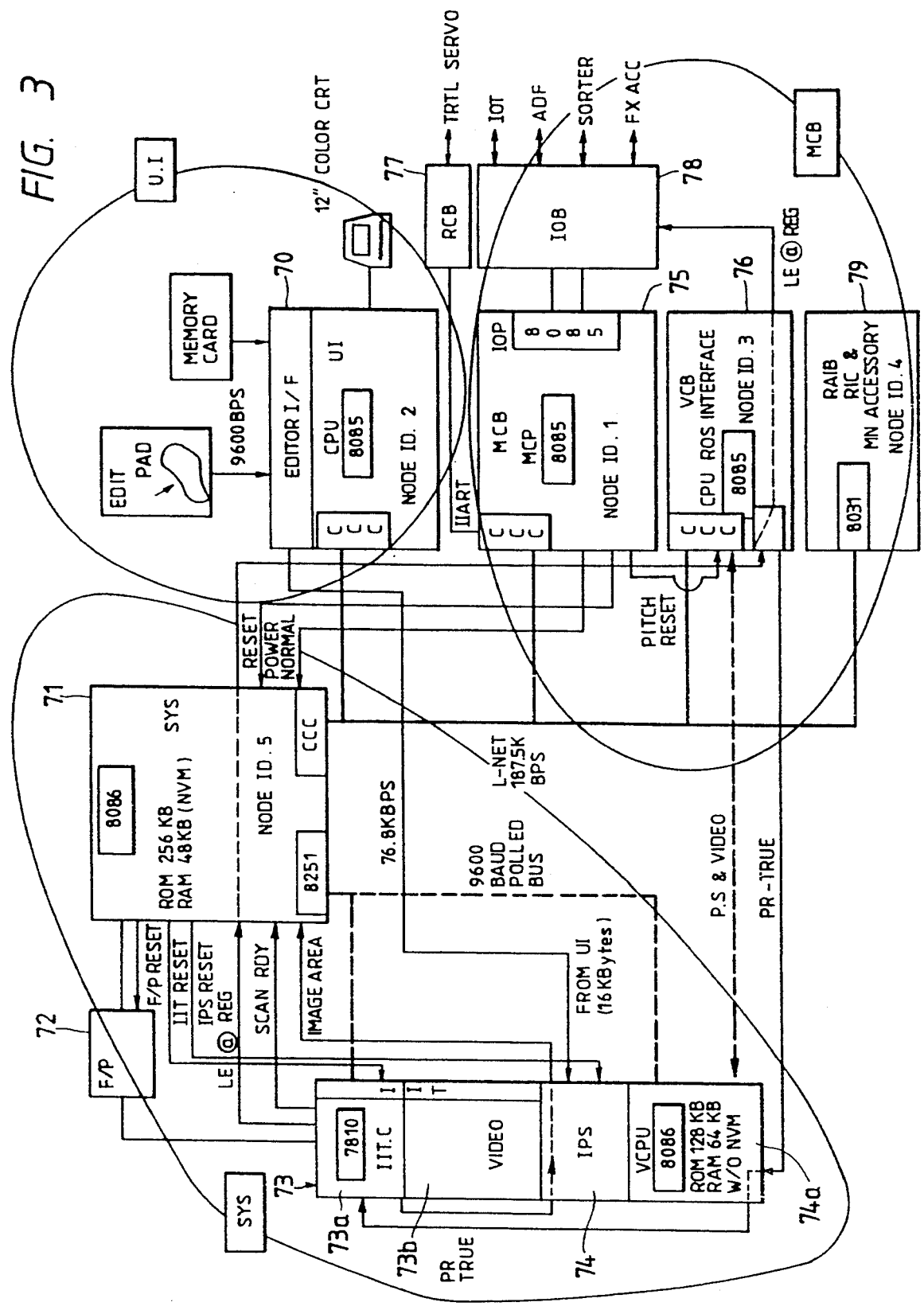
FIG. 3 shows a hardware architecture.
Figure 4:
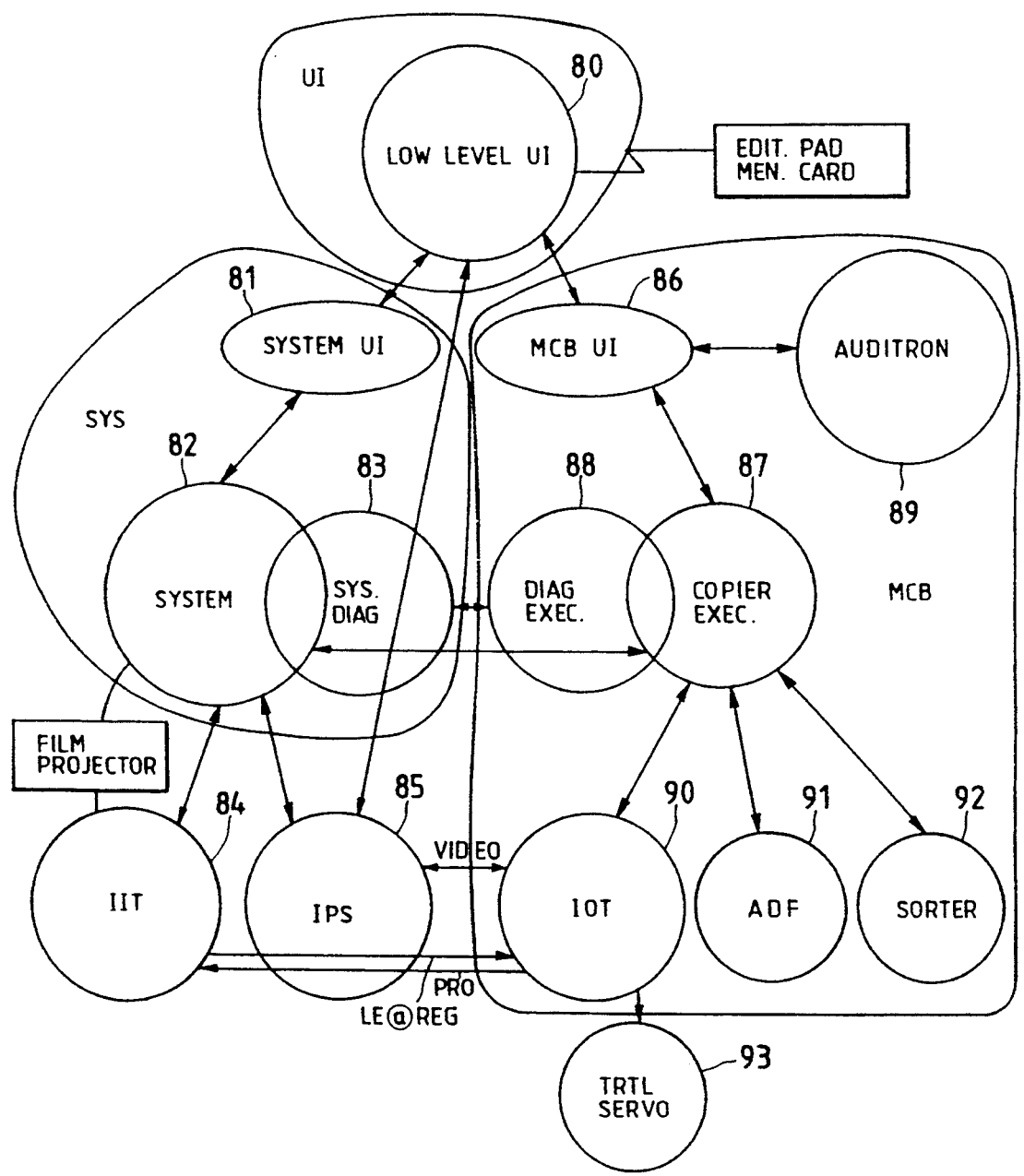
FIG. 4 shows a software architecture.

FIG. 3 shows the hardware architecture employed in the copying machine under discussion. FIG. 4 shows the software architecture.

When a color CRT is used as a U/I as in the present color copying machine, an amount of data for color display is increased than when a monochromatic display is used. Attempts to build a friendlier UI by improving display layout and-display transitions also bring about an increase in the amount of necessary data.

Use of a CPU with a large memory would be possible, if required, but it requires a large board. The large board creates additional problems. It is difficult to house it in the base machine. The large board makes it difficult to alter the design of the copying machine. Further, it increases the cost to manufacture.

To cope with the increase of data amount, in the present color copying machine, the data processing functions (CPUs) are decentralized in such a way that the techniques, such as the CRT control, that can be used in common with other models or machines, are treated in the form of remotes.

A hardware of the electrical system, as shown in FIG. 3, is categorized into three systems, a UI system, SYS system and MCB system. The UI system contains a UI remote 70 alone. In the SYS system, an F/P remote 72 for controlling the F/P, IIT remote 74 for reading an image of an original, and an IPS remote 74 for executing various image processings are operated in a decentralized manner under a synthetic control of an SYS (system) remote 71. The IIT remote 73 includes an IIT controller 73a for controlling the imaging unit, and a VIDEO circuit 73b for digitizing a read image signal and transferring the digitized image signal to the IPS remote 74. The IIT remote, and the IPS remote 74 as well are controlled by a VCPU 74a. The SYS (system) remote 71 is provided for synthetically controlling the respective remotes as mentioned above and to be given later. The SYS remote 71 requires a memory of a large memory capacity, because a program for controlling the display transitions of the UI, and others must be stored. 8086 containing a 16-bit microprocessor (made by Intel Company) is used for the SYS remote 71. If required, 6800 may be used.

The MCB system is composed of a VCB (video control board) remote 76, RCB remote 77, IOB remote 78, and an MCB (master control board) remote 75. The VCB remote 76, serving as a raster output scan (ROS) interface, receives from the IPS remote 74 a video signal to form a latent image on the photosensitive belt by a laser beam, and sends the video signal to the IOT. The RCB remote 77 controls a servo system of the transfer belt (turtle). The IOB remote 78 serves as an I/O port for the IOT, ADF, sorter, and accessories. The MCB (master control board) remote 75 synthetically controls those remotes.

Each remote in the drawing of FIG. 3 is mounted on a single board. In the figure, a bold continuous line indicates a high speed communication network LNET of 187.5 kbps; a bold broken line, a master/slave serial communication network of 9600 bps; and thin continuous lines, hot lines as transmission lines for control signals. A line 76 Skbps indicates a line exclusively used for transmitting graphic information as depicted on the edit pad, copy mode data entered from the memory card, and graphic data in the edit area from the UI remote 70 to the IPS remote 74. CCC (communication control chip) indicates an IC for supporting a protocol for the high speed communication line LNET.

As described above, the hardware architecture is composed of the UI system, SYS system, and MCB system. The processings shared by those systems will be described with reference to a software architecture of FIG. 4. Arrows indicate the directions of data transmission through the high speed communication network LNET of 187.5 kbps and the master/slave serial communication network of 9600 bps, and the directions of control signals flowing through the hot lines.

The UI remote unit 70 is made up of an LLUI (low level UI) module 80 and a module (not shown) for the processing of the edit pad and the memory card. The LLUI module 80, that is similar to a so-called CRT controller, is a software module for displaying an image on a color CRT display. Images to be displayed and how to display them are determined and controlled by an SYSUI module 81 and an MCBUIT module 86. As seen from the above, the UI remote unit can be used in common with other models and apparatuses. The reason for this is that lay out and change of the display screen are determined by the apparatus used, but the CRT controller is used in combination with the CRT.

The SYS remote unit 71 is made up of three modules, SYSUI module 81, SYSTEM module 82, and SYS.-DIAG module 83.

The SYSUI module 81 is a software module for controlling the display change or transition. The SYSTEM module 82 contains software for recognizing coordinates as selected on the software panel and a display presenting the selected coordinates, viz., an F/F (feature function) select software recognizing a job as selected, a Job check software to finally check as if there is a contradiction in the conditions for copy Job execution, and a software for controlling the transfer of various types of data, such as F/F select, job recovery, and machine states, with other modules.

The SYS.DIAG module 83 operates in a customer simulation mode in which the copying operation is done in a diagnostic state for self-test. In the customer simulation mode, the color copying machine under discussion operates as it operates in a normal copying operation mode. Accordingly, the DIAG module 83 is substantially the same as the SYS.DIAG module 82, but it is used in a special state, or the diagnostic state. For this reason, the DIAG module 83 and the SYSTEM module 82 are separated, but partially overlap in the drawing.

An IIT module 84 for controlling a stepping motor used in the imaging unit is contained in the IIT remote unit 73. An IPS module 85 for executing various processings is contained in the IPS remote unit 74. These modules are controlled by the SYSTEM module 82.

The MCB remote unit 75 contains software modules, such as an MCBUI module 86 as software for controlling display changes in the diagnostic mode, auditton mode, and fault state such as Jamming; an IOT module 90 for executing the processings necessary for the copying operation, such as photosensitive belt control, developing unit control, and fuser control; an ADF module 91 for controlling the ADF; a SORTER module 92 for controlling a sorter; a copier executive module 87 for managing the above software modules; a dia. executive module 88 for executing various diagnoses; and an auditron module 89 for charge calculation that is made by accessing an electronic counter with a password.

The RCB remote unit 77 contains a turtle servo module 93 for controlling an operation of the turtle. The module 93 is under control of the IOT module 90, in order to control the transfer process in the zerography cycle. In drawing, the copier executive module 87 and the dia. executive module 88 are depicted partially overlapping with each other. The reason for this is the same as that for the partial overlapping of the SYSTEM module 82 with the SYS.DIAG module 83.

Figure 5:
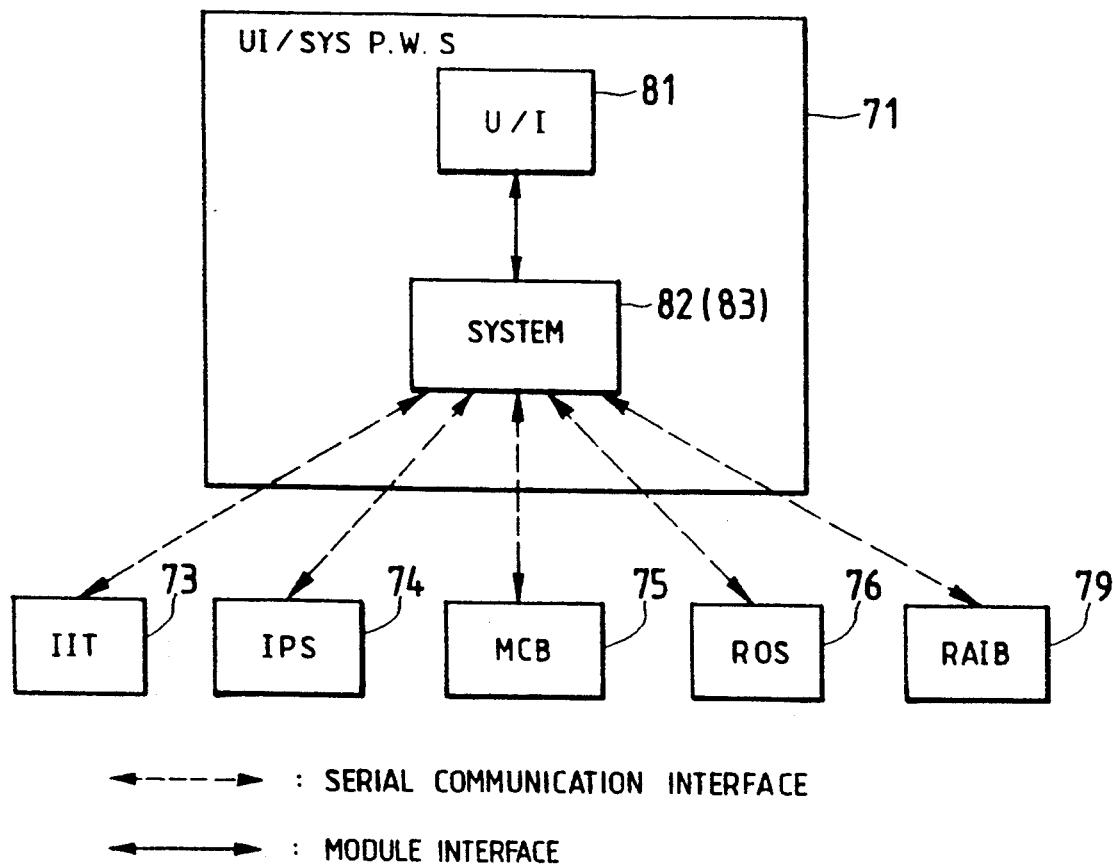
FIG. 5 is a diagram showing relationships of the system and remotes.

FIG. 5 shows relationships between the system remote unit and other remote units.

As described, the SYS remote unit 71 uses the SYSUI module 81 and the SYSTEM module 82. Data is transferred between these modules 81 and 82 through a module interface. A serial communication interface interposed between the SYSTEM module 82, and the IIT 73 and IPS 74. An LNET communication network couples the SYSTEM module 82 with the MC8 75, ROS 76 and RAIB 79.

A module configuration of the system will be described.

Figure 6:
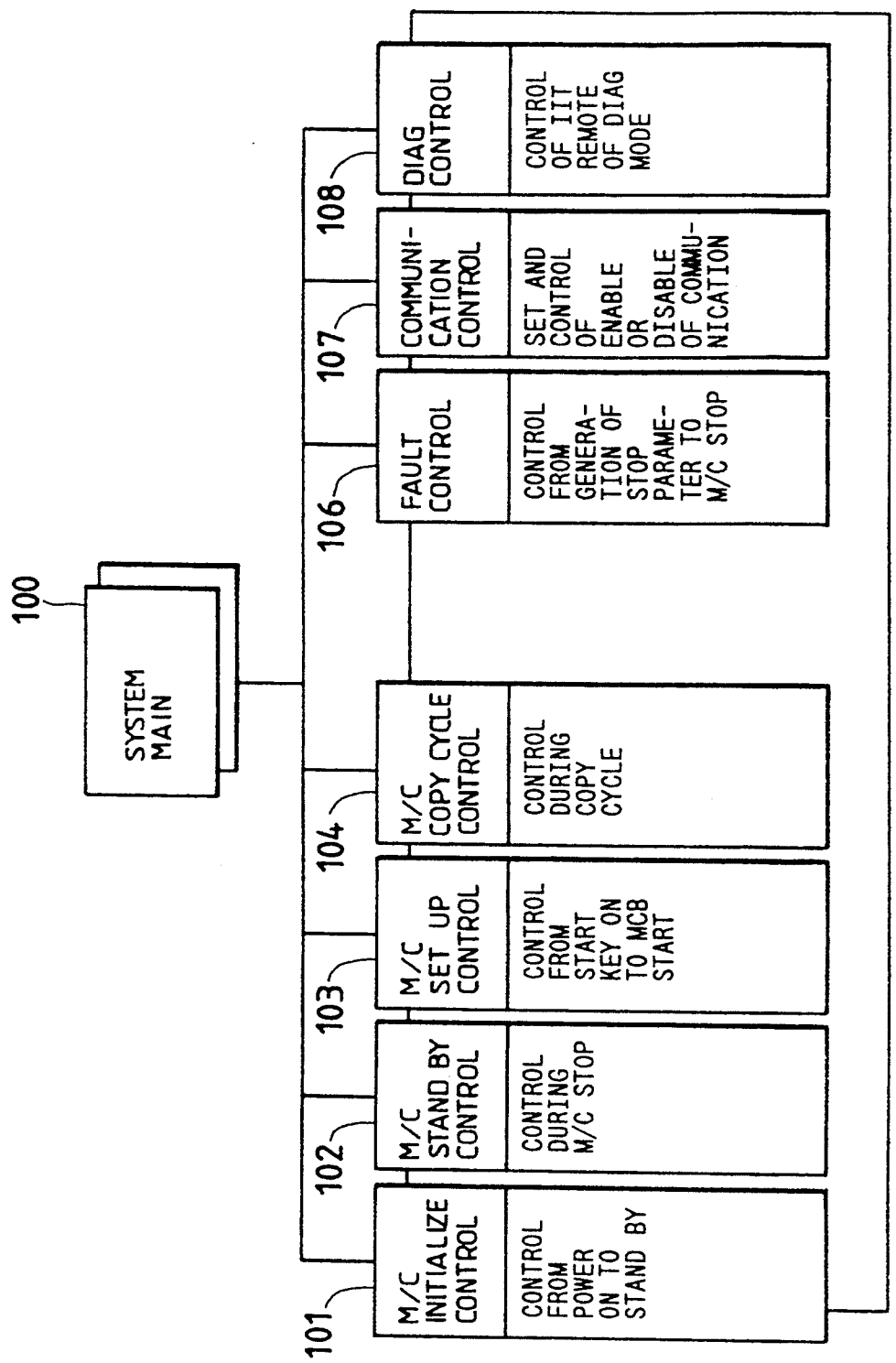
FIG. 6 is a diagram showing a module configuration of the system.

FIG. 6 shows a module configuration of the system.

In the color copying machine of the present invention, the modules such as IIT, IPS and IOT function like passive parts, and the modules in the system for controlling the above modules function like active parts with intellect. The copying machine employs the decentralized CPU system. The per original layer and the Job programming layer are shared by the system. The system has the control right to control the initialize state, standby state, setup state, and cycle state, and the UI master right for using the UI in the above states. Accordingly, the modules corresponding to them make up the system.

A system main 100 fetches the data received from the SYSUI, MCB, and the like into the internal buffer, clears the data in the internal buffer, calls the respective lower order modules in the system main 100 and transfers the Job to them, thereby to execute the updating processings.

An M/C initialize control module 101 controls an initialize sequence from the power-on to the setting up of the standby mode. This is driven following the Power-on state for executing various types of tests after the power-on by the MCB.

An M/C setup control module 103 controls a set-up sequence from the pushing of the start key till the MCB for executing the copy layer is driven. Specifically, it forms job modes using FEATURE (directions given to the M/C in order to satisfy the requests by a user) that is specified by the SY8UI, and determines a setup sequence in accordance with the job modes.

An M/C standby control module 102 controls a sequence during the M/C standby state, more exactly executes accept of the start key, control of color registration, and entry of the diag. mode.

An M/C copy cycle control module 104 controls a copy sequence from the start of the MCB to the stop. Specifically, it provides information of a paper feed count, recognizes the end of a job and requests the start of the IIT. Further, it recognizes the stop of the MCB and requests the stop of the IPS.

Additionally, the module 104 sends a through command that is generated during the M/C stop or the M/C operation, to a called remote.

A fault control module 106 monitors stop parameters from the IIT and IPS. When a stop parameter is generated, the module 106 requests the stop of the MCB. More specifically, the module 106 recognizes a fail command from the IIT or IPS, and stops it. After a stop request is generated by the MCB, the fault control module determines the recovery when the M/C is stopped, and makes the recovery in response to a jamming command from the MCB, for example.

A communication control module 107 sets the IIT ready signal from the IIT, and sets an enable or disable of the communication in the image area.

A diag. control module 108 executes the controls in the input check mode and the output check mode that are contained in the diag. mode.

(I-4) Imaging Unit

Figure 7A:
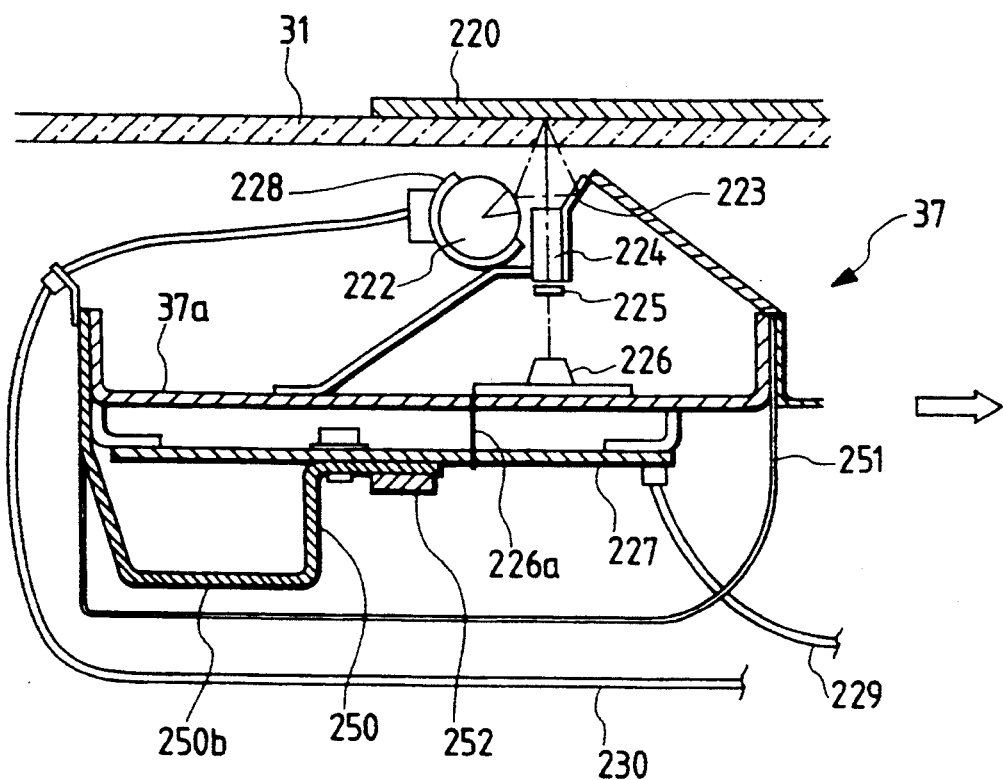
FIG. 7(a) shows a longitudinal sectional view of an imaging unit.

FIG. 7(a) shows a sectional view of the imaging unit 37. An original 220 is set on the platen glass 31, with its image surface facing down. The imaging unit 37 moves under the platen glass in the direction of arrow. Throughout the movement of the imaging unit, the image surface of the original placed on the platen glass is illuminated with the combination of the daylight fluorescent lamp 222 and a reflecting mirror 223. The light reflected from the original 220 passes through a selfoc lens 224 and a cyan filter 225 and forms a normal equal-size image on the light receiving surface of a CCD sensor array 226. The selfoc lens 224 is a compound eye lens consisting of four rows of fiber lens. This lens is bright and has a high resolution. This lens is advantageous in that a power consumption of the light source is reduced and the imaging unit compact is made compact. The imaging unit 37 is provided with a circuit board 227 containing a CCD line sensor drive circuit, CCD line sensor output buffer circuit, and the like. In the figure, reference numeral 228 designates a lamp heater; 229 a flexible cable for control signals; 230 a flexible cable for the illumination power source. A circuit board 227 is mounted to the underside of a housing 37a to which the CCD line sensor 226 is fixed. A radiating plate 250 with a loop 250b as viewed in cross section intervenes between the circuit board 227 and the housing 37a. An electromagnetic shielding punch metal 251 is mounted covering the radiating plate 250. The circuit board 227 contains a drive IC chip 252. The CCD line sensor 226 is electrically connected to the board 227 by means of a pin 226a.

Figure 7B:
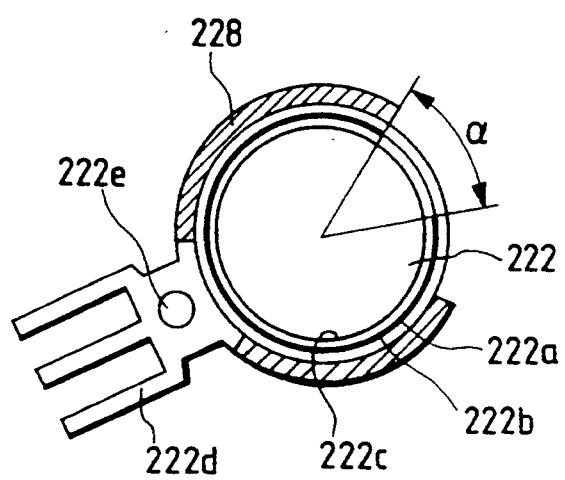
FIG. 7(b) shows a cross sectional view of a fluorescent lamp assembled into the imaging unit of FIG. 7(a)

FIG. 7(b) illustrates the details of the fluorescent lamp 222 of the reflecting type. A reflecting film 222b is formed over the inner surface of a glass tube 222a except the surface portion as defined by an aperture angle "α" (about 50°). A fluorescent film 222c further lies on the surface of the reflecting film. With this structure of the lamp, the light of the lamp 222 can be effectively projected to the original and the electric power is saved. Fluorescent film 222b is applied to the entire inner surface of the lamp and the reflecting film 222b is formed on the inner surface except the portion defined by the aperture angle in order to reduce light emitted compared to that of the fluorescent lamp (of the aperture type) in which the entire inner surface, except a portion defined by the aperture angle, is covered with a fluorescent film. However, the fluorescent film absorbs emission lines of mercury vapor, thereby reducing a ratio of an intensity of emission lines in a spectral distribution of illumination light to an amount of illumination light of the fluorescent lamp. A lamp heater 228, and a heat sink (radiating member) 222d are disposed on the outer surface of the lamp 222. A thermistor 222e provided gathers temperature data for controlling a lamp heater 228 and the cooling fan.

Figure 8:
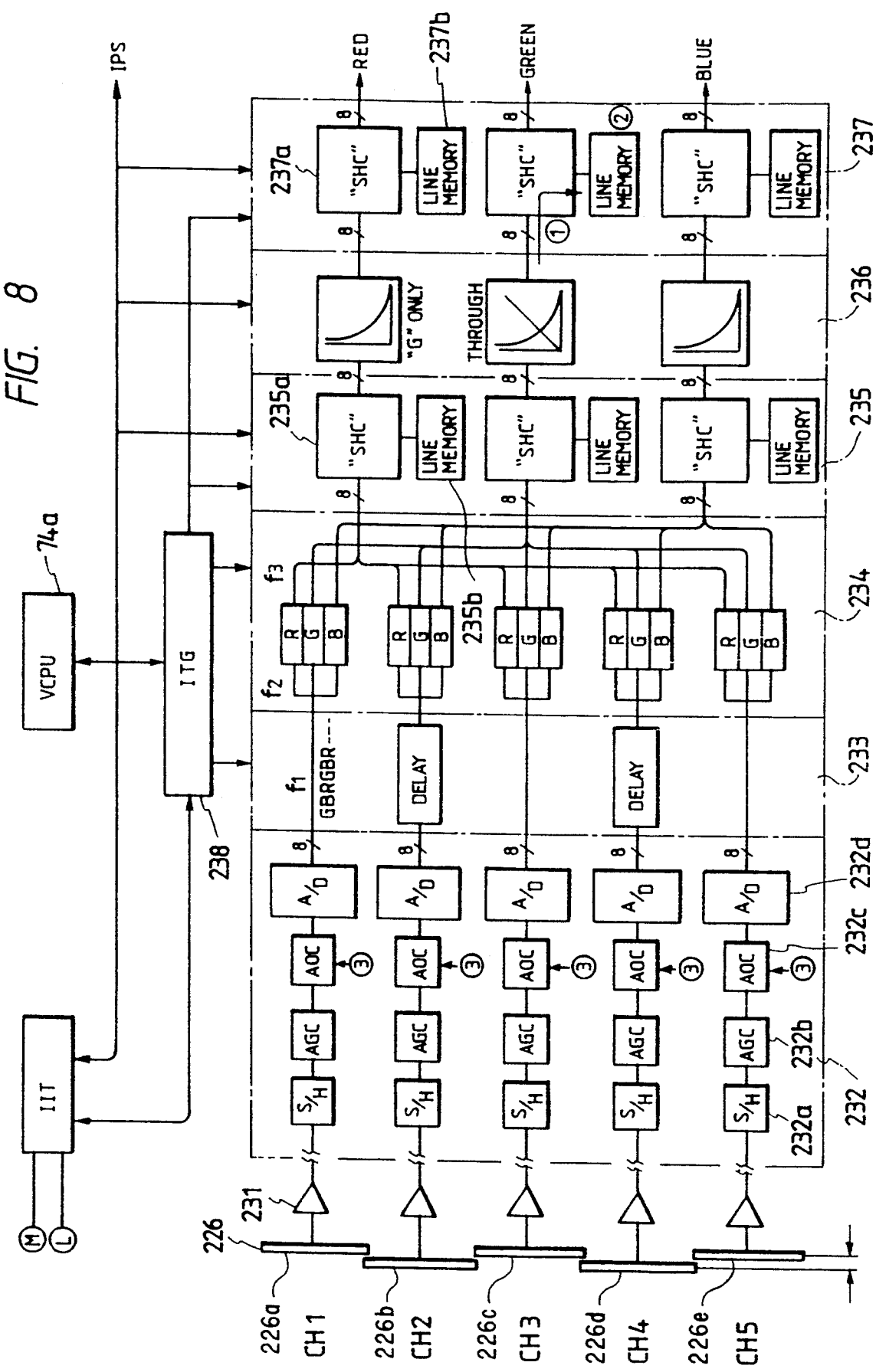
FIG. 8 shows a block diagram of a video signal processing circuit.

Description to be given below with reference to FIG. 8 is a detailed diagram of a video signal processing circuit in which a color original is read for each trio of colors R, G and B in terms of reflectivity signals by using the CCD line sensor array 226. In addition, reflectivity signals are converted into digital signals as density signals.

In FIG. 8, a read data control/converter 232 samples and holds analog video signals, applies gain and offset control to the signals, and converts then into digital signals. The control/converter 232 is made up of a sample/hold circuit 232a, automatic gain control circuit (AGC) 232b, automatic offset control (AOC) 232c, and A/D converter 232d. A white signal (read signal from a white reference board) of the CCD line sensor and a black signal (output signal in dark condition) slightly differ for different chips and different pixels in one chip. The AGC 232b sets a peak value of the white signal to a reference value, e.g., "200" in the scale of 256 gray levels. The AOC 232c sets a minimum value of the black signal to a reference value, e.g., "10" in the same scale.

An ITG (IIT timing generator) 238 is provided for controlling a delay setting circuit 233 for making the zigzag correction and a separation/composing circuit 234. Specifically, the ITG 238 controls delay amounts for zig-zag correction in accordance with the contents of a register within a VCPU 64a, adjusts outputting timings of the CCD line sensor elements of the five channels, and separates the video signal into color signals of colors B, G and R.

The delay setting circuit 233 is a so-called zig-zag correction circuit for correcting the displacement of the CCD line sensor elements of the sensor array 226 as viewed in the vertical scan direction as already described with reference to FIGS. 21 and 22. The circuit 233 is a line memory of the FIFO type. The memory stores the signals from the first line CCD sensor elements 226b and 226d that first scan an original. The memory outputs the signals in synchronism with the output from the second line CCD sensor elements 226a, 226c, and 226e, which succeed to the first line CCD line sensor elements. The memory, or the delay setting circuit 233 controls the number of delay lines in accordance with a delay in accordance with the designated magnification percentage.

The separation/composing circuit 234 separates a train of 8 bit data, BGRBGR . . . , of each channel into color data of R, G and B, and stores them into a line memory, and serially composes the data for each color R, G and B.

A conversion table 236 consists of two types of tables, a logaritbanic conversion table LUT "1" for converting the reflected signals into density signals, and a through conversion table LUT "0". Those tables are stored in a ROM, for example. The table 236 converts R, G and B is reflectance as read from an original into R, G and B density signals representative of the amounts of recording material (e.g., toner amounts).

Shading correcting units 235 and 237 are provided. The unit 235 includes a shading correcting circuit 235a and an SRAM 235b for each color signal. The unit 237 likewise includes a shading correcting circuit 237a and an SRAM 237b for each color signal. Correction of pixel displacement and shading, and inputting control of image data are executed in the shading correcting units. The pixel displacement correction is to make a weighted mean of the pixel data. In the signal processing circuit fetching R, G, and B data in parallel, the weighting mean processing is applied because the R, G and B filters are displaced. The shading correction is obtained by subtracting the image data, which is stored as reference data in an SRAM, from image input data after the pixel displacement correction. The result of the subtraction is then output. Thus, correction is made of nonuniformity of the light distribution characteristic among light sources and varied light distribution characteristic of a light source due to its age, variations in an optical system due to smear on the reflecting mirror, for example, and nonuniform sensitivity among the bits in the CCD line sensor. The shading correction circuit 235a, which precedes to the conversion table 236, is for correcting a dark level (output level when the fluorescent lamp is lit off). The shading correction circuit 237a, which succeeds to the conversion table 236, is for correcting a level of a signal read from a white reference plate.

(I-5) Image Output Terminal (IOT)

Figure 9:
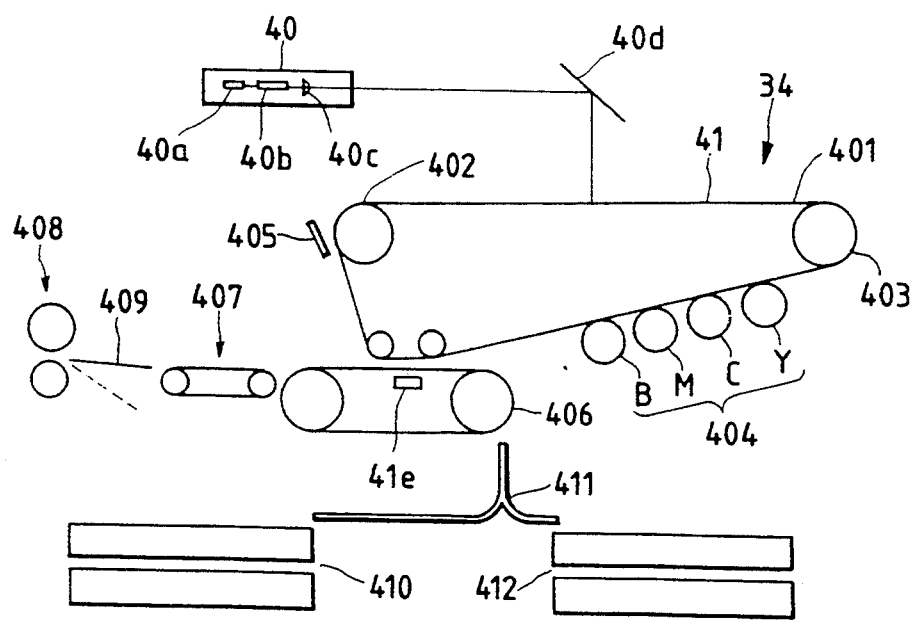
FIG. 9 is an explanatory diagram schematically showing the structure of the IOT.

An outline of the image output terminal (IOT) is shown in FIG. 9.

The IOT uses a photo receptor belt as a photo sensitive member. The IOT is provided with a developing unit 404 consisting of four developing devices of the full color, i.e., black (K), magenta (M), cyan (C) and yellow (Y), a tow roll transfer loop 406 for transferring paper to the transfer unit, a vacuum transfer 407 for transferring paper from the tow roll transfer loop 404 to a fuser 408, paper trays 410 and 412, and a paper transfer path 411. The three units of the photo receptor belt, developing unit 412, and paper transfer path 411 can be pulled out of the IOT to the front side.

The data light obtained by modulating a laser beam from a laser source 40 is guided through a mirror 40d onto the surface of the photo receptor belt 41, thereby forming a latent image thereon. The latent image formed on the surface of the tow roll transfer loop or turtle 41 is developed into a toner image by the developing unit 404. The developing unit 404 consists of four developing devices of K, M, C and Y which are disposed as shown. The layout of the developing devices is determined allowing for a relationship between a dark attenuation and the characteristics of the respective toners, difference in the results of mixing of the respective color toners with the black toner, and the like. In the case of the full color copy, these developing devices are driven in the order of Y→C→K.

Papers fed from the two-stage elevator tray 410 and another tray 412 are supplied through the transfer path 411 to the transfer tow roll transfer loop 406. The loop 406 is disposed in the location of the transfer unit, and is made up of a pair of rolls-rotatably coupled by a timing chain or a timing belt, and a gripper bar to be given later. The paper is gripped and transferred by using the gripper bar, and the toner image on the surface of the photo receptor belt is transferred onto the paper. In the case of the 4-color full color, the paper is turned four times by the tow roll transfer belt, during the four turns, the toner images of Y, C, M and K are transferred onto the paper in this order. After the image transfer, the paper is released from the gripper bar, and transferred to the vacuum transfer 407, and fed to the fuser 408. The toner image on the paper is fused by the fuser and delivered outside the base machine.

The vacuum transfer 407 absorbs the difference of the speeds of the transfer loop 406 and the fuser 408, thereby synchronizing them in operation. In this instance, the transfer speed (process speed is 190 mm/sec. In the case of the full color copy, a fusing speed is 90 mm/sec. Thus, the transfer speed is different from the fusing speed. To secure the fusing speed, the process speed is reduced. Since the 1.5 kVA power must be secured, the power cannot be distributed to the fuser.

To cope with this, in the small paper such as B5 and A4 papers, at the instant that the image transferred paper is released from the transfer loop 406 and rides on the vacuum transfer 407, the speed of the vacuum transfer 407 is decreased from 190 mm/sec to 90 mm/sec, thereby making it equal to the fusing speed. The instant copier is designed to be compact by making the distance between the transfer loop and the fuser as short as possible. The A3 paper is in excess of the distance of the transfer point and the fuser. If the speed of the vacuum transfer is decreased, there inevitably occurs a situation that the leading end of the paper reaches the fuser, but the trailing end portion of the paper is under image transfer process. In such a situation, the paper is braked and consequently a color displacement possibly occurs. To solve this problem, a baffle plate 409 is provided between the fuser and the vacuum transfer. When the A3 paper arrives, the baffle plate is turned down to curve the A3 paper along the plate, thereby apparently elongating the path between the fuser and the vacuum transfer. Accordingly, the vacuum transfer is operable at the same speed as the transfer speed of the turtle 406. With such an arrangement, after the image transfer is ended, the leading end of the paper reaches the fuser. In other words, the speed difference between the turtle and the fuser is absorbed and both are operable synchronously. The above approach for the A3 paper is correspondingly applied to the OHP, because it has a poor thermal conduction.

The instant copier is designed so that a black copy as well as the full color copy can be made with high efficiency. In the case of the black copy, the toner layer is thin and hence it can be fused with less heat. Accordingly, the fusing speed is 190 mm/sec, viz., without slowing the vacuum transfer. The same thing is applied to a single color copy, because the single color copy has a single toner layer. After the transfer process is completed, the toner remaining on the surface of the photo receptor belt is wiped off by a cleaner 405.

(I-6) User Interface (U/I)

To improve the operability of the user interface, the interface is provided with a monitor as a color display 51 of 12 inches and a hard control panel 52 placed by the monitor, as shown in FIG. 19. A creative color display provides menus legible to users. Further, an infrared ray touch board 53 is disposed on the fringe of the color display 51. Use of the touch board allows a user to directly access the machine by soft buttons which are displayed in the display screen of the display 51. Various types of operations are properly assigned to the hard buttons on the hard control panel 52 and the soft buttons in the screen of the display 51, thereby providing simple operations and effective use of menu displays.

Figure 10:
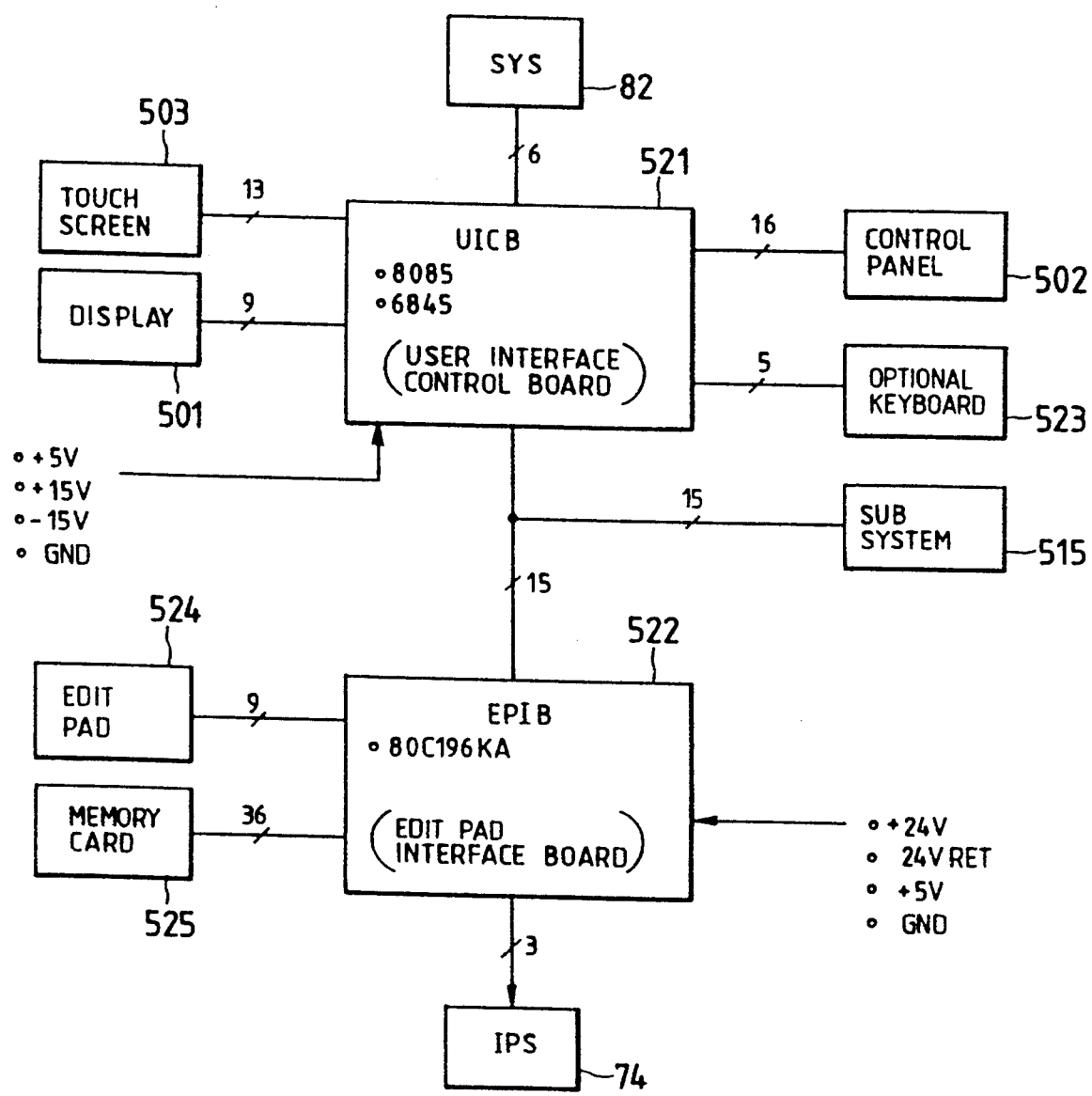
FIG. 10 shows a hardware configuration of the UI.

The U/I uses two substrates, UICB 521 and EPIB 522, as shown in FIG. 10. The UICB 521 uses two CPUs (e.g., 8085 and 6845 by Intel Company, or their equivalent) for controlling the hardware of the U/I, for driving an edit pad 513 and a memory card 514, and for processing the input data to a touch screen 503 to write it on the CRT. The EPIB 522 uses a CPU of the 16-bit type (e.g., 80C196KA by Intel Company), since an 8-bit CPU is unable to depict data in the bit map area. The depicting data in the bit map area is transferred to the UICB 521 in the DMA mode. In this way, the function is decentralized.

In the present invention, creations are introduced into the display screen layout and its controls, enabling use of the compact display. For example, the information to be displayed on the display screen is categorized into a plurality of groups of information. These groups of information are displayed in a plurality of displays. With regard to one display, the detailed information is displayed in a pop-up manner, and is not displayed in the primary display screen. Accordingly, the display is concise and clear with only minimum necessary information. For the display containing different items of information, color and emphatic indications are used so that the operator can readily and distinctly recognize the necessary information on the display screen from among the information.

Figure 11A:
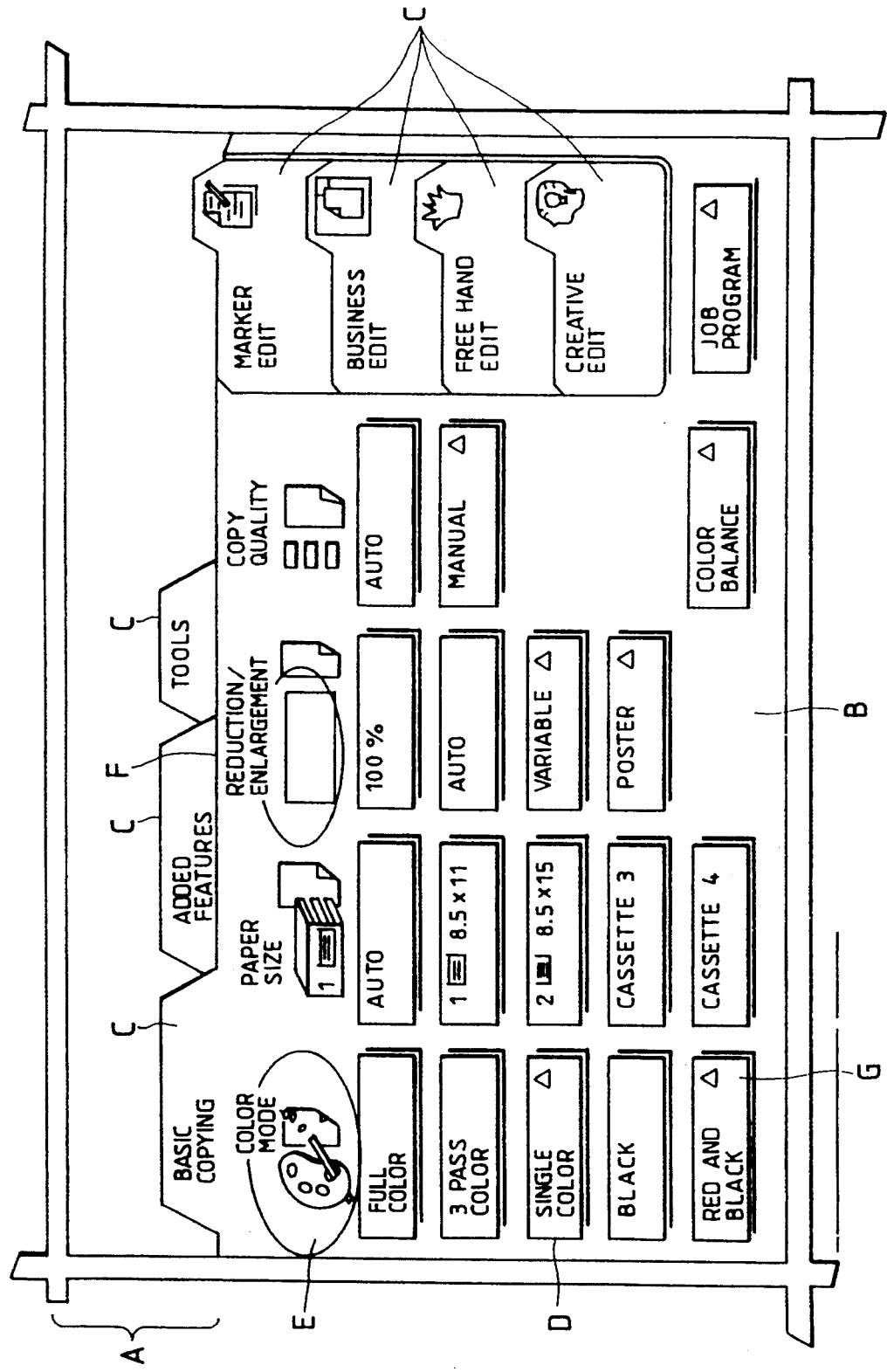
FIGS. 11A & B shows layouts in displays for instructive controls.
Figure 11B:
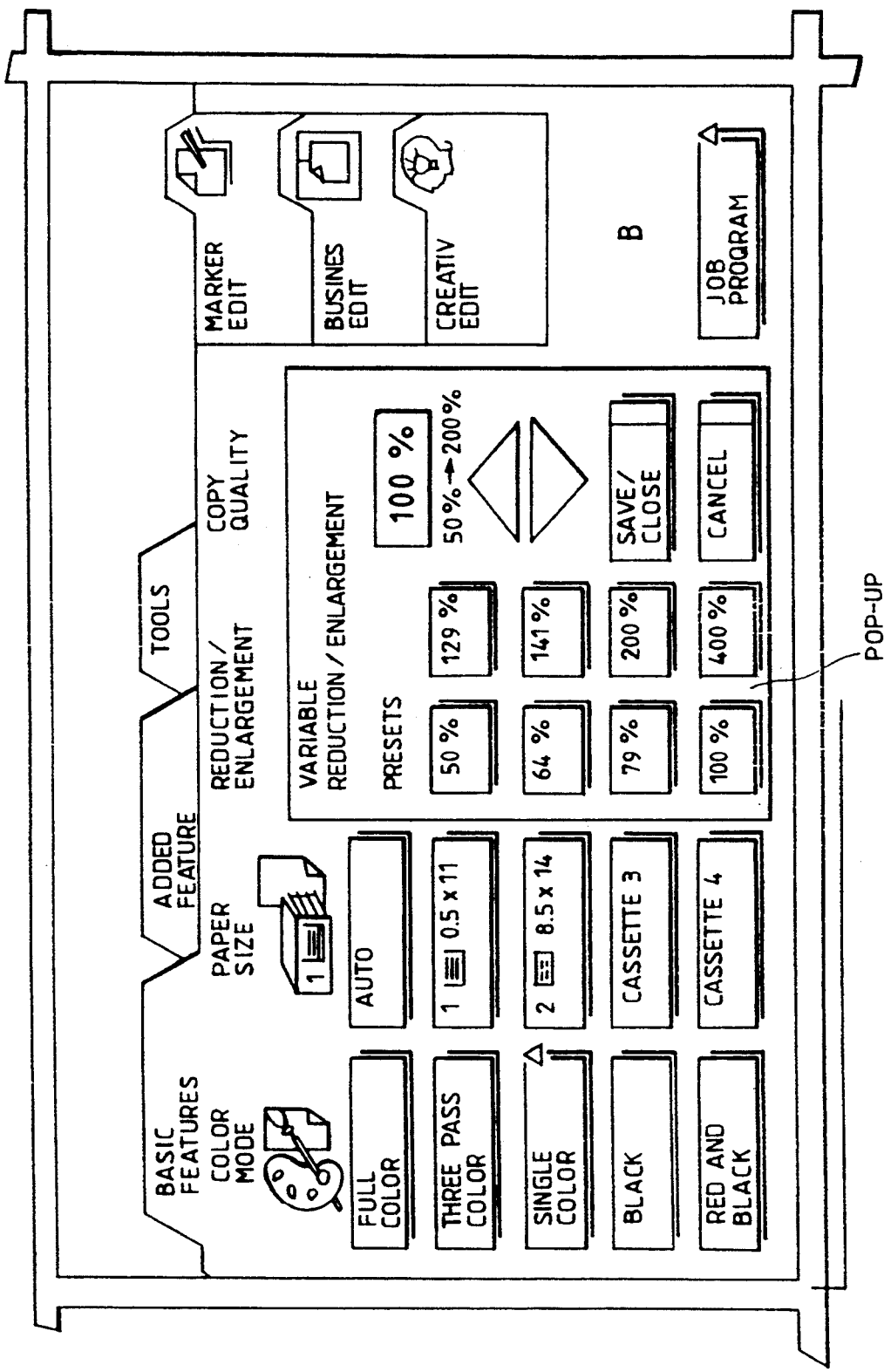

FIG. 11 shows some layouts of display screen. FIG. 11(a) shows a basic copy display. FIG. 11(b) shows a display in which a pop-up display is inserted in the basic copy display.

In the user interface according to the present invention, an initial display is the basic copy display for setting copy modes as shown in FIG. 11. The display for setting copy modes is divided into two sections, a message area A and a pathway area B.

The message area consists of the upper three lines on the screen. The first line is for a statement message. The second and third lines are for various messages, such as a guide message when different functions are contradictively selected, a message showing a faulty state of the machine, and an alarm message. The right end portion of the message area is used as an area for displaying the number of copies, such as the number of copies set by ten keys, and the number of copies being under copying operation.

The pathway area B is an area used to select various functions, and contains many pathways of a basic copy, added feature, marker edit, business edit, free hand edit, creative edit, and tool. The pathway tabs C for those pathways are displayed. Each pathway uses a pop-up function for improving the operability. The pathway area B further contains soft buttons D as choices for selecting functions by touching it by the finger, an icon (picture) E for indicating the function selected, and indicator F for indicating magnification percentages. Those soft buttons with the pop-up functions are each marked with a pop-up mark G of Δ. By touching the pathway tab C, the pass-way of the touched tab is opened. By touching the soft button, the function indicated by the touched soft button is selected. For gaining a good operability, the soft buttons D are arrayed so that for function select, those buttons are operated in the order form the left upper button to the right lower button.

The basic copy display and other displays are sorted so as to maximize communication between it, the soft panel, the hard console panel, and other devices. Further, the edit displays consist each of a plurality of levels that can be selected in accordance with the degree of skill of the operator. A pop-up function can also be used. Of those functions displayed, the functions requiring a high level of technique or complicated functions are displayed in a pop-up manner. A display shown in FIG. 11(b) appears when the reduction/enlargement function is selected, the pop-up is opened by touching a variable reduction/enlargement soft button.

The displays except the bit map area are composed of tiles whose width is 3 mm (8 pixels) and height is 6 mm (16 pixels). The width of each display is 80 tiles and the height is 25 tiles. The bit map area is displayed with pixels and its height is 151 pixels and width is 216 pixels.

The hard control panel, as shown in FIG. 2, is disposed on the right side of the color display panel, and is slightly bent toward the center. The control panel is provided with various buttons of ten keys, ten key clear, all clear, stop, interrupt, start, information, auditton, and language.

The hard control panel is further provided with LEDs (light emitting diodes) for indicating operations of the respective buttons.

(I-7) Film Image Reader

The film image reader, as shown in FIG. 2, is composed of a film projector (F/P) 64 and a mirror unit (M/U) 65.

Figure 12:
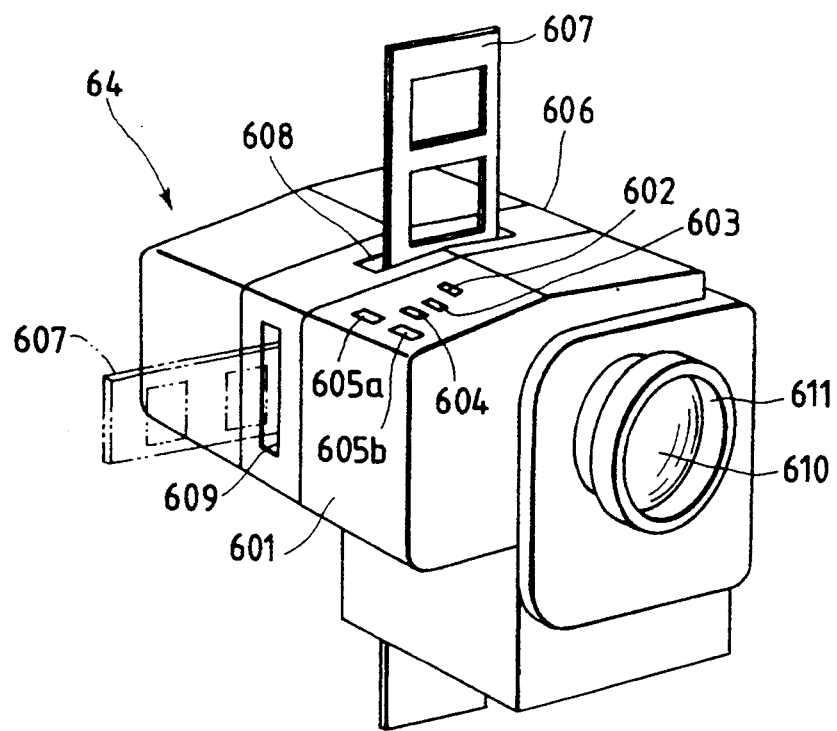
FIG. 12 shows a perspective view of an F/P.
Figure 13:
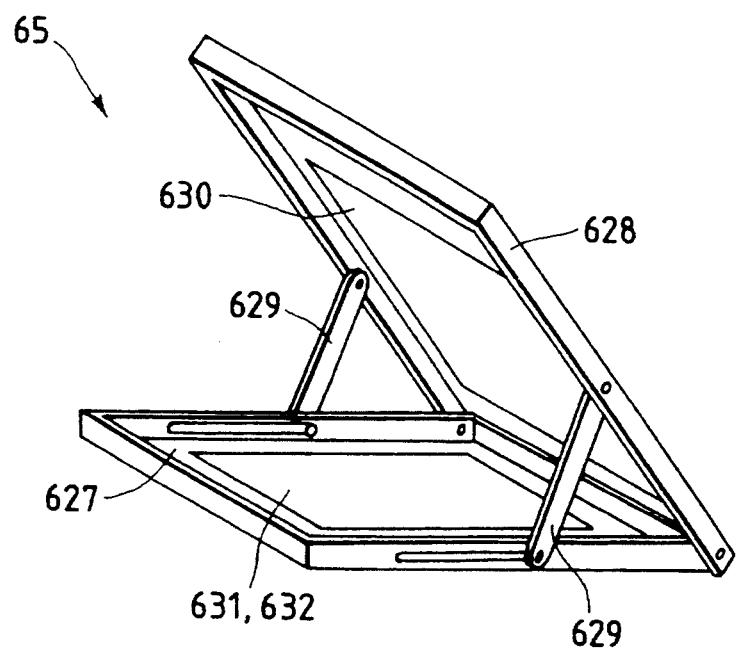
FIG. 13 is a perspective view of an M/U.
Figure 14:
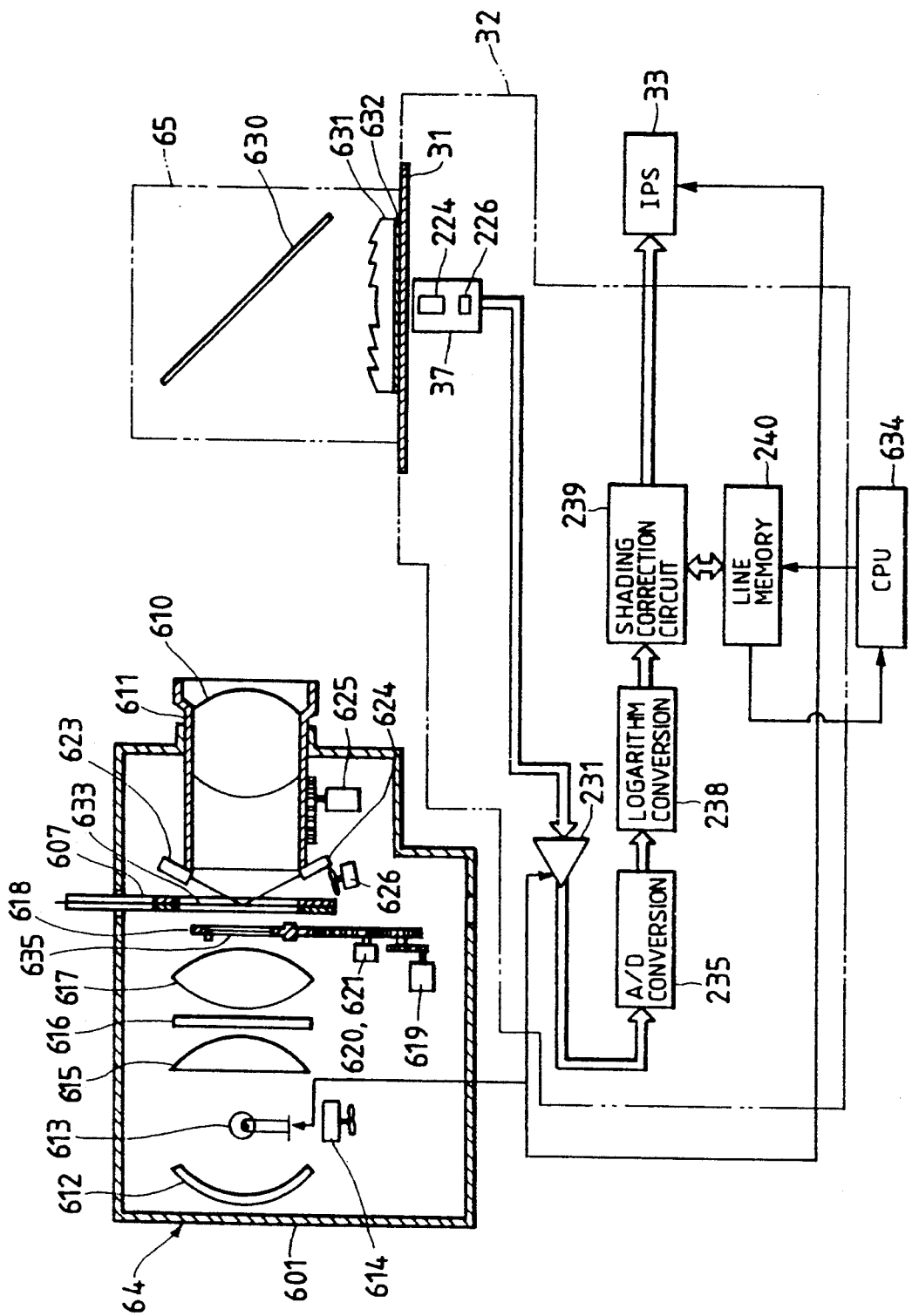
FIG. 14 shows a configuration of the F/P in connection with the F/P, M/U and IIT.

FIG. 12 shows a perspective view of the F/P; FIG. 13, a perspective of the M/U; FIG. 14 shows a schematic illustration of the F/P, and interconnection of the F/P, M/U, and the IIT.

As shown in FIG. 12, the F/P is provided with a housing 601. The housing 601 is further provided with an operation check lamp 602, manual lamp switch 603, auto focus/manual focus (AF/MF) select switch 604, and manual focus (M/F) operation switches 605a and 605b. The housing 601 is further provided with an open/close member 606 swingable for open and close. Slots 608 and 609 are formed in the upper surface and the side wall of the open/close member 606. A film holder 607 holding an original film 633 is inserted into the housing 601 through either of these slots. In use, these slots are selectively used in accordance with the orientation of the image recorded in the film 633. Slots (not shown) are additionally formed in the bottom surface and the wall opposite to the above. Through these slots, the film holder 607 may be ejected. The open/close member 606 is hinged to the housing 601 or removably mounted to the housing 601. With provision of the open/close member 606 thus mounted, when foreign material enters the housing 601, an operator opens the member 606, and may remove the material.

In this instance, two types of film holders are used, one for the 35 mm nega. film, and the other for the 35 mm posi. film. The F/P 64 accepts these types of films, and further nega. films of 6 cm×6 cm and 4"×5". In the case of the nega. film, in use it is closely placed Between the M/U 65 and the platen glass 31.

A lens holder 611 holding a projection lens 610 is slidably supported in the right portion of the housing 601 as viewed in the drawing.

Within the housing 601, a reflector 612 and a light source lamp 613 such as a halogen lamp is disposed in alignment with the projection lens 610 with respect to an optical axis. A cooling fan 614 for cooling the lamp 612 is disposed near the lamp 613. An aspheric surface lens 615 for converging rays of light from the lamp 613, heat wave absorbing filter 616 for cutting off the light of a predetermined wave length, and a convex lens 610 are disposed on the right side of the lamp 613 and in alignment with the same with respect to the optical axis.

An auto exchanger for correction filter is installed on the right side of the convex lens 617. The auto filter exchange includes a correction filter holder 618, motor 619, first and second position sensors 620 and 621, and controller (not shown, but is housed in the F/P 64). The filter holder 618 holds a correction filter 635 for correcting a film density of the 35 mm nega. film and the posi. film. The correction filter illustrated is for one of the two types of films. The motor 619 drives the filter holder 618. The first and second position sensors 620 and 621 are for detecting angular displacements of the filter holder 618. In use, a correction filter corresponding to the original film 633 is automatically selected from those contained in the filter holder 618, and is aligned with the projection lens 610 and other lenses with respect to the optical axis. The auto filter exchanger 635 may be any other place than the above, if it lies on an optical axis of the projection light, for example between the platen glass 31 and the imaging unit 37.

An auto focus device is further installed, which is composed of a light emitting means 623 such as a photodiode and a photo sensor 624 that operate in connection with the lens holder 611, and a motor 625 for sliding the lens holder 611 of the projection lens 610 with respect to the housing 601. When the film holder 607 is inserted through the slot 608 or 609 into the housing 601, the original film 633 contained in the film holder 607 is positioned between filter holder 618 and the paired photo diode 623 and photo sensor 624. A fan 626 for cooling the original film 633 is located near the place where the original film 635 is set.

A power supply for the F/P 64 is different from that for the base machine 30, but is installed within the base machine 30.

As shown in FIG. 13, the mirror unit (M/U) 65 is made up of a bottom plate 627 and a cover 628 swingably mounted at one end of the bottom plate 627. A couple of supports 629 and 629 are coupled between the bottom plate 627 and the cover 628. The paired supports 629 and 629 support the cover 628 left open at 45° with respect to the bottom plate 627 when the bottom plate is maximally opened.

A mirror 630 is mounted to the rear side of the cover 628. The bottom plate 627 has a large opening which is filled with a fresnel lens 631 and a diffusion plate 632.

As best illustrated in FIG. 14, the fresnel lens 631 and the diffusion plate 632 are formed by a single acrylic plate. The top surface of the acrylic plate constitutes the fresnel lens 631, and the bottom surface constitutes the diffusion plate 632. The fresnel lens 631 converts the light reflected form the mirror 630 that otherwise will spread out, into parallel rays of light, thereby preventing the peripheral portion of an image from being darkened. The diffusion plate 632 minutely diffuses the parallel rays of light to such an extent as to prevent the line sensor 226 from detecting a shadow of the selfoc lens 224 within the imaging unit 37.

When the color copy using the F/P 64 is not used, the mirror unit 65 is folded and stored in a given storage place. In use, it is opened and placed in a predetermined location on the platen glass 31 of the base machine 30.

Major functions of the film image reader are as follows: auto exchange of correction filter, original film inserting direction detection, auto focus (AF) function, manual focusing (MA) function, manual turn-on of light source lamp, automatic changing of magnification and scan area, automatic shading correction, and automatic image quality adjustment.

(II) IMAGE PROCESSING SYSTEM (IPS)

(II-1) Module Construction of IPS

Figure 15:
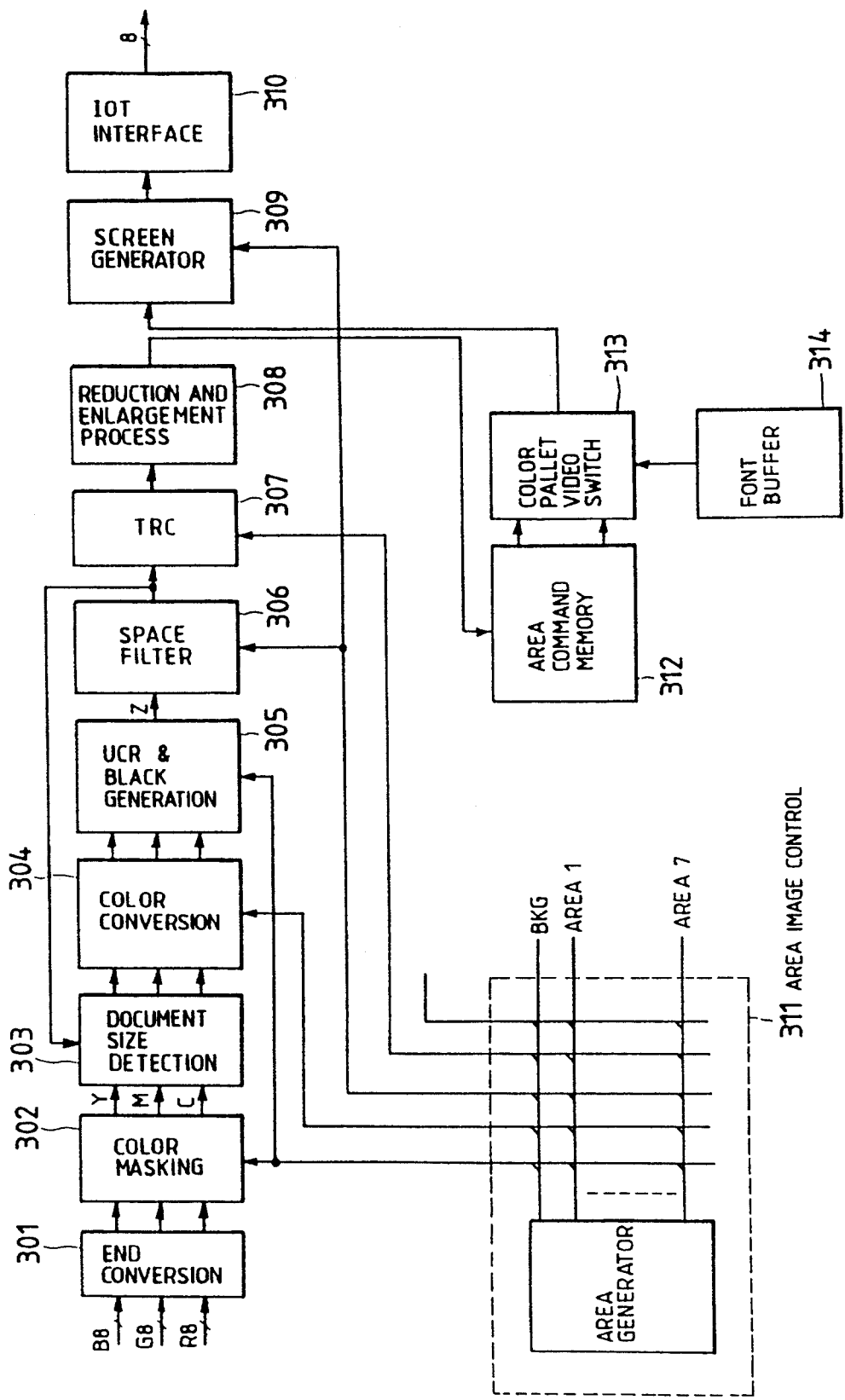
FIG. 15 shows a module configuration of the IPS.

FIG. 15 is a chart illustrating an outline of the module construction of the IPS.

In a color image forming equipment, an original sheet in color is red with the decomposition of the colors into the primary colors, i.e. B (blue), G (green), and R (red) by means of the CCD line sensors. Data on the original sheet is further converted into the primary colors, Y (yellow), M (magenta), C (cyan), and, additionally, K (black) for the toner, and a color picture image is reproduced with the exposure process, as well as development, with laser beam equipment in the IOT (Image Output Terminal). In this case, with the image being decomposed into the toner images for Y, M, C, and K respectively, the copying process (pitch) with Y as the process color is performed once, and, in the same way, a copying cycle is performed one time each with M, C, and K taken as the process color, so that the all copying cycles so executed for a color image add up to a total of four times. The overlapping effect of the images in these mesh dots, is a color image is reproduced in full color. Accordingly, in respect of the process of converting the color decomposition signals (i.e. B, G, and R signals) into the toner signals (i.e. Y, M, C, and K signals), there arise such questions as how to control the balance of colors in such signals; how to reproduce those colors in manners suitable for the reading characteristics of the IIT and the output characteristics of the IOT; how to make adjustments of the density and contrast of the image; and how to control the emphasis of the edges and the moire.

The IPS inputs the B, G, and R color decomposition signals from the IIT into itself, performs various data-processing Jobs for improving the reproducing characteristics, such as the color-reproducing features, the reproducing fidelity of colors in terms of chromatic gradation, and the reproducing capabilities of fine details, and then converts the toner signals for the developing process colors into ON/OFF signals, giving the output of the signals to the IOT. And, as illustrated in FIG. 15, this system is composed of the END conversion (Equivalent Neutral Density) module 301, the color masking module 302, an original sheet size detecting module 303, the color conversion module 304, the UCR (Under Color Removal) and black-generating module 305, the space filter 306, the TRC (Tone Reproduction Control) module 307, the reduction and enlargement module 308, the screen generator 309, the IOT interface module 310, the area image control module 311 provided with an area-forming circuit and a switch matrix, the editing control module provided with the area command memory 312, the color palette video switch circuit 313, and the font buffer 314, and so forth.

Then, eight-bit data (in 256 chromatic shades) are input from the IIT with respect to each of the B, G, and R color decomposition signals into the END conversion module 301, where they are converted into the toner signals for Y, M, C, and K. Thereafter, the system selects the toner signal X for the process color, and, converting this into a binary signal and applying it as the ON/OFF data for the toner signals of the process color, the system outputs the data from the IOT interface module 310 to the IOT. Therefore, in the case of the full-color copying operations, the IPS initially performs the pre-scanning process in which it performs the detection of the information on the size of the original sheet, the detection of the editing area, and the detection of other items of information on the original sheet, and thereafter this system first performs, for example, the copying cycle in which the toner signal X for the process color is applied to Y, and then the copying process in which the toner signal X for the process color is applied to M, and, each time such a copying cycle is carried out one after another in sequence, this system performs the processing of the signals corresponding to the scanning operations conducted four times for reading the original sheet.

The IIT reads one pixel in the size of 16 dots/mm with respect to each of B, G, and R, using the CCD sensors, and it outputs the data in 24 bits (three colors $\times$ 8 bits; 256 color shades). The CCD sensors are provided with filters for B, G, and R on their upper surface areas, and each of the sensors has a length of 300 mm with the density of 16 dots/mm, and they perform their scanning operation at the rate of 16 lines/mm at the process speed of 190.5 m/sec. Therefore, the sensors read the original sheet at the speed of 15M pixels per second in respect of each color, thereafter outputting the resultant data. And, the IIT converts the information on the reflexive ratio to the information on density through log-conversion of the analog data on the picture elements for B, G, and R, and then it further converts the data into digital data.

Next, a description is made of the individual modules.

FIG. 16 is a chart for illustrating the individual modules of which the IPS is composed.

(A) END conversion module

The END conversion module 301 is the module for adjusting (i.e. converting) the signals obtained by optically reading the color original sheet by the IIT to obtain the gray-balanced color signals. The toner for the color image attains the equivalent amount, and thus gray serves as the standard. However, the values of the B, G, and R color decomposition signals which are input from the IIT when an original sheet in gray color is read are not made equal because the light source and the spectroscopic characteristics, etc. of the color decomposing filters are not ideal. For this reason, the END conversion process is performed by the use of a conversion table (LUT: Look Up Table) like the one shown in FIG. 16(a) in order to balance the signals. Accordingly, the conversion table is one which has the characteristic features adapted for yielding the output of the signals, when the system reads the original sheet in gray color, as converted into the B, G, and R color decomposition signals always in their equivalent shades in correspondence to their levels (black—white), and, as such, the table is dependent upon the characteristics of the IIT. Moreover, the conversion tables are prepared in a set of 16 tables in total, and, of these, 11 tables are those to be applied to the film projectors, including the tables for negative films, while three of them are tables to be used for ordinary copies, for photographs, and for generation copies.

(B) Color Masking Module

The color masking module 302 is one which converts the B, G, and R signals into the signals corresponding to the quantities of the toners for Y, M, and C by performing matrix operations thereof, and the module processes the signals after the gray balance adjustment is made of them in the END conversion process.

For the conversion matrices used for the color masking are employed three-by-three matrices which determine Y, M, and C, respectively, from B, G, and R purely by arithmetic operations. Yet, in order to take account not only of B, G, and R, but also of the effect of such components as BG, GR, RB, $B^2$, $G^2$, and $R^2$, it is, of course, acceptable to employ various matrices or other matrices. As regards the conversion matrices, this system possesses those for the usual color control and those for generating the intensity signals in the monochromatic mode.

In this manner, this system performs gray-balance adjustment first of all in the processing of the video signals from the IIT by means of the IPS. If this process were to be performed after the color masking process, then it would be necessary to make adjustments of the gray balance with a gray original sheet which reflects considerations given to the characteristics of the color masking. Hence, the conversion tables to be used in such a case would be more complicated.

(C) Original sheet size detecting module

Figure 16A:
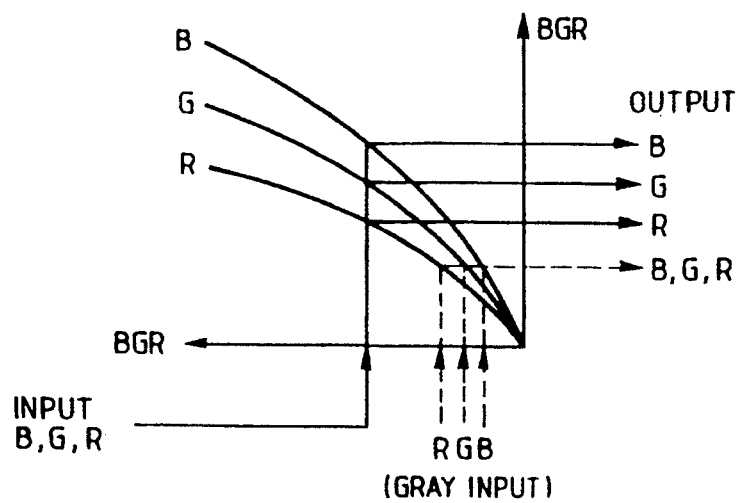
FIGS. 16 (A-G) are diagrams showing the respective modules constituting the IPS.
Figure 16B:
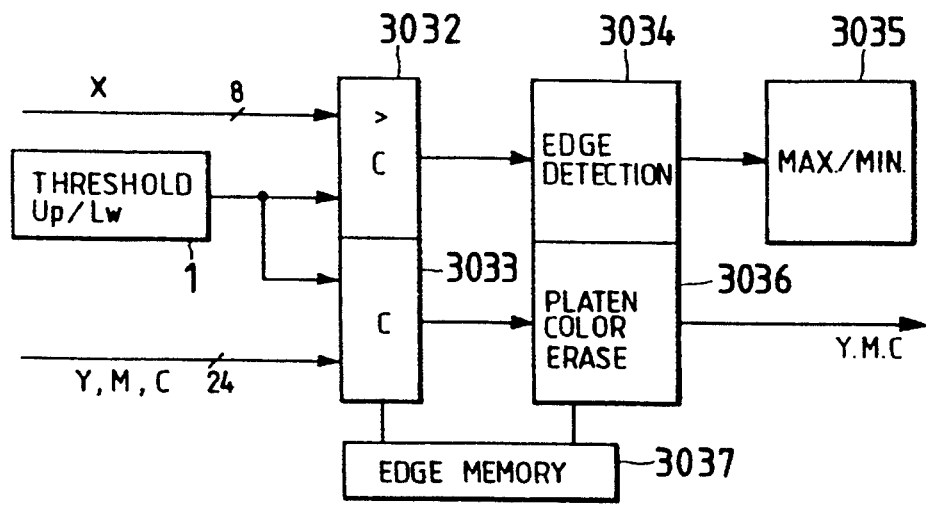

Not only the original sheets in the regular sizes, but also originals in voluntarily chosen shapes, with patches of paper pasted thereon or otherwise, may be copied from time to time. In such a case, it is necessary to detect the size of the original sheet in order that the copying machine may select an adequate size of paper matching the size of the original sheet. Moreover, when the copying paper is larger than the size of the original sheet, the erasures of the outer areas will produce copies with an improved appearance in finish. For this reason, the original sheet size detecting module 303 performs the detection of the original sheet size at the time of the prescanning operation and also the erasure of the platen color (the erasure of the frame) at the time of the scanning for reading the original sheet. Therefore, the color of the platen should be a color (for example, black) which is easily distinguishable from that of the original sheet, and, as illustrated in FIG. 16(b), the upper limit value and the lower limit value for the recognition of the platen color are to be set in the threshold register 3031. And, in the course of prescanning, this system compares by means of the comparator 3032 the signals X as converted into information close to the reflexive ratio of the original sheet ([gamma] conversion) (for which the output from the space filter 306 described later is used) with the upper limit value and the lower limit value which are set in the threshold register 3031 and then detects the edge of the original sheet, then storing the maximum value and the minimum value of the coordinates (x, y) in the maximum/minimum sorter 3035.

For example, as shown in FIG. 16(d), the maximum values and the minimum values ($x_1$, $x_2$, and $y_1$, $y_2$) for the top, the bottom, the left, and the right of the original sheet are detected and stored in memory in case the original sheet is aslant or not in a rectangular shape. Moreover, in the course of the scanning operation for reading the original sheet, the system compares, by means of the comparator 3033, the Y, M, and C of the original sheet, with the upper limit value/the lower limit value set in the threshold register 3031 and then performs the frame-erasing process by erasing the signals on the outer sides of the edges, i.e. the signals on the reading of the platen, in the platen color erasing circuit 3036.

(D) Color conversion module

Figure 16C:
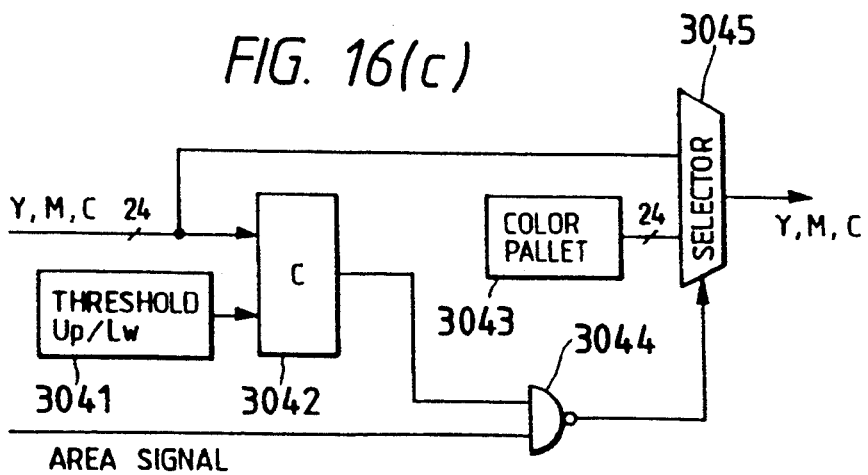

The color conversion module 305 is a module which makes it possible to convert the specified color in a specific area, and this module is provided with a window comparator 3052, a threshold register 3051, a color palette 3053, and so forth as illustrated in FIG. 16(c). For performing the color conversion process, this system sets the upper limit values/the lower limit values for the converted colors, Y, M, and C, respectively, in the threshold register 3051 and then sets in the color palette 3052 the values of the Y, M, and C for the colors into which the source colors are to be converted. And, the system controls the NAND gate 3054 in accordance with the area signals input from the area image control module, and, in case the area is not a color conversion area, the system sends out the Y, M, and C of the original sheet as they are from the selector 3055, but, if the system comes across with a color conversion area, it sends out the Y, M, and C signals set for the object conversion colors in the color palette 3053, effecting the switching of the selector 3052 with the output from the window comparator 3052 when the signals on the Y, M, and C of the original sheet comes between the upper limit value and the lower limit value of the Y, M, and C as set in the threshold register 3051.

As for the specified colors, the system recognizes the specified colors by working out the average values of the 25 picture elements, B, G, and R, respectively, in the neighborhood of the coordinates as specified at the time of prescanning, with the digitizer being employed to point the area on the original sheet. With this averaging operation, it is possible to recognize, for example, even the 150-line original sheet with a degree of accuracy within five in chromatic difference. For the reading of the data on the density of B, G, and R, the system reads out the specified coordinates, by converting them into the addresses, from the IIT shading correction RAM, and, for the said conversion into the addresses, it is necessary to make readjustments of the portions of data adjusted in registration, in the same way as in the case of the detection of the original sheet size. In the prescanning process, the IIT operates in the sample scanning mode. The B, G, and R density data which are read out of the shading correction RAM are corrected by the software and then averaged and thereafter processed further for their END corrections, and, after the color masking process is executed thereon, the resultant data are set in the window comparator 3052.

As for the registered colors, eight colors in the maximum can be registered on the color palette 3053 at the same time out of a total of 16,700 thousand colors, and the standard colors made available are 14 colors, which are Y, M, C, G, and B, the colors intermediate between these, and K and W.

(E) UCR and black-generating module

In case the Y, M, and C colors are in equivalent amounts, they will together form a gray color. Therefore, from a theoretical standpoint, it is possible to replace the Y, M, and C in equivalent amounts with black, thereby representing the same colors. However, from a practical standpoint, their replacement with black would cause some turbidity in the colors, with the result that the reproduction effect of the colors are deteriorated. Therefore, the UCR and black-generating module perform the processes for generating an adequate amount of K, in such a way that turbidity will not occur in the color, and also reducing the equivalent amounts of Y, M, and C in proportion to the amount of K so generated (the removal of the undercolors). In specific terms, the system detects the maximum values and the minimum values of Y, M, and C, and, in proportion to the differences between them, the system generates K in an amount equal to or less than the minimum value with reference to the conversion tables and performs the removal of the undercolors to certain degrees with respect to Y, M, and C in proportion to the amount of K so generated.

In the UCR and the generation of black, a color close to gray, for example, has a small difference between the maximum value and the minimum value, as shown in FIG. 16(e). K is generated while the amounts of Y, M, and C equivalent to their minimum values are removed as they are. However, in case there is a considerable difference between the maximum value and the minimum value, the admixture of black and a decline in the chromatic saturation of the colors with low luminosity and high chromatic saturation are prevented by making the amount of removed color smaller than the minimum values for Y, M, and C and also by reducing the amount of black generated.

Figure 16F:
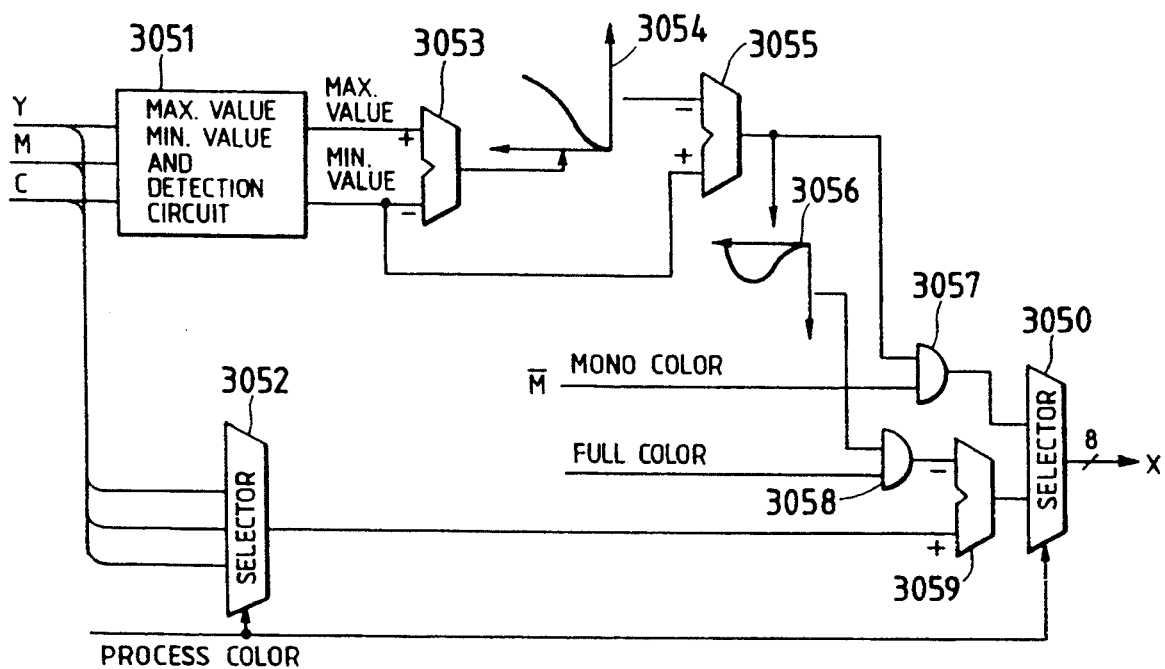

In FIG. 16(f), where examples of specific circuit constructions are represented, the system detects the maximum values and the minimum values of Y, M, and C by means of the maximum value/minimum value detecting circuit 3051 and works out the difference between them with the arithmetic operation circuit 3053, and generates K with the conversion table 3054 and the arithmetic operation circuit 3055. The conversion table 3054 makes adjustments of the value of K, and, when the difference between the minimum value and the maximum value is small, the value of the output from the conversion table 3054 turns out to be zero, and consequently the minimum value is output, as it is, as the value of K from the arithmetic operation circuit 3055, but, when the difference between the maximum value and the minimum value is large, the value of the output from the conversion table 3054 will not be zero, and, therefore, the system outputs as the K value the value obtained by subtracting the amount of the difference from the minimum value with the arithmetic operation circuit 3055. The conversion table 3056 is a table with which the system finds the values to be subtracted from the Y, M, and C in correspondence to the K, and the system performs the removal from Y, M, and C in correspondence to K with the arithmetic operation circuit 3059 by way of the conversion table 3056. Moreover, the AND gates 3057 and 3058 are those for applying the gate process to the K-signal and the signals obtained after the removal of the undercolors of Y, M, and C, performing the said process in accordance with the individual signals in the monochromatic mode and the full-color mode, and the selectors 3052 and 3050 are those for selecting one of Y, M, C, and K on the basis of the process color signal. In practice, the colors are reproduced in the mesh dots in Y, M, and C in this manner, the ratios for the removal of Y, M, and C and the ratio for the generation of K are set up by the use of curves and tables or the like which have been developed on the empirical basis.

(F) Space filter module

In the devices applied to this copying machine, the original sheet is read by scanning the CCD with the IIT as described earlier, and, if the information so obtained is used as it is, the resulting output will be obscure information, and, additionally, since the system reproduces the original sheet in mesh dots, there occurs moire between the mesh dot cycle for the printed matter and the sampling cycle for 16 dots/mm. Moreover, moire appears also between the mesh dot cycle which the system forms for itself and the mesh dot cycle of the original sheet. The space filter module 306 is a module which is provided with the function of recovering obscure images like these and the function of removing the moire. And, for the removal of the moire, a low pass filter is employed in order to cut off the mesh dot components while a high pass filter is used for processing the emphasis of the edges.

Figure 16G:
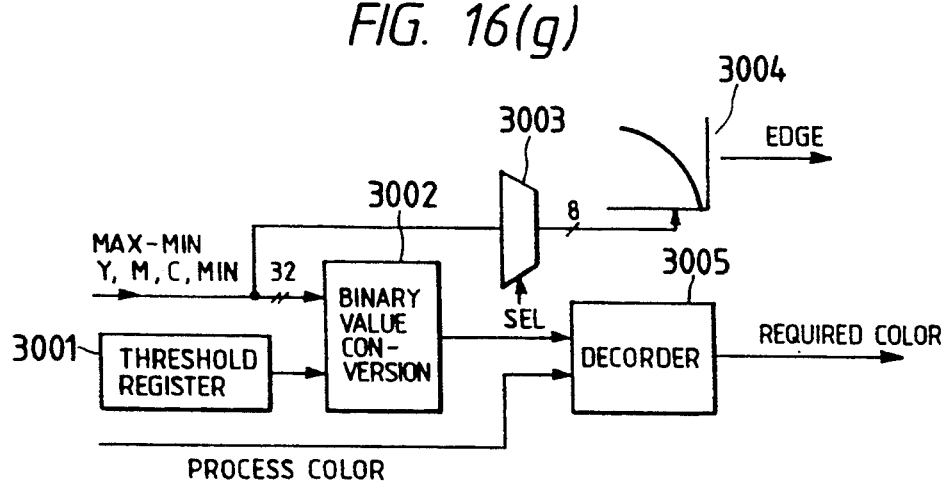

In the space filter module 306, one color out of Y, M, C, Min and Max-Min input signals is taken out with the selector 3003, as shown in FIG. 16(g), and then converts the data into information close to the reflexive ratio with reference to the conversion table 3004. This approach is taken because it is easier to pick up the edges through this type of information, and Y, for example is selected as one of the colors for this process. Furthermore, with the threshold register 3001, the four-bit binary value conversion circuit 3002, and the decoder 3005, the system separates the signals for each picture element from Y, M, C, Min and Max-Min into the eight hues, i.e. Y, M, C, K, B, G, R, and W (White). The decoder 3005 recognizes the hues on the basis of the information for the binary data conversion, and it outputs the data in the form of one-bit information on the point whether or not the hue so recognized is a necessary color as viewed with reference to the process color.

Figure 16H:
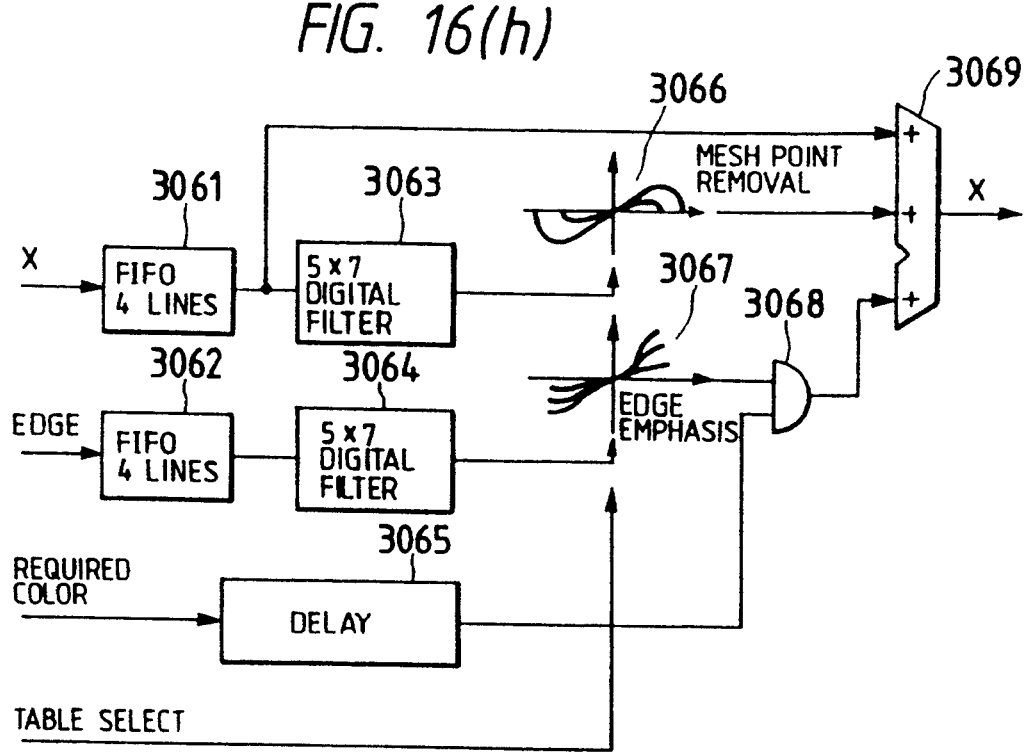

The output shown in FIG. 16(g) is input into the circuit shown in FIG. 16(h). Here, the information for the removal of the mesh dots is generated with the FIFO 3061 and the 5×7 digital filter 3063 and with the modulation table 3066, and the system generates the edge emphasis information from the information output as shown in FIG. 16(g) with the FIFO 3062 and the 5×7 digital filter 3064, the modulation table 3067, and the delay circuit 3065. The modulation tables 3066 and 3067 are selected in correspondence to the copying modes, such as the photograph mode, the exclusive mode for characters, and the mode for photographs and characters in mixture.

Figure 16I:
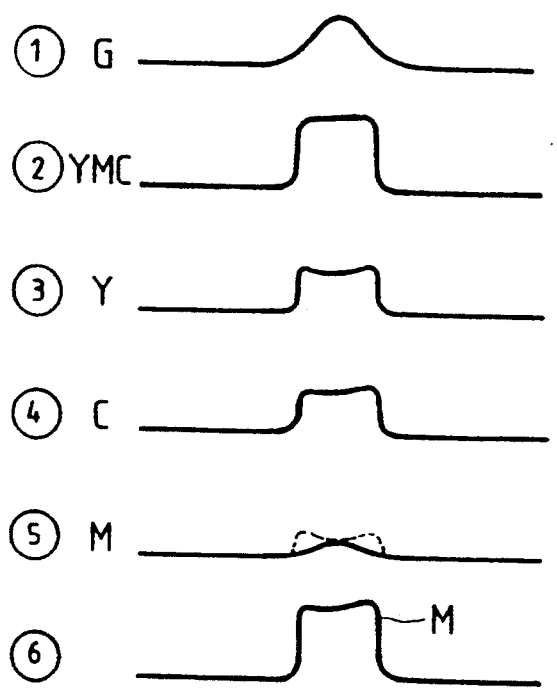

With regard to the emphasis of the edges, assume for example that it is intended to reproduce green-colored characters like those given in FIG. 16(i) (1) to appear as rendered in (2). For this purpose, Y and C are to be processed for emphasis as shown in (3) and (4) while M is not given any emphasizing treatment as shown by the solid line in (5). The switching operation for this is performed with the AND gate 3068. For the performance of this process, the emphasis in the manner shown by the dotted line under (5) will result in the occurrence of a turbid color in the edges as shown in (6) on account of the admixture of M. The delay circuit 3065 is a circuit which achieves the synchronization of the FIFO 3062 and the 5×7 digital filter 3064 for the purpose of switching the emphases like this for each process color by means of the AND gate 3068. If vivid green characters are reproduced by the ordinary process, magenta causes turbidity in the green characters in consequence of its admixture with green in them. For this reason, the system reduces the amount of M in order not to emphasize the edges of the character while it outputs Y and C as usual when it recognizes any character as one in green as mentioned above.

(G) TRC conversion module

The IOT makes it possible to reproduce full-color original sheets on copies through its performance of the copying cycle four times (in the case of full-color copy in four colors) by each of the process colors, Y, M, C, and K, in accordance with the ON/OFF signals transmitted from the IPS. As a matter of practice, however, it requires fine and delicate adjustments made in consideration of the characteristics of the IOT to reproduce with high fidelity the colors theoretically identified through the processing of the signals. The TRC conversion module 309 is a module which is provided in order to attain improvements on the features of reproducibility like this, and this system is provided with an address conversion table for accepting eight-bit image data as its address input as shown in FIG. 16(j) in the RAM, the said address conversion table being designed to work in correspondence to each of the combinations in density of the colors, Y, N, and C, and this system is provided with such editing functions as density control, contrast control, negative-positive reversal, color balance control, character mode, and openwork synthesis, which are to be performed in accordance with the area signals. In the three upper bits in this RAM address are used the bit 0 through the bit 3 of the area signals. Moreover, the off-area mode permits the use of the above-mentioned functions in combination. Furthermore, this RAM possesses eight-face conversion tables composed, for example, of 2 k bytes (256 bytes×8 faces), which are stored up to the maximum of eight faces in the course of the carriage return of the IIT for each cycle for Y, M, and C and they are selected in accordance with such operating factors as the specification of the area and the copying mode. Of course, it will be unnecessary to load the tables for each cycle of the operations if the RAM is given an increased capacity.

(H) Reduction and enlargement processing module

The reduction and enlargement processing module 308 performs the reduction and enlargement processes through the reduction and enlargement processing circuit 3082 in the process in which the system sends out the data X after once storing it in the line buffer 3083, and this module generates the read / write addresses for the sampling signals and the line buffer 3083 by means of the resampling generator and address controller 3081. The line buffer 3083 is designed in the form of a Ping-Pong buffer composed of buffers for two lines, so that the said buffer will be capable of writing the next line data in one of the buffers at the same time as the data are read out of the other of the buffers. In the reduction and enlargement process, the operations in the main scanning direction are digitally performed with this reduction and enlargement processing module 308, but those in the supplementary scanning direction are performed by changing the speed of the scanning operations with the IIT. The scanning speed can be varied in the range from two times the rated speed to ¼th of the rated speed for making reductions or enlargements in the range from 50 per cent to 400 percent of the original sheet size. In the digital processing, in the course of the reading/writing of data in the line buffer 3083, reductions are made by thinning out for complementation, while enlargements are made by adding for complementation. The data for the said complementation will be generated by a weighting process in proportion to the distances to the data on both sides as illustrated in (1) of the Figure cited above. In the case of the data $Xi'$, for instance, the data can be determined by arithmetic operations performed with the equation given in the following, on the basis of $Xi$ and $Xi+1$ used to express the data on the two sides and the distances $d1$ and $d2$ between these sets of data and the sampling point:

$(Xi \times d2)+(Xi+1 \times d1)$ where $d1+d2=1$

In the case of the reduction process, the system writes the data in the line buffer 30B3 while processing the said data for complementation thereof and, at the same time, transmits the data processed for reduction for the preceding line, reading the said data out of the buffer. In the case of the enlargement process, the system once writes the data as they are and at the same time transmits the data for the preceding line while processing the said data for complementation for enlargement. Although the complementation and enlargement process performed at the time of writing the data would make it necessary to increase the clock in proportion to the enlargement ratio for the time when the writing process is performed, the design of the process described above permits the writing/reading of the data with the same clock. Moreover, with this construction, it is possible to process the shift image in the main scanning direction by reading the data from a point in the middle of the sequence or reading the data with a delay in timing, and it is possible to perform the repeating process by reading the data in repetition, and it is also possible to perform the mirror image processing by reading the data in the reverse direction.

(I) Screen generator

The screen generator 309 outputs the signals on the chromatic gradation of the toner for the process color after it converts the said signals into the binary value ON/OFF signals for the toner, and this generator performs the binary value conversion process and the error dispersion process through its comparison of the threshold value matrix and the value of the data expressed in chromatic gradation. The IOT inputs these binary value toner signals and reproduces the picture images in the halftones by turning on and off the laser beam in an oval shape approximately 80 μm φ in vertical diameter and 60 μm φ in horizontal diameter in such a way as to work with the signals in such a manner that they correspond to 16 dots/mm.

First, a description is made of how the chromatic gradation is expressed. A description is made first of a case in which the system forms halftone cells S 4×4, for example, as shown in FIG. 16(n). First, the screen generator sets the threshold matrix m in correspondence with such a halftone cell s, and then the data values expressed in terms of chromatic gradation are compared with the said matrix. Then, in this comparing process, the system generates a signal for turning the laser beam ON in the part where the value of the threshold matrix m is "5" or less, provided, for example, that the data value is "5".

The 4×4 halftone cells with 16 dots/mm are generally known as mesh dots at 100 spi in the range of 16 steps in chromatic gradation, but, at this level, the picture images are coarse, so that the reproduction fidelity of color images will be inferior. In this invention, therefore, this picture element (pixel) with 16 dots/mm is divided into four parts vertically (i.e. in the main scanning direction) as a method of increasing the chromatic gradation, and thus the ON/OFF frequency of the laser beam as viewed in relation to the picture element taken as the unit is set by the unit equivalent to ¼th of what is used in the conventional counterpart, i.e. the said factor is improved to a level four times higher, as shown in FIG. 16(o), so that a level of chromatic gradation higher by four times has been thereby achieved. Accordingly, in correspondence with this, a threshold value matrix m' as shown in FIG. 16(o) is set up. Moreover, for increasing the number of lines, it will also be effective to employ a sub-matrix method.

Figure 16P:
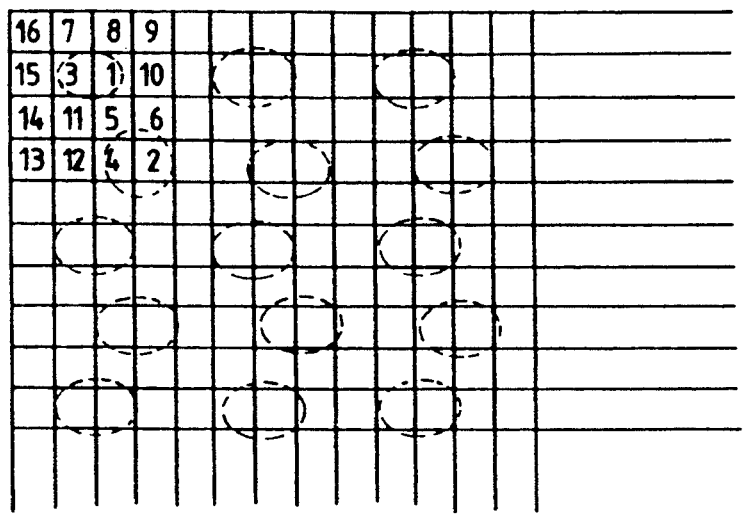

For the example cited above is used the same threshold value matrix m which has the only nucleus of growth in the proximity of the middle of each halftone cell. Yet, the sub-matrix method has a construction comprising a plural number of the unit matrices with the nuclei of growth for the matrices located in two or more positions (i.e. a plural number of positions) as shown in FIG. 16(p). With the employment of a screen pattern designing technique like this, it is possible to change the number of lines and the chromatic gradation freely in accordance with the distinction between dark areas and light areas for example by applying 141 spi in 64 chromatic grades to the light areas while changing these factors to 200 spi in 128 chromatic grades as the processed area grows darker. A pattern like this can be designed by judging the smoothness of the chromatic gradation and the fineness of lines, as well as such factors as the properties of grains, be visual observation.

Figure 16Q:
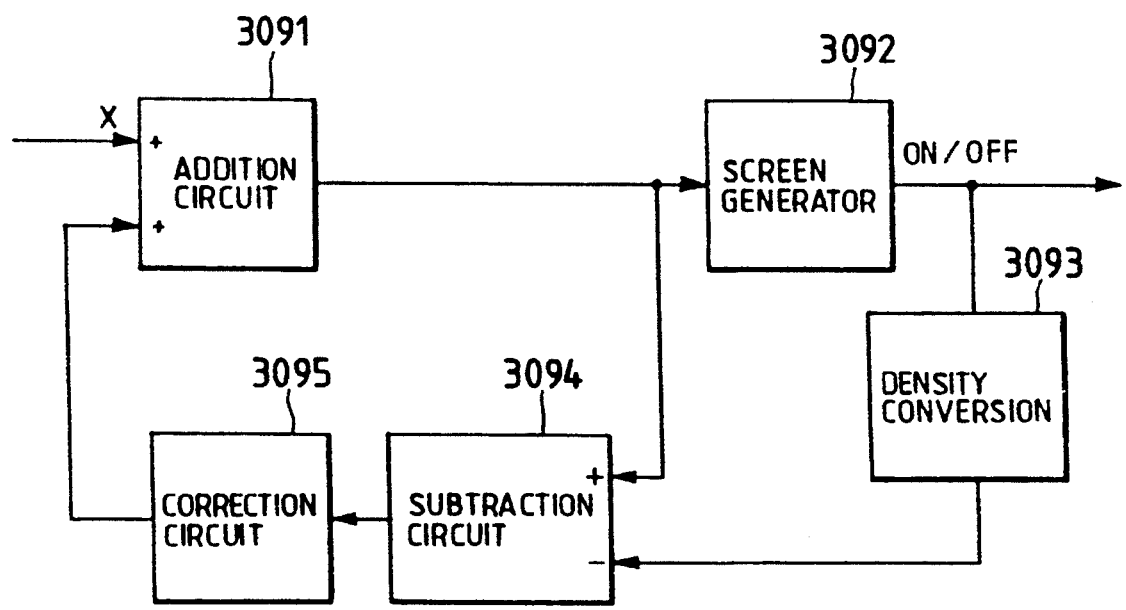

In case images in halftone are reproduced by dot matrices like those mentioned above, the number of steps in the chromatic gradation and the resolution will be in a mutually contradicting relation. In other words, these two factors are in the relationship that amounts to the point that an increase in the number of steps in chromatic gradation results in the deterioration of the resolution while an increase of the resolution causes a decline in the number of steps in chromatic gradation. Moreover, when the matrix for the threshold data is made smaller, there occurs an error in determining the quantum basis for the picture images which are actually output. The error dispersion process works for improving the reproducibility of the chromatic gradation as viewed from a macroscopic standpoint by detecting the quantizing error of the ON/OFF signals as converted into binary values after they are generated by the screen generator 3092 and the chromatic gradation signals of the input, as shown in FIG. 16(q), with the density conversion circuit 3093 and the subtraction arithmetic operation circuit 3094 and then by feeding the data by the use of the correcting circuit 3095 and the addition arithmetic operation circuit 3091. This process performs, for example, the error dispersion process, in which the picture elements in the corresponding position and the positions on both sides of the said position in the preceding line are "folded in" through a digital filter.

The screen generator makes improvements on the reproducing characteristics of picture images in high chromatic gradation and with high precision by changing the-threshold value data and the feedback coefficients for the error dispersion process for each original sheet or for each area in the original sheet, depending on the type of the picture image, such as an image in the neutral tones and the character images as described above.

(J) Area image control module

The area image control module 311 has a construction which makes it possible to set seven rectangular regions and their order of priority in the area generating circuit, and the control information for the areas is set in the switch matrices which correspond to the individual areas. The control information include the color conversion information, the color mode information, which relates to such points as whether the process calls for monochromatic processing or full-color processing, the modulation selecting information, which is related to photographs, characters, etc., the selection information for the TRC, and the selecting information for the screen generator, and these types of information are applied to the control of the color masking module 302, the color conversion module 304, the UCR module 305, and the space filter 306, and the TRC module 307. Moreover, the switch matrix is so designed that it can be set by software.

(K) Editing control module

The editing control module makes it possible to perform the outline drawing coloring process, which consists in painting the specified area not limited in shape with the specified color, reading the original sheet not in a rectangular form but in the form of a pie graph, or the like. As illustrated in FIG. 16(m), the AGDC (Advanced Graphic Digital Controllers) 3121, the font buffer 3126, the logogram ROM 3128, and the DMAC (DMA Controller) 3129 are connected to the bus of the CPU. And, the encoded four-bit area command Is transmitted from the CPU and written in the plane memory 3122 through the AGDC 3121, and the fonts are written in the font buffer 3126. The plane memory 3122 is composed of four planes, and it is possible to set the various point of the original sheet in four bits from plane 0 to plane 3, so that the original sheet can be output even if the command is 0 when the value kept in the memory is "0000" for example. It is the decoder 3123 that decodes this four-bit information into the commands 0 through 15, and it is the switch matrix 3124 that determines which of the command 0 through 15 should be assigned as the command for performing the processing of which one of the fill pattern, the fill logic, and the logogram. The font address controller 3125 generates the addresses in the font buffer 3126 in correspondence to the patterns, such as the mesh dot shade and the hatching shade, with the two-bit fill pattern signals.

The switching circuit 3127 performs the selection, etc. of the original sheet data X, the font buffer 3126, and the color palette on the basis of the contents of the fill logic signals and the original sheet data X from the switch matrix 3124. The fill logic provides the information for the filling of the background (i.e. the background area of the original sheet) alone with color mesh, the conversion of the specified area into color, masking work and trinuning work, and the painting of the entire area with its demarcation by an outline.

In the IPS according to this invention, the system first performs the END conversion and thereafter the color masking process on the signals read from the original manuscript by means of the IIT as mentioned above. The system then performs the processing of the original sheet sizes, the erasure of frees, and the color conversion, which can be processed more efficiently in full color. Subsequently, the system performs the removal of the undercolors and the generation of black with the operations being narrowed down to those on the process color. However, such processes as space filtering, color conversion, TRC, and size reduction and enlargement are designed to process the data on the process color, so that such processes may work with a smaller amount of processing work than in the case of the processing of the full-color data, with the conversion tables to be used being reduced to one third and yet with their types being proportionately increased, so that the improvements have been attained on the flexibility of the controlling operations, the reproducibility of colors, reproducibility of the chromatic gradation, and the reproducibility of fine details.

(II-2) Hardware construction of image processing system (IPS)

FIGS. (A–C) is a chart illustrating an example of the hardware construction of the IPS.

Figure 17A:
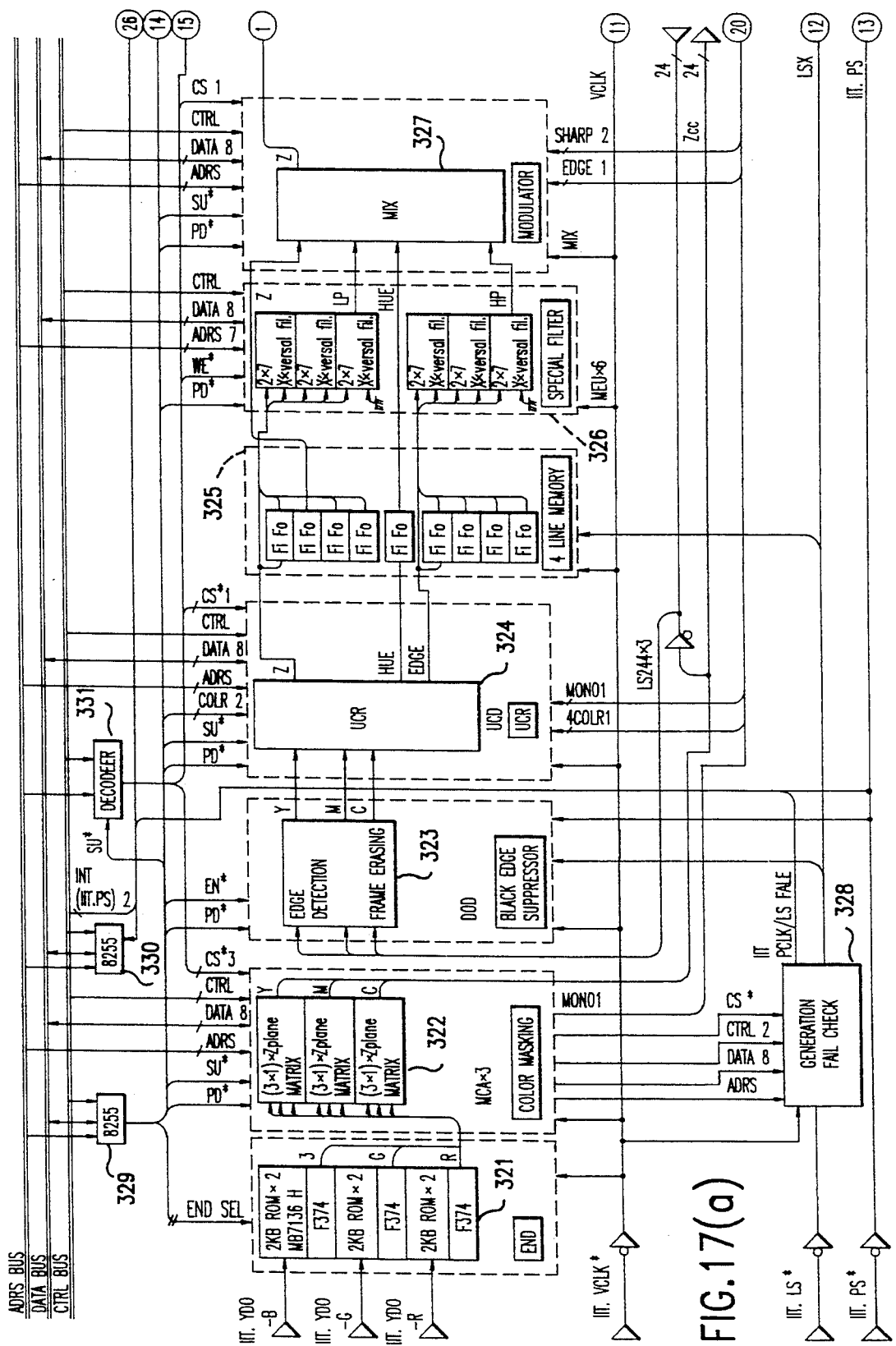
FIGS. 17 (A-D) shows a hardware configuration of the IPS.
Figure 17B:
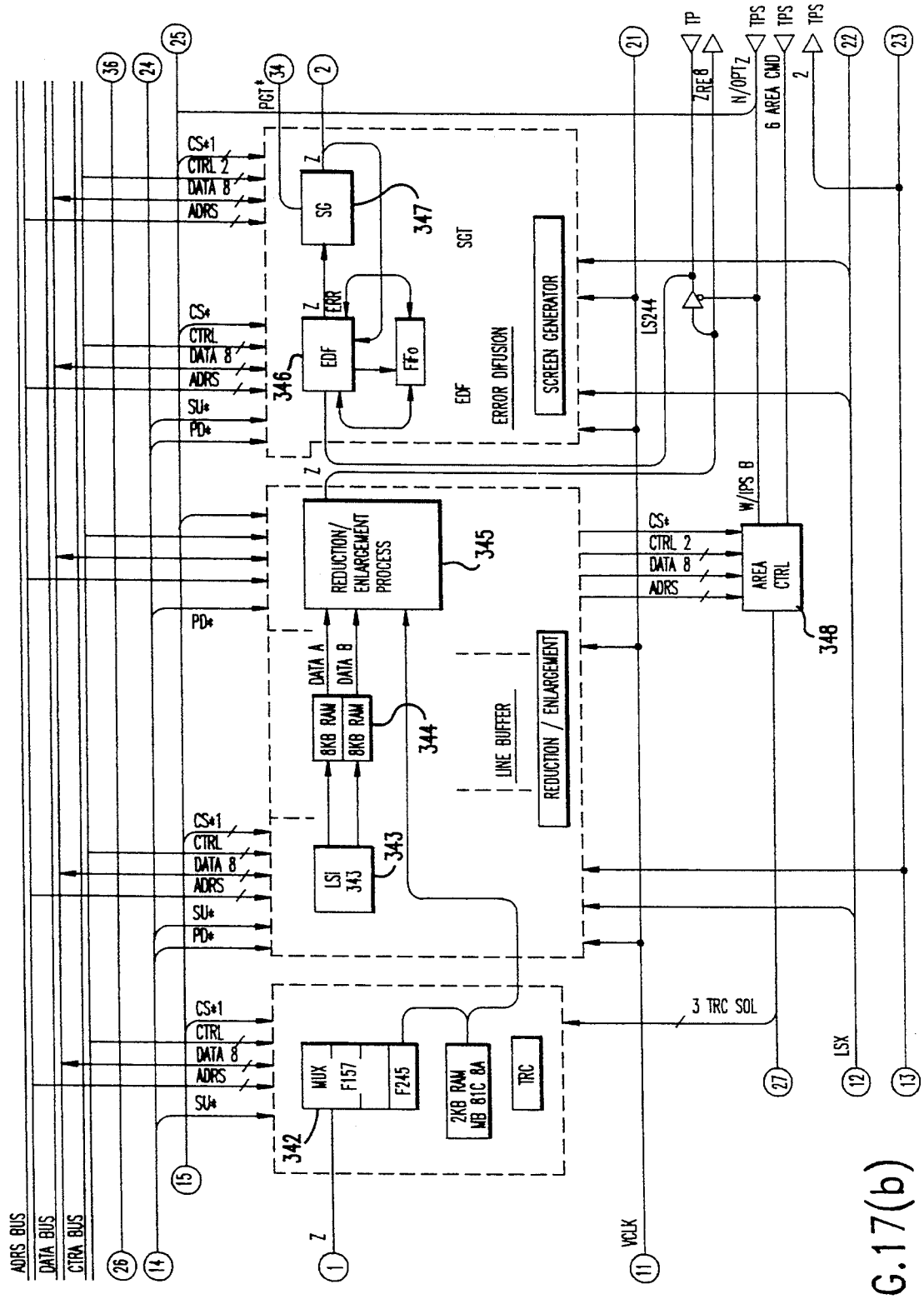
Figure 17C:
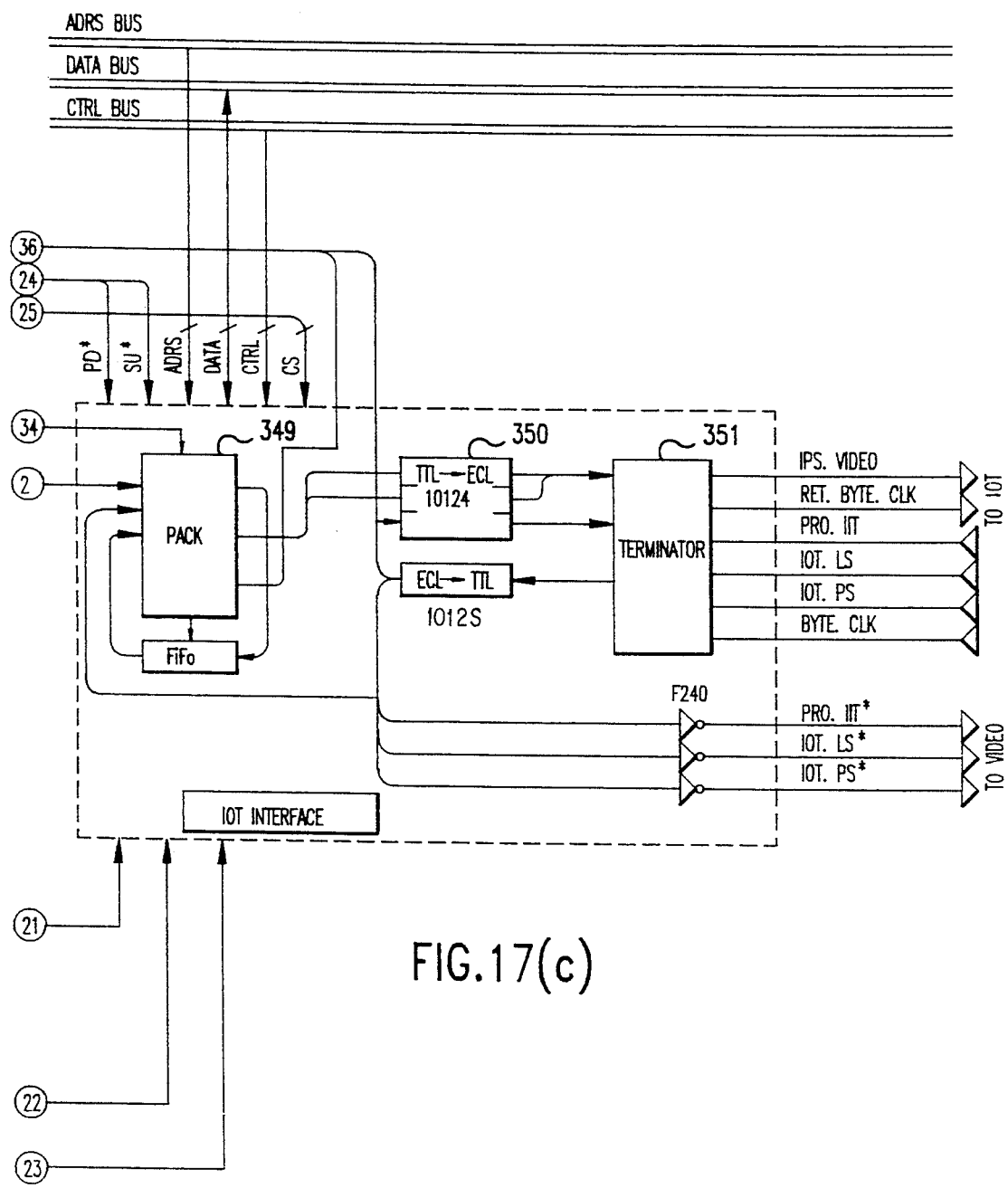

In the IPS according to this invention, the hardware components are mounted on two separate boards (i.e. IPS-A and IPS-B), with the parts performing the basic functions of a color image forming equipment, such as those for achieving the reproducibility of colors, the reproducibility of chromatic gradation, and the reproducibility of details with high precision, being mounted on the first board (IPS-A) and with those parts performing the applied functions and the specialized functions, such as editing, being mounted on the second board (IPS-B). The construction of the former is presented in FIG. 17(a) through (c) while that of the latter is given in FIG. 17(d). Above all, the system will be able to deal flexibly with the applied and specialized functions as required merely with design modifications of the second board, so long as it is capable of satisfactorily performing the basic functions with the first board. It follows from this that any attempt at further enhancing the functions of this system as a color image forming equipment can be accomplished merely by making modifications of the design features of the second board.

To the boards for the IPS are connected CPU buses as shown in FIGS. 17(A–C) (the address bus ADRSBUS, the data bus DATABUS, and the control bus CTRLBUS), and the video data B, G, and R from the IIT, the video clock IIT.VCLK as the synchronizing signal, the line synchronization signals IIT.LS (in the main scanning direction and for the horizontal synchronization), and the page synchronization signals IIT.PS (in the supplementary scanning direction and for vertical synchronization) are thereby connected to the IPS boards.

Now that the video data are processed with a pipe line in the END conversion section and the subsequent parts, there occurs a delay of the data by the clock unit necessary for the processing of the said data at each processing stage. Therefore, it is the line-synchronizing signal generation and failure-check circuit 328 that generates and distributes the horizontal synchronizing signals to deal properly with such delays at each of the individual processing stages and also performs failure-checks on the video clock and the line-synchronizing signals. For this purpose, the line-synchronizing signal generation and failure-check circuit 328 has the video clock IIT.VCLK and the line-synchronizing signal IIT.LS connected thereto, and, additionally, the CPU buses (the ADRSBUS, DATABUS, and CTRLBUS) and the chip-selecting signal CS are connected to the said circuit, so that the internal setting may be rewritten.

The video data B, G, and R from the IIT are input into the ROM 321 of the END conversion section. The END conversion tables may be constructed in such a way as to permit their loading from the CPU as required, for example, with a RAM used therefor, but, since there scarcely arises any necessity of rewriting in the course of the processing of picture images while the equipment is in its operating state, two 2k-byte ROM are employed for each of B, G, and R to provide a LUT (Look Up Table) system composed of these ROM's. And, the system possesses 16 faces of conversion tables, which can be changed over from one to another with the four-bit selecting signal, END Sel.

The output generated from the ROM 321 after the END conversion performed thereon is connected to the color masking section composed of three pieces of the arithmetic operation LSI 322, which has two faces of $3 \times 1$ matrix for each of the colors. To the arithmetic operation LSI 322 are connected the individual buses for the CPU, and these buses make it possible to set the Matrix coefficients with the CPU. To these buses are connected the setup signal SU, which is to be used for the change over from the processing of picture image signals to the CPU buses for such purposes as the rewriting of such signals by the CPU, and the chip selecting signal CS, and one-bit switching signal MONO, which is to be used for switching the selection of the matrix. In addition, the power down signal PD is input, and this signal stops the internal video clock while the IIT is not performing any scanning operation, i.e. while it is not performing any processing of picture images.

Figure 17D:
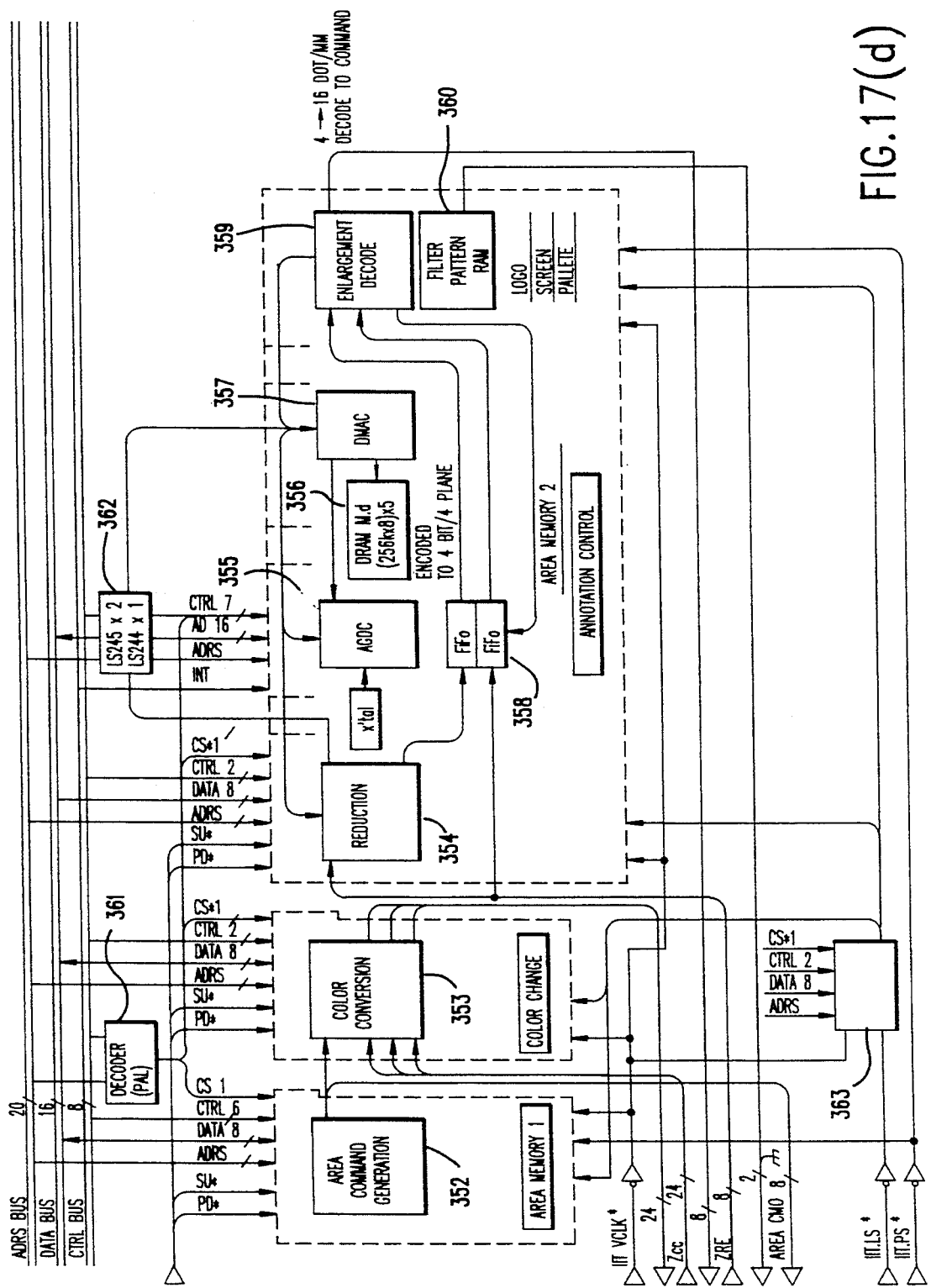
Figure 20A:
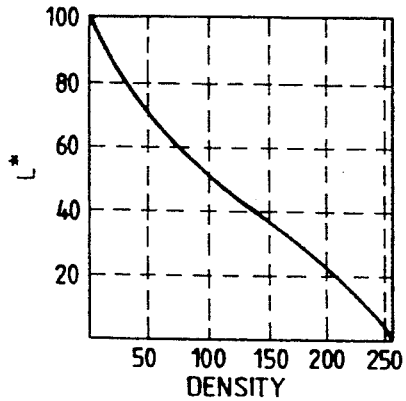
FIGS. 20 (A-D) shows an explanatory diagram for explaining how to form a composite TRC.
Figure 20B:
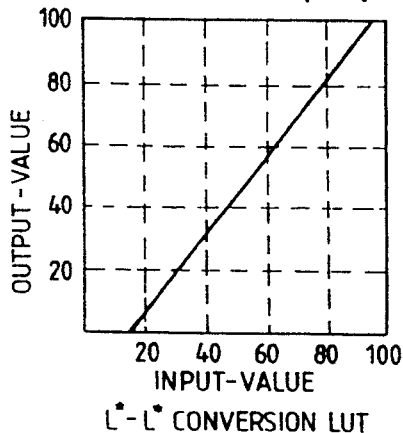
Figure 20C:
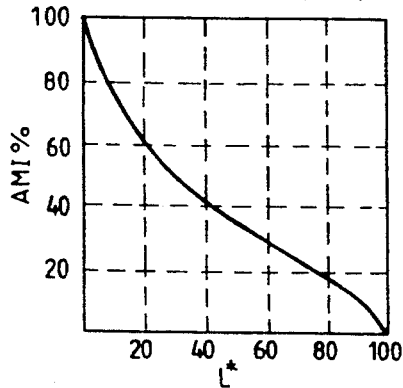
Figure 20D:
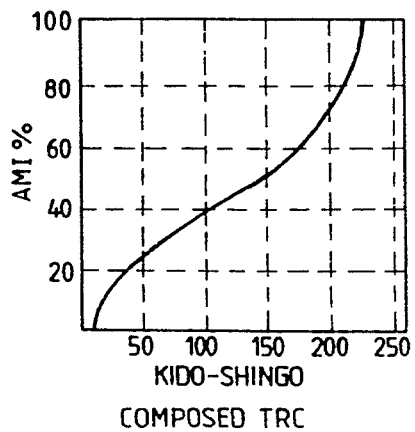

The signals converted from B, G, and R into Y, M, and C are processed for their color conversion through the color conversion LSI 353 on the second board (IPS-B) shown in FIG. 17(d), and the processed signals are then input into the LSI 353 for DOD. The color conversion LSI 353 is provided with four channels of color conversion circuits composed of a threshold register, which sets the colors not to be converted, and a color palette, which sets the colors to be converted, a comparator, and so forth, and the LSI 323 for DOD is provided with an edge detecting circuit, a frame erasing circuit, and so forth for the original sheets.

The output generated from the LSI 323 for DOD after its processing for frame-erasure is transmitted to the LSI 324 for the UCR. This LSI contains the UCR circuit, a black-generating circuit, and additionally those circuits for generating the necessary colors and outputs each of the signals expressing the process color X, which is a signal corresponding to the color of the toner in the copying cycle, the necessary Hue, and the Edge. Accordingly, the COLR signal, which is a two-bit signal for specifying the process color, and also the color mode signals (4COLR and MONO) are input into the LSI.

The line memory 325 is composed of the FIFO, which accumulates the data for four lines in order to input into the $5 \times 7$ digital filter 326 each of the signals on the process color X, the necessary Hue, and the Edge output from the LSI 324 for the UCR, and the FIFO for adjusting the portion of the delay for matching. Here, with respect to the process color X and the Edge, the line memory accumulates the signals for four lines in the FIFO and transmits those for five lines to the digital filter 326, but, with respect to the necessary color Hue, the system is so designed as to provide delay to the signal on the necessary hue in the FIFO, so that the signal may be put into its synchronization with the output from the digital filter 326, and then to transmit the signal to the LSI 327 for the MIX.

The digital filter 326 comprises two sets (the low pass filter LP and the high pass filter HP) of 5×7 filters composed of three LSI's for the 2×7 filter, and the digital filter 326 performs the processing operations in respect of the process color X with one of the sets of filters mentioned above and performs the processing operations in respect of the Edge with the other set of filters. The LSI 327 for the MIX performs such processes as the removal of mesh dots and the emphasis of the edges on these outputs with reference to the conversion tables and then the resultant data are mixed into the signal on the process color X. Here, EDGE and Sharp are input as the signals for the change over of the conversion tables.

The TRC 342 is composed of 2k-byte RAM provided with eight faces of conversion tables, which are structured in such a way as to accept the rewriting thereof by the use of the carriage return period before each scanning operation and are changed over by the switching signal TRC Sel. And, the processing output from this unit is transmitted by a transceiver to the LSI 345 for reduction and enlargement processes. The reduction and enlargement processing section is constructed in the form of a Ping-Pong buffer (line buffer) with two pieces of 8k-byte RAM 344, and the LSI 343 performs the generation of the resampling pitch and the generation of the address for the line buffer.

The output from the reduction and enlargement processing section returns to the LSI 346 for the EDF by way of the area memory section on the second board on FIG. 17(d). The LSI 346 for the EDF is provided with the FIFO for storing the information for the preceding line and performs the error dispersion process with the information on the preceding line. And, the signal X obtained after the performance of the error dispersion process is output to the IOT interface by way of the LSI 347 for SG, which forms the screen generator.

The IOT interface transmits the signals input into it from the LSI 347 for SG in one-bit ON/OFF signals in parallel to the IOT, putting the signals together into eight bits by means of the LSI 349.

Since data actually flowing on the second board shown in FIGS. 17(A–C) are for 16 dots/mm, the data are reduced to ¼th and also converted into binary values by the reduction LSI 354 and then stored in the area memory. The enlargement decoding LSI 359 is provided with the filter pattern RAM 360, and this LSI reads the area information from the area memory and enlarges the data to 16 dots/mm when it generates a command therefrom, and then this LSI performs the processing operations for the generation of the logogram address, the color palette, and the fill patterns. The DRAM 356, which is composed of four faces, stores the coded four-bit area information. The AGDC 355 is a controller for its exclusive use for controlling the area command.

(III) MONO COLOR IMAGE OUTPUT SYSTEM

(III-1) General

A mono color mode in a copying machine is an operation mode to express a color original (polychromatic original) by a color (mono color) as specified. In the mode, the IIT gathers visual information containing value $L^*$, chroma $a^*$, and $b^*$, and the like. The IOT expresses an original image in terms of the value and chroma information.

To see a color original in the version of a monochromatic original is equivalent to perceive it in terms of brightness. To express it in a mono color is to express it in terms of value and chroma, viz., color difference. For the outputting of a mono color image, correspondence between a brightness of the original and a color difference of the mono color will determine parameters in the mono color mode.

The fact that an image reproduced in the terms of the mono color is observed through the brightness, indicates that range of value information $L^*$ in the input section is linearly compressed so as to correspond to that in the output section. In the output section, value information $L^*$ is linearly related to color difference $\Delta E$. Therefore, a good mono color image can be reproduced, if a gradation property of the value information $L^*$ in the input section is linearly compressed so as to correspond to the gradation property of the color difference $\Delta E$ in the output side.

(III-2) Processing

FIG. 18 shows an explanatory diagram for explaining a mono color image output processing of the IPS (image processor). FIG. 19 shows a relationship between value information and color difference. FIG. 20 shows an explanatory diagram for explaining an example of forming a composite TRC (tone reproduction control).

In the IPS, a mono color image output processing is carried out by a luminance sign&l generating section 382 and a TRC 383, as shown FIG. 18. The luminance signal generation section 382 includes an END (equivalent neutral density) (LUT (look-up table)) for converting B, G and R signals that are read in terms of density by the IIT 381, into system values, and a color masking (CC matrix) for generating luminance signals using the B, G, and R signals of system values.

Reflectivity may be used for the system value. In this case, the LUT of the END is a reflectivity conversion table containing a reverse function of a logarithmic function. The matrix for the color masking is for producing values Y on the basis of the B, G and R signals. Accordingly, for a value signal $RL^*$, the following relation holds $$RL^* = \alpha Eb + \beta Eg + \gamma Er.$$

By coefficients $\alpha$, $\beta$, and $\gamma$ satisfying the above relation, a matrix is determined.

The TRC (tone reproduction control) 383 basically consists of a luminance signal—$L^*$ conversion LUT and $L^*$—mesh % conversion LUT. The $L^*$—mesh % conversion LUT linearly compresses the value information $L^*$ in the input section 0 to 100% so as to correspond to the color difference in the output section $\Delta E$min (white paper state) to $\Delta E$max (mesh 100% state). Use of only the data of this table provides a reproduced image looking uncontrasted, with a high density portion being thin and with a high light portion being foggy. This arises from the fact that if a range of the value information L*, (2) the IIT has its own 0-point reference in low densities, and defaces an area having higher density than a preset density in high densities, and the like.

For the above reason, it is practical that the input value information L*min to L*max of an original are made to correspond to the output color difference ΔEmin to ΔEmax. More exactly, as shown in FIG. 19, the value information L*min is set at about 13.0, and the L*max at about 95.0. This range corresponds to a range of coating paper from white paper state to black painted state, and the range depends on the characteristics of IIT 381 and IOT 384, input original, paper, etc. Hence, the range varies depending on those factors, as a matter of course. An L*—L* conversion LUT may be enumerated for the conversion table prepared for such a practical range. This table, in which the low and high portions are saturated, is put between the luminance signal—L* LUT and L*—mesh % LUT. In such a mono color image output system, dark color having low value information cannot be expressed, even in a black painted state. Consequently, a copied image looks fuzzy. Increase of the contrast of the image can be realized by reducing the range between the value information L*min to L*max. Where the increase of the contrast is excessive, a single TRC regulates all of the colors. Accordingly, in such a mono color as to reproduce colors up to a color of satisfactorily low value information L*, such as K and B, a high density portion of the image is defaced. For this reason, the L*—L* LUT and L* —mesh % LUT are preferably provided for each color.

As seen from the above description, for the output processing of a mono color image by using the IPS arranged shown in FIG. 15, the matrix of the color masking 302 is used, and the parameters of the TRC 307 are modified. In this mode, a luminance signal generating matrix is used in the color masking 302. This matrix generates luminance signals equally divided densities containing only value information of an input original from the B, G and R signals derived from the END 301. To set up the matrix, α, γ and β satisfying the following equation are obtained $$El^* = \alpha Eb + \beta Eg + \gamma Er.$$

where Eb, Eg, and Er are the B, G, and R signals (density) after passing through the END 301, and EL* is a luminance. Generally, however, α, γ, and β satisfying the above equation do not exist, although those factors exist in the equation based on the reflectivity. Therefore, it is necessary to obtain optimum α, γ, and β by using the method of least squares, for example. However, there is no noticeable difference between the picture qualities of the reproduced images by the instant equation and by the equation using the reflectivity. Let us calculate the α, γ, and β by recurring the B, G, and R signals after passing through the END by the equally divided density luminance data as predicted on the basis of the value information L* in the input original and the method of least squares. Then, we have $(\alpha) = 0.03$ $(\beta) = 0.65$ $(\gamma) = 0.32.$ The TRC 307 is a composite TRC as formed by composing (1) density—L* conversion LUT (a) of FIG. 20, (2) L*—L* conversion LUT ((b)), and (3) L*—mesh % converting LUT ((d)), as shown in FIG. 20. The density—L* conversion LUT of (1) is a table for converting the equally divided density signal as generated by the luminance signal generating matrix into input value information L*. The L*—L* conversion LUT of (2) is a table for adjusting the contrast of an entire image by saturating the low and high value parts of the input value information L* (e.g., $10 < L^* < 95$). The L*—mesh % converting LUT of (3) is a table for converting the input value information L* into mesh %, and is formed by recurring the value information L* of 0 to 100 and the mesh % equally dividing Δ E in the output section. This, in the instance, to make the input value information L* to linearly correspond to the output color difference ΔE, the contrast of the entire image is adjusted by using the density—L* conversion LUT of (1). If required, poor contrast can be removed by making the input value information L* to nonlinearly correspond to the output color difference ΔE.

(III-3) TRC

Figure 1:
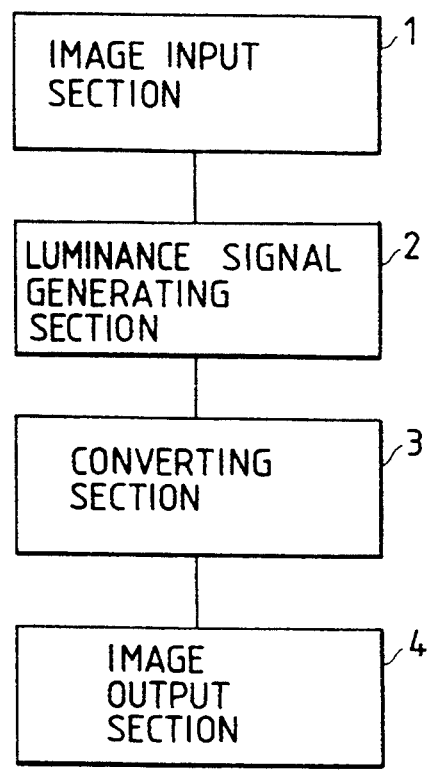
FIG. 1 is a block diagram showing a configuration of a mono color image output system according to an embodiment of the present invention.
Figure 21:
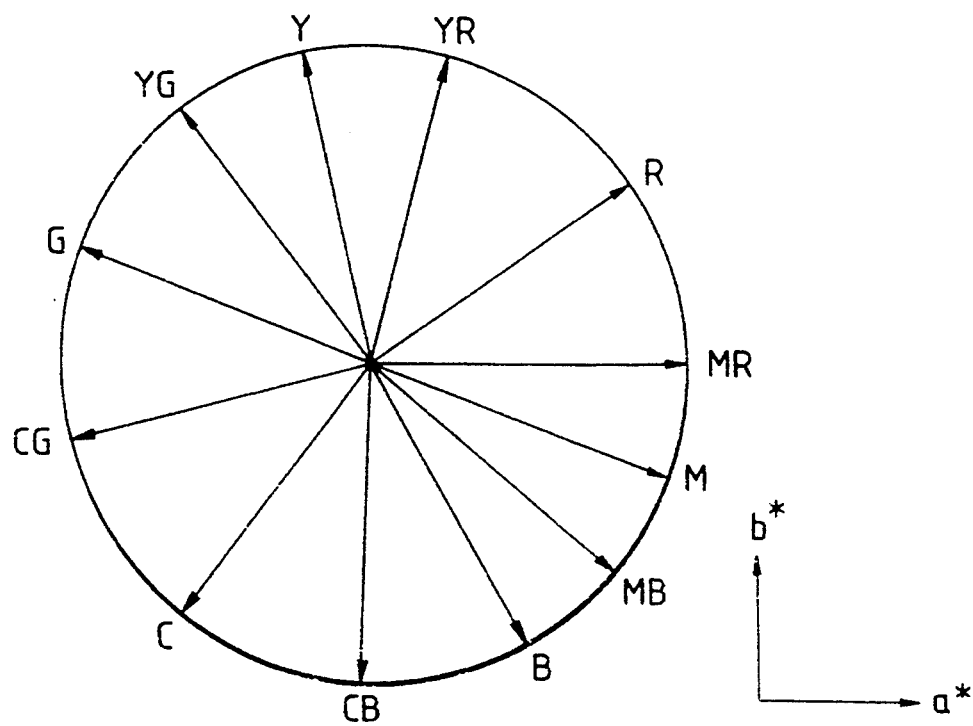
FIG. 21 shows an explanatory diagram for explaining correspondence between mixing ratios of recording signals of coloring materials and a tone ring.

FIG. 21 are explanatory diagrams showing relationship between mixing ratios of recording signals of coloring materials and a tone.

As described above, the TRC is obtained as a composite table composed of the density—L* conversion LUT, L*—L* conversion LUT, and L*—mesh % converting LUT. If required, a single TRC may be used for the mono color. Firstly, an average TRC of major seven colors of Y, M, K, B, G and R, for example, is obtained. If required, TRCs may be differently provided for those colors. Then, by using this TRC, the secondary primary colors of B(M+C), G(Y+C), and R(M+Y) as neutral tints of colors Y, M, and C. Further, Y, M, and C are mixed at ratio of 100:50, to form neutral tints of six primary colors. With six primary colors of Y, M, C. B, G, and R, if mixing ratios are selected so as to equally divide a tone ring on which those primary colors are arrayed side by side (the tone angle may be used for a tone criterion), then six neutral tints can be formed in connection with the six primary colors. Those optimum mixing ratios are averaged and the resultant mean mixing ratio is applied for all of the six colors. If so, a single mixing ratio may be used for those colors. The ratio 100:50 approximates to the mean mixing ratio that results from averaging the optimum mixing ratios. A diagram showing the primary colors and neutral tints thus obtained is shown in FIG. 21. In this way, mono color images of major seven colors and six neutral tints can be formed and output by using a single TRC and two mixing ratios.

Where the fixed mixing ratios are applied for the different colors, reproduced images of some type of originals lack halftone and are weak in contrast. To avoid this, the mixing ratios may be varied in accordance with the type of original copied. For other originals than the original whose half tone portion is important, optimum mixing ratios maybe differently used for the six colors or the mixing ratio may be fixed at 100:50. In picture originals, attempt to improve the picture quality by emphasizing the contrast results in defacing the high density portion. To cope with this problem, the mixing ratio may be changed to 100:60. Alternatively, it is set at 100:60 for YG and YR and at 100:50 for others. Those mixing ratios sometimes change depending on the IOT, and the characteristics of coloring materials. In colors having not enough absolute density, such as YG and YR, the reproduced image suffers from skipped half tone or little contrast. This problem can be solved in a manner that the balanced tone of the TRC is adjusted to change the mixing ratios or the tone of the TRC is set to emphasize the contrast.

(III-4) Mono Color Outputting by Designated Colors

As described above, for the outputting of the mono color image of the primary colors or their neutral tints, the mixing ratio can be fixed to 1:1, 100:50, or the like. Another method to designate colors that is feasible is that a color to be designated color is read from an original by the IIT, and a mixing ratio is determined on the basis of the read signal.

Figure 22:
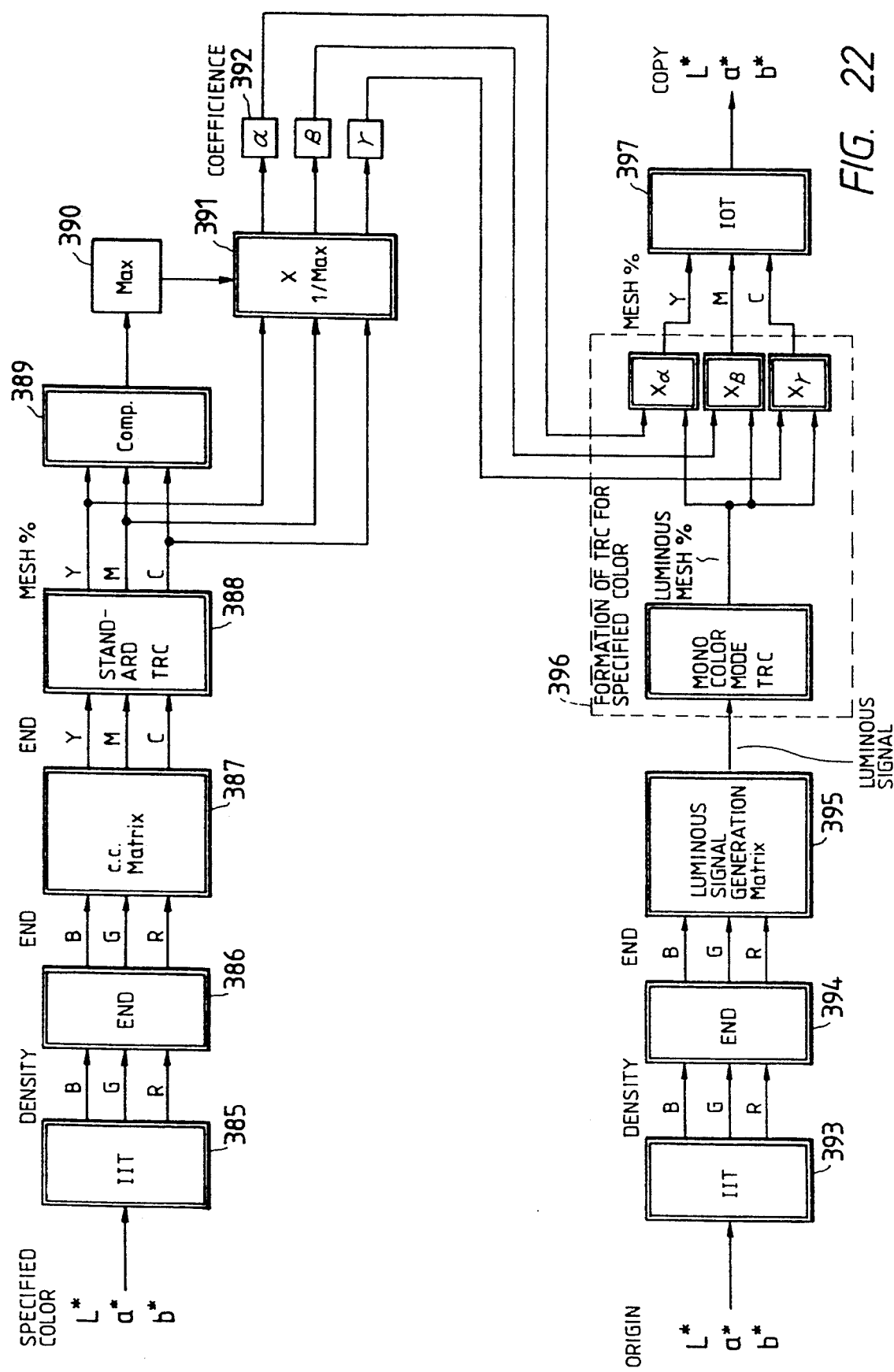
FIG. 22 shows a block diagram for explaining a method of extracting mixing ratios after the TRC processing.
Figure 23:
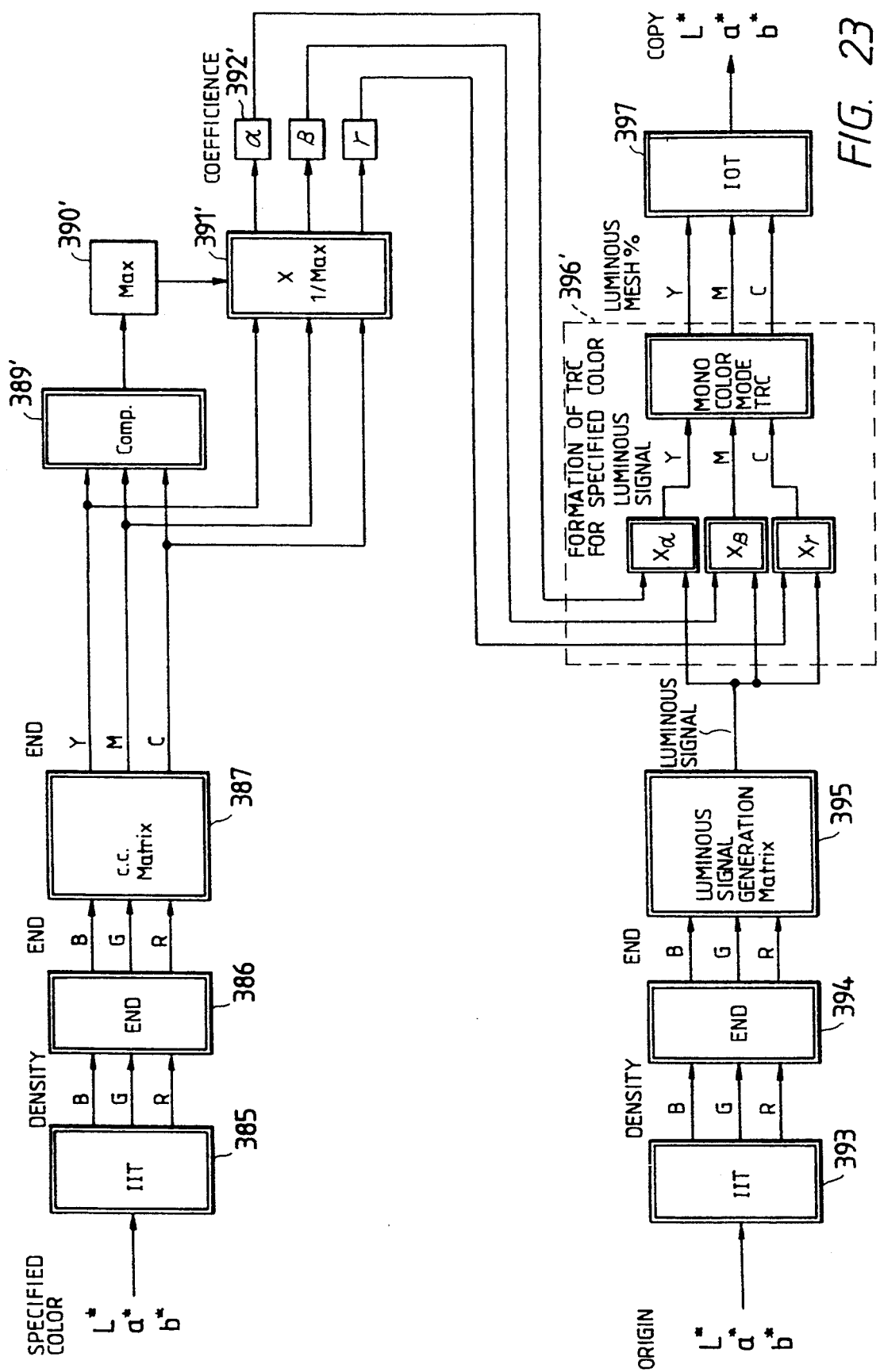
FIG. 23 shows a block diagram for explaining a method of extracting mixing ratios after the CC processing.

FIG. 22 shows a block diagram for explaining a method to extract a mixing ratio after the TRC processing. FIG. 23 shows a block diagram for explaining a method to extract a mixing ratio after the CC processing.

In FIG. 22, an IIT 385, END 386, CC 387, standard TRC 388, comparator 389, and a calculating unit 391 make up a system for extracting a mixing ratio of a designated color. An IIT 385, an END 386, and a luminance signal generatar 395 make up an original data processing system. A designated color TRC generator 396 serves as a system for executing the processing based on the mixing ratio. In this method, after the B, G and R signals in an area on an original as designated by a density are passed through the END 386, CC 387, and TRC 388, ratios of the Y, M and C mesh % are extracted. In this case, accordingly, the designated mono color is output, with involvement of factors of the mixing ratios in the mesh % of Y, M and C derived from the designated color TRC generator 396.

In the method of extracting a mixing ratio of the designated ratio, the Y, M, and C mesh % output from the standard TRC 388 are applied to the comparator 389. In the comparator, those mesh % are compared to provide a maximum value Max 390. In the calculator 391, each mesh % of Y, M and C is divided by the maximum value Max 390, thereby to obtain coefficients $\alpha$, $\beta$, and $\gamma$. Those coefficients are subjected to multiplications in the designated color TRC generator 396. This extracting processing is carried out through the prescan of color detection. If the maximum value Max 390 is set at the upper limit 255 of the gray level irrespective of the output signal of the comparator 390, the color density in the designated area, as a maximum density, is reflected on the mono color original.

In the former case, if the mesh % of Y, M and C in the designated area are set at 102, 51, and 51, respectively, the $\alpha$, $\beta$, and $\gamma$ are 2/102, 51/102, and 51/102, or 1.0, 0.5 and 0.5. When the luminance mesh % of the original is 102, 51, and 51 of the Y, M and C mesh % are straightforwardly output. In the latter case, if the maximum value Max is 255, the $\alpha$, $\beta$, and $\gamma$ are 2/255, 51/255, and 51/255, or 0.4, 0.2 and 0.2. When the luminance mesh % is 255, a mono color having the same tone as that in the designated area of the original is output at the Y, M and C mesh % of the 102, 51, and 51. In this case, if a character is at the mesh % of 255 on an original, it can be output in the form of a character of a tint mono color as designated.

A mixing ratio extracting method shown in FIG. 23 is to extract mixing ratios of Y, M and C luminance signals after the R, B and G signals in an area on an original as designated on the basis of density. In this method, accordingly, a mono color image of the designated color is output by reflecting the ratios in the output Y, M and C luminance signals. Also in this method, the maximum value Max of the Y, M and C luminance signals is obtained by comparing the luminance signals output from the CC matrix in the comparator. The coefficients $\alpha$, $\beta$, and $\gamma$ are obtained by dividing the luminance signals of Y, M and C by the maximum value Max. The coefficients thus obtained is multiplied by the Y, M, and C luminance signals in the designated color TRC generating block. If the maximum value Max is set at 255 as the upper limit of the gray level, as in the above case, a color density in the designated area, as a maximum density, is reflected on the mono color original.

(III-5) Circuit Arrangement

A specific arrangement of the circuit for outputting a mono color image will be described.

(A) END Conversion

Figure 24:
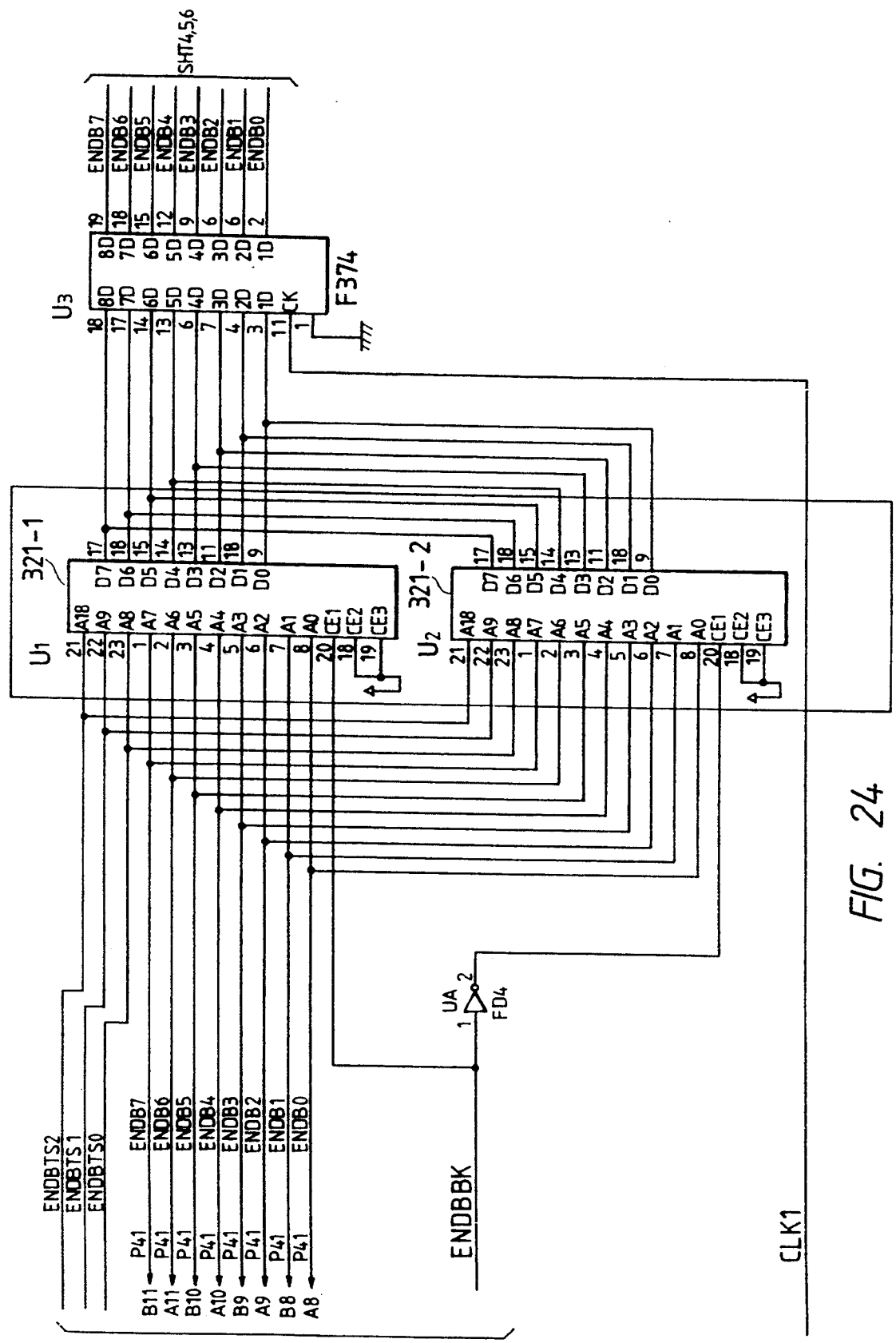
FIG. 24 is a configuration of an END conversion board.
Figure 25:
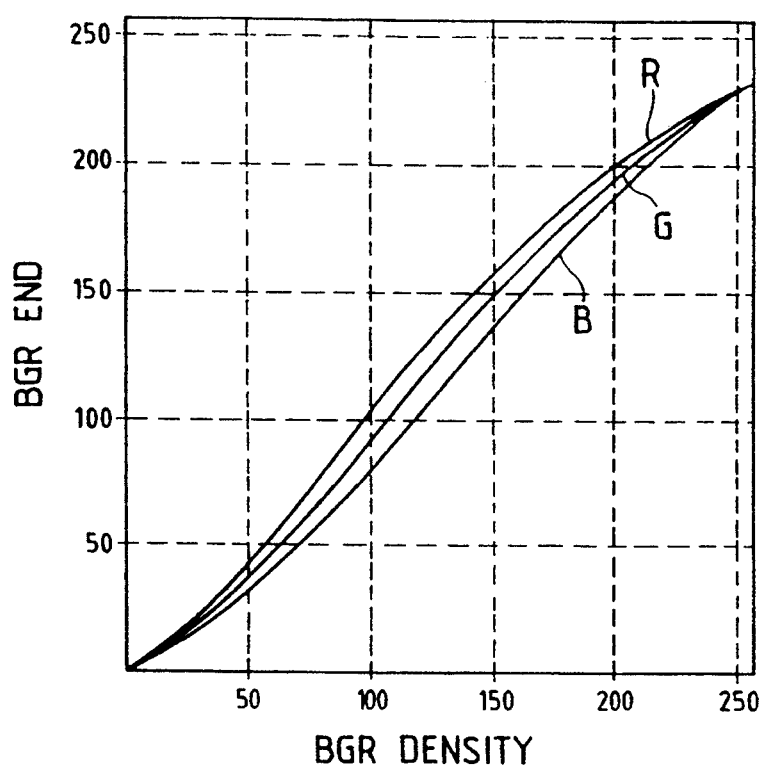
FIG. 25 is a graph showing END conversion curves.

A circuit arrangement of an END converting substrate is shown in FIG. 24. END conversion curves are illustrated in FIG. 25, by way of example.

The circuit arrangement of the END converting substrate shown in FIG. 24 is for one of the separated color signals R, G, and B. The circuit contains two ROMs each of 2 kB denoted as 321-1 and 321-2 and a buffer F374. Each ROM contains 8 planes each containing conversion data of 256×8 bits based on the END conversion curves as shown in FIG. 25. A total of 16 planes are provided for the two ROMs 321-1 and 321-2. One of those planes is selected by a signal select signal ENDsel of four bits. With an address of 8-bit input data, the conversion data of 8 bits is read out, and output through the buffer F374.

For storing the conversion data, 15 planes are provided: 3 planes for normal copy (character, printing and mixture of those), photograph, and generation copy, 11 planes for film projector, and 1 plane for spare. According to any of copy modes, the select signal ENDsel is generated by a CPU. By passing the signals through the ROM 321-1 and 321-2, the values of the separated color signals of B, G and R are equal to one another for a gray original.

(B) Algorithm for Generating TRC Conversion Tables

Figure 28:
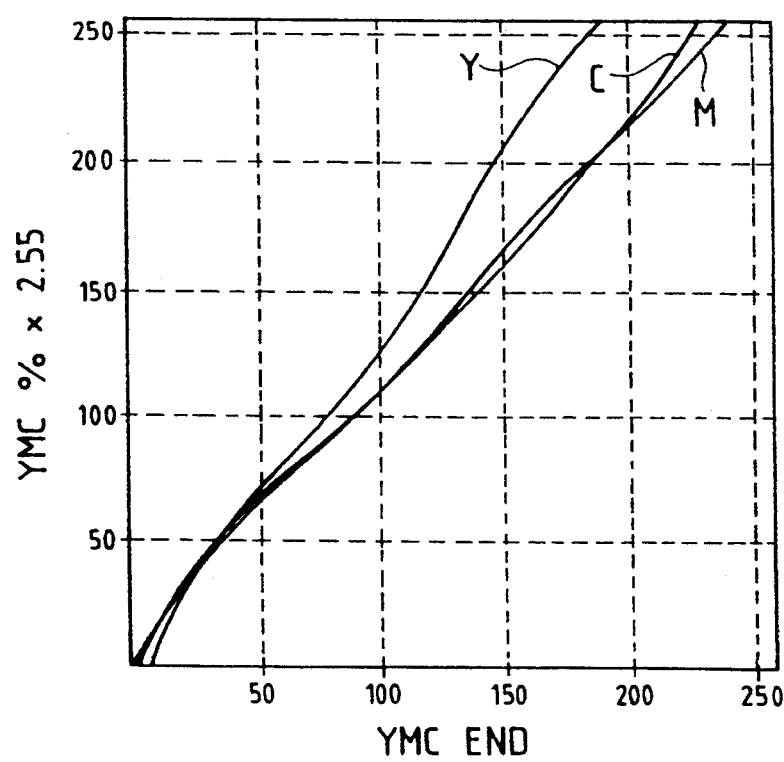
FIG. 28 is a graph showing typical TRC curves.
Figure 27:
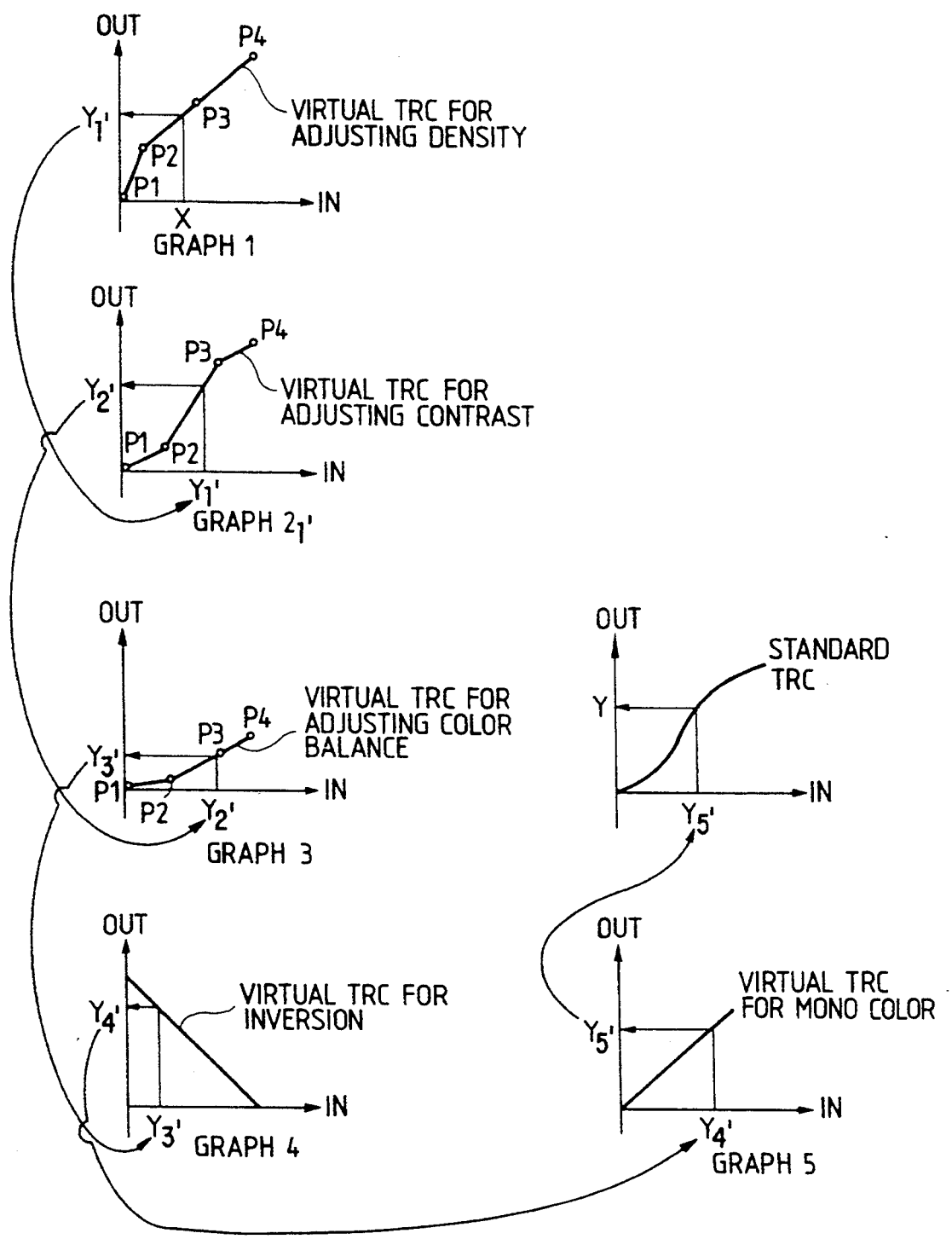
FIG. 27 is a diagram for explaining a process to prepare a TRC conversion table.

FIG. 26 shows a basic algorithm for generating TRC conversion tables. FIG. 27 is explanatory diagrams showing how to prepare TRC conversion tables. FIG. 28 is a graph showing exemplary TRC curves.

The TRC adjusts density, contrast and color balance by using the LUT conversion tables. The CPU contains TRC curves and the coordinates data for polygonal line approximation. Using these curves, the TRC curves are generated and written into the RAM of the LUT type. The polygonal approximation data consists of the data corresponding to four X-coordinates, 0, x1, x2, and 255 as shown in graph 1 of FIG. 26. These items of data are read out from the date memory, and by using the read data, the Y-coordinates of 0 to 255 corresponding to the X-coordinates are obtained. The values of the Y-coordinates are converted by a standard TRC curve (graph 2). The converted values are written into the LUT RAM.

Using the polygonal line approximation data consisting of 0, x1, x2 and 255, the conversion characteristics can be set in three regions, bright, dark and medium. Accordingly, desired TRC conversion tables can be generated by using a less number of data points. The number of data points may be more than 4. If it is set at about 10, more exact approximation curves may be obtained.

The polygonal line approximation data comes in varieties; density control data, contrast control data, color balance control data, data for the inversion, and data for mono color. Description will be given how to obtain the data to be written into a storage location at address X of the LUT. An OUT value Y1' corresponding to an IN value X is obtained using a predictive TRC curve for density control (FIG. 4(a)) which is a graphical representation of the polygonal line approximation data for density control. Then, an OUT value Y2' is obtained on the basis of the OUT value Y1' by using a predictive TRC curve for contrast control (FIG. 27(b)) which is a graphical representation of the polygonal line approximation data for contrast control. Subsequently, a similar process is repeated using predictive TRC curves (FIGS. 27(c) to 27(e)), thereby to obtain a value Y5'. Using this value Y5' as an IN value of standard TRC shown in FIG. 27, an OUT value Y is read out. This value Y corresponds to the value X. The CPU writes the value Y into the LUT using the value X as an address. The above polygonal approximation data contains different items of data which correspond to the toner signals Y, M and C, and the types of images, photograph, character, and photograph/character. A total of eight TRC curves, one normal TRC curve and seven TRC curves for the every-area control, are generated for each toner signal and stored into the LUT. In the full color copy mode, if at the time of carriage return, the TRC curve of its toner signal is written into the LUT, the writing of eight TRC curves suffices. If such TRC writing is not carried out every carriage return, 32 TRC curves must be written into the LUT at the time of copy start. An example of TRC conversion curves expressed in 256 gray levels is illustrated in FIG. 28.

(C) TRC Circuit

Figure 29:
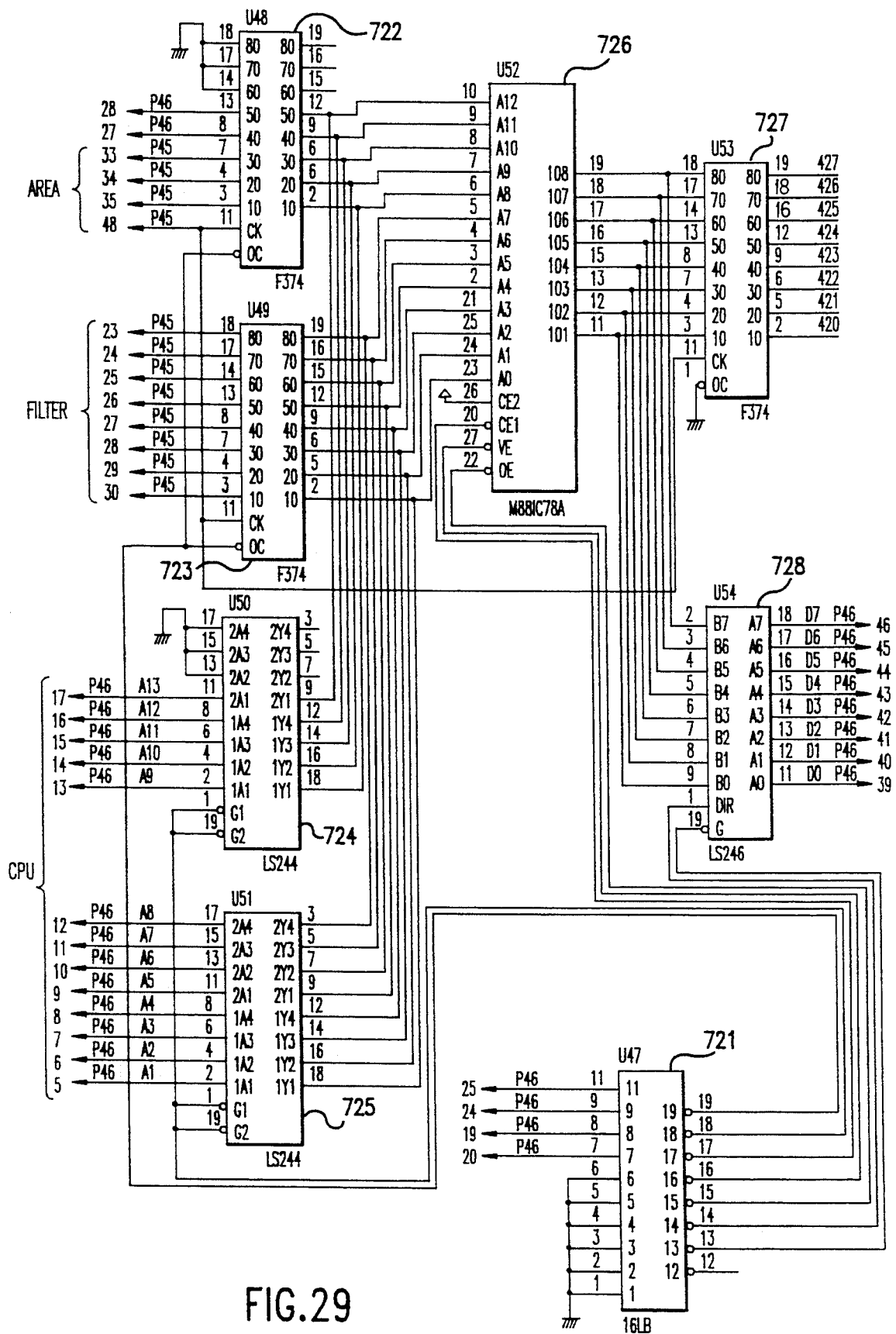
FIG. 29 shows an arrangement of a TRC circuit using LSIs.

FIG. 29 shows a specific arrangement of the TRC circuit constructed with LSIs. In FIG. 29, a latch circuit 722 latches a 5-bit area signal. A latch 723 latches image data of 8 bits. Buffers 724 and 725 holds the address signals of the CPU. A decoder (PAL) 721 decodes a control signal. A RAM 726 is a memory for storing TRC curves. Its output data is outputted through a latch 727. Data read/write for the RAM by the CPU is performed through a bidirectional data bus controller 728. With such an arrangement, in a normal mode for processing image data, the TRC curves stored in the RAM 726 are switched by an area signal, and the image data latched in the latch 723 is converted and is outputted from the latch 727. In an access mode of the CPU, the TRC curve selection and the addressing are performed through the buffers 724 and 725. The read/write control is performed through the decoder 721. The data read/write operation by the CPU for the RAM 726 is performed through the bidirectional data bus controller 728.

In place of storing 256 bytes/color of the standard TRC in the ROM, an alternative is allowed in which only the coefficients of polynomial of higher degree approximating it are stored, and in actual use, the CPU generates the TRC curve using the coefficients stored. The alternative can reduce the necessary memory capacity, and provides an easy alteration of the standard TRC curve.

(D) Color Masking Circuit

Figure 30:
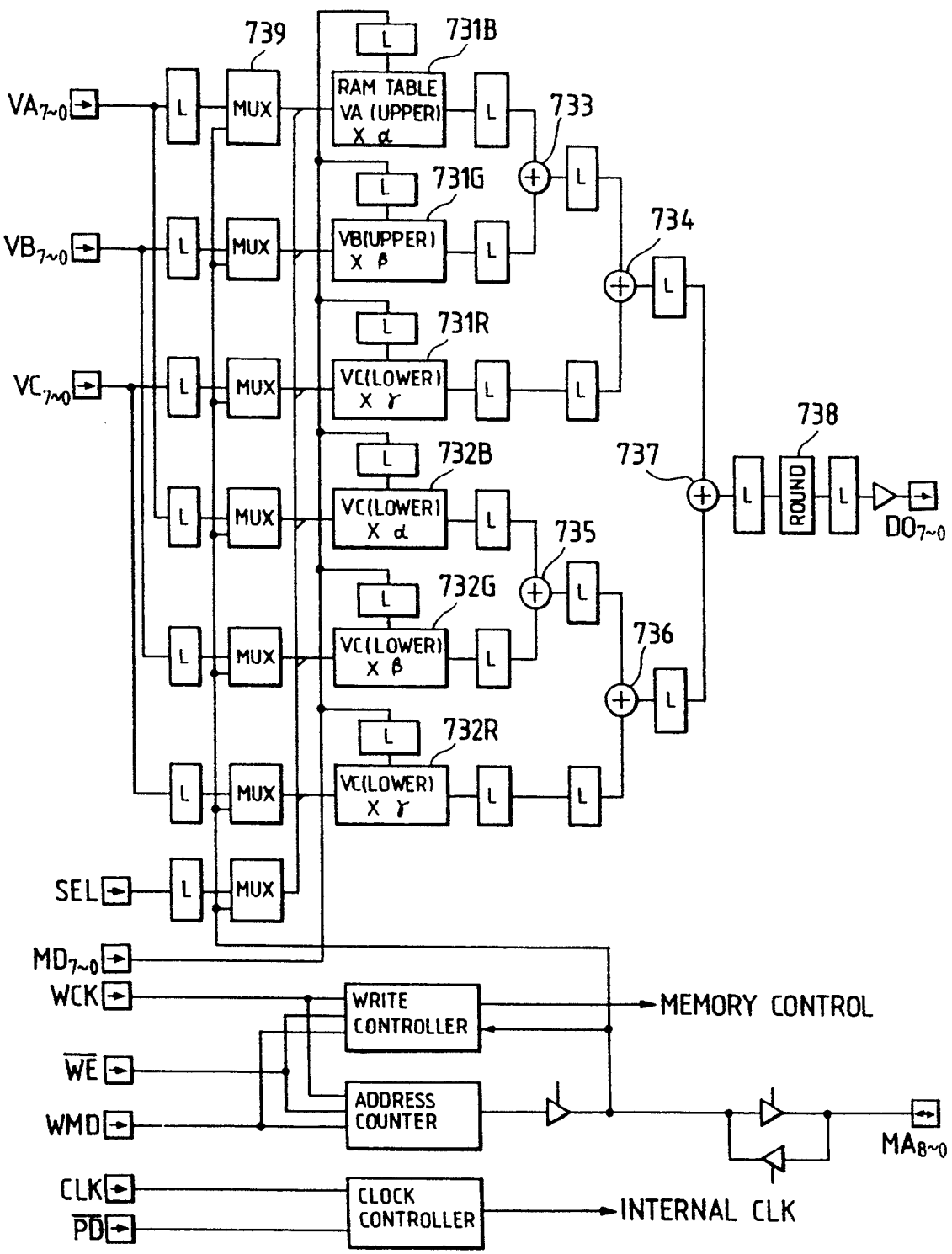
FIG. 30 shows a block diagram showing a color masking circuit.

FIG. 30 shows an arrangement of the color masking circuit.

Figure 31:
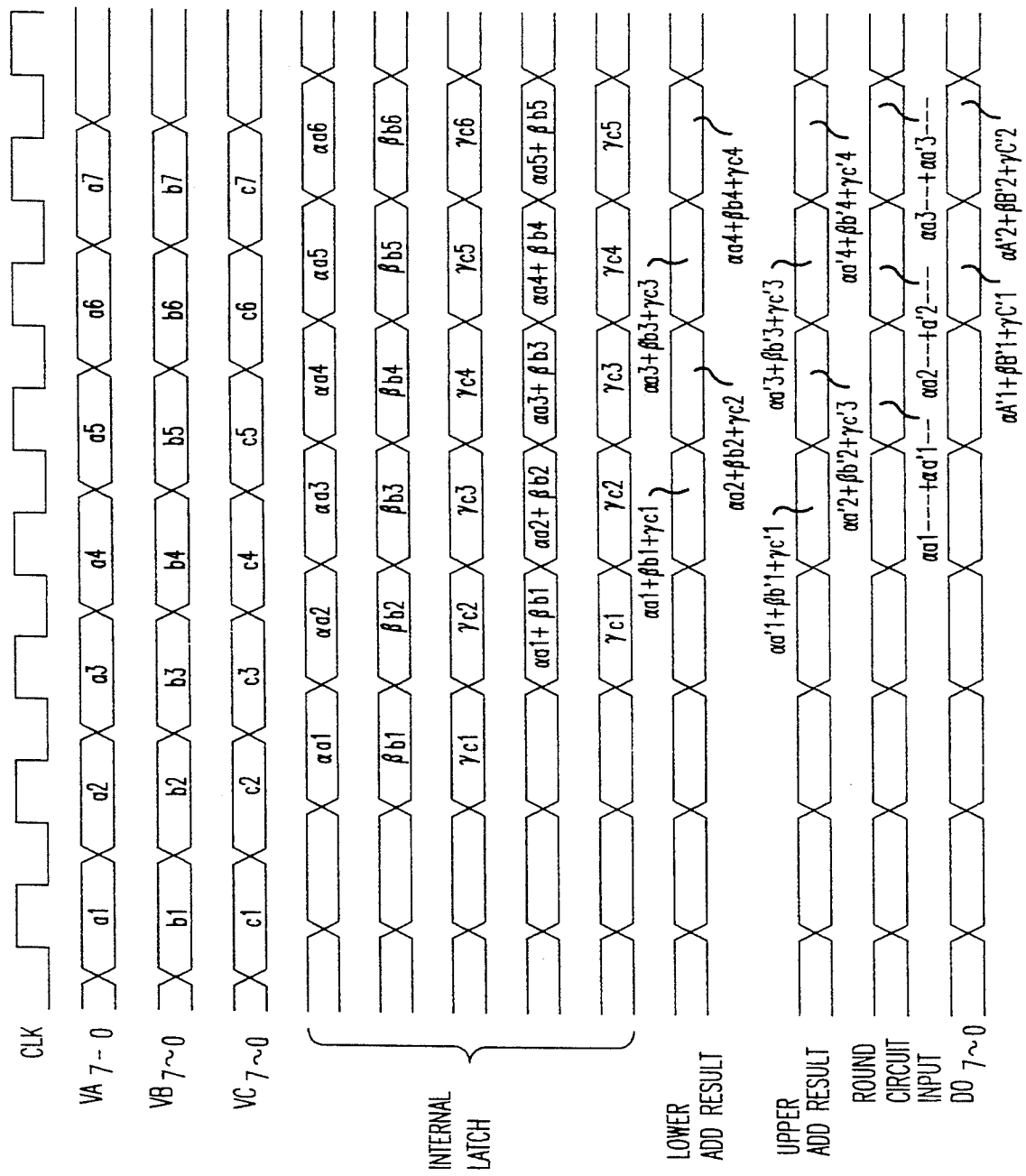
FIG. 31 shows a timing chart of an internal operation by the pipeline system.

The color masking circuit of the present invention is provided with RAM tables (LUT) of the upper 4 bits and the lower 4 bits for recording the separated color signals B, G and R of 8 bits. The addition of the values read out from these RAM generates the toner signals Y, M and C from the separated color signals B, G and R. The circuit arrangement for one color is illustrated in FIG. 30. The RAM table 731B is addressed by the upper four bits of the separated color signal B; The RAM table 731B, by the upper four bits of the separated color signal G; The RAM table 731R, by the upper four bits of the separated color signal R. An adder 733 adds together the values read out of the RAM tables 731B and 731G. An adder 734 adds together the output value of the adder 733 and the value read out of the RAM table 31R. The RAM table 732B is addressed by the lower four bits of the separated color signal B; The RAM table 732G, the lower four bits of the separated color signal G; The RAM table 732R, the lower four bits of the separated color signal R. The values read out of those RAM tables 732B, 732G, and 732R are added by adders 735 and 736. An adder 737 address the sum obtained from the upper four bits and the sum obtained from the lower four bits. The result of the addition by the adder 737 is applied to a round circuit 738. In the round circuit 738, the 13-bit data in the internal calculation are rounded into an 8-bit data. The rounded 8-bit data is outputted as a toner signal Y, for example. Like circuits are provided for the remaining toner signals M and C. Usually, the RAM table contains two planes, one for full color and the other for mono color. A timing chart of the internal calculation of the pipeline type is shown in FIG. 31. The data expression for the internal calculation is illustrated in FIG. 32.

The timing chart shown in FIG. 31 describes the following pipeline processings. Description will be given on the pipeline processings of input data a1, b1 and c1. The low-order bits data a1, b1 and c1 are read out of the RAM tables 732B, 732G and 732R. These are added by the adder 735, and the addition result a1+b1 is latched. At the next clock, the adder 736 calculates to produce a1+b1+c1 (addition result of the high-order bits), and the addition result is latched. At the same time, the adder 734 calculates to produce a1'+b1'+c1' (addition result of the low-order bits), and the result is latched. At the next step, the adder 737 operates to produce a1+b1+c1+a1+b1+c1' (input to the round circuit). The round circuit 738 rounds this value, and is outputted as the output data A1+B1+C1 of the color masking circuit.

Figure 32:
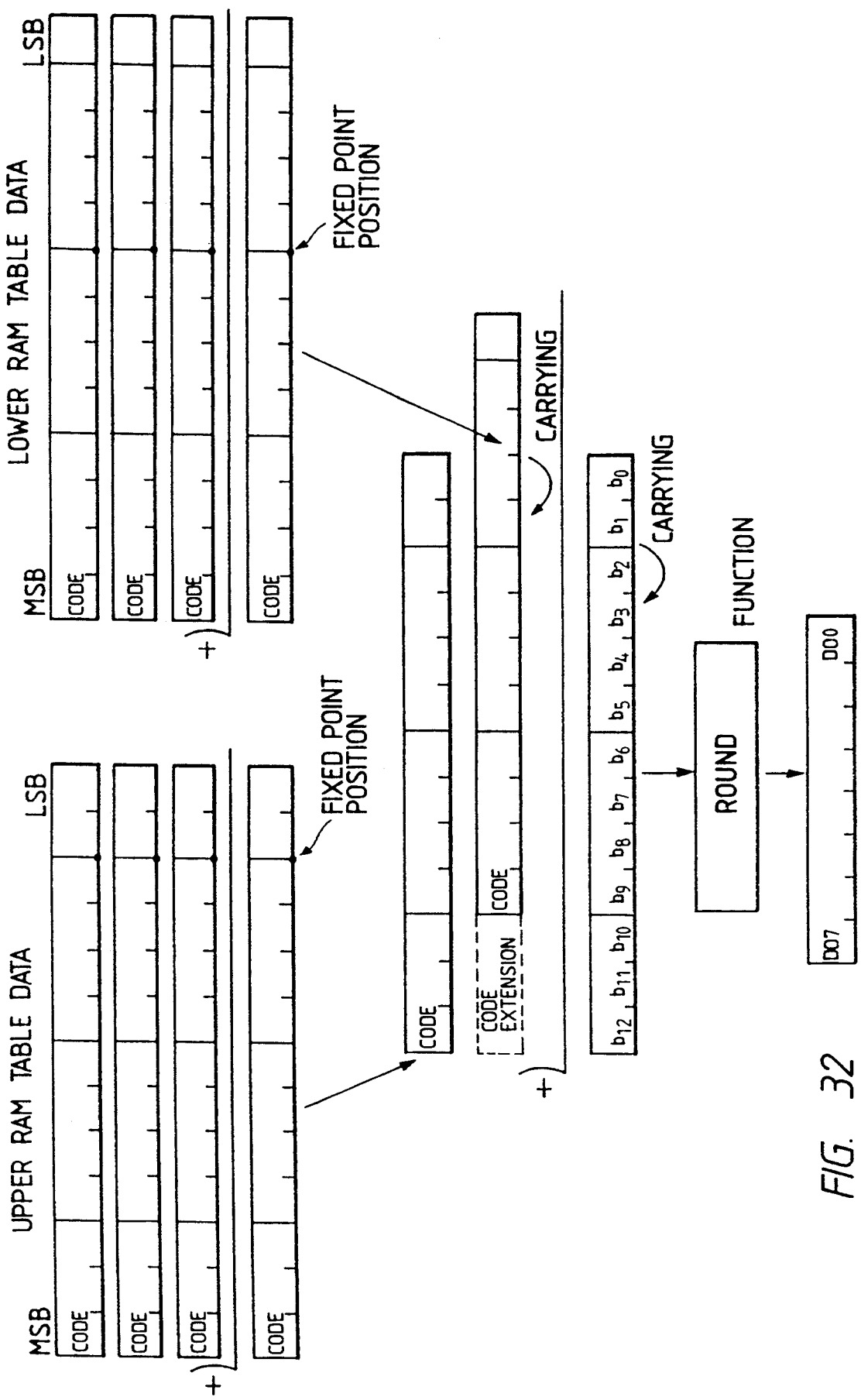
FIG. 32 is explanatory diagrams showing a method of expressing data in the internal operation.
Figure 33:
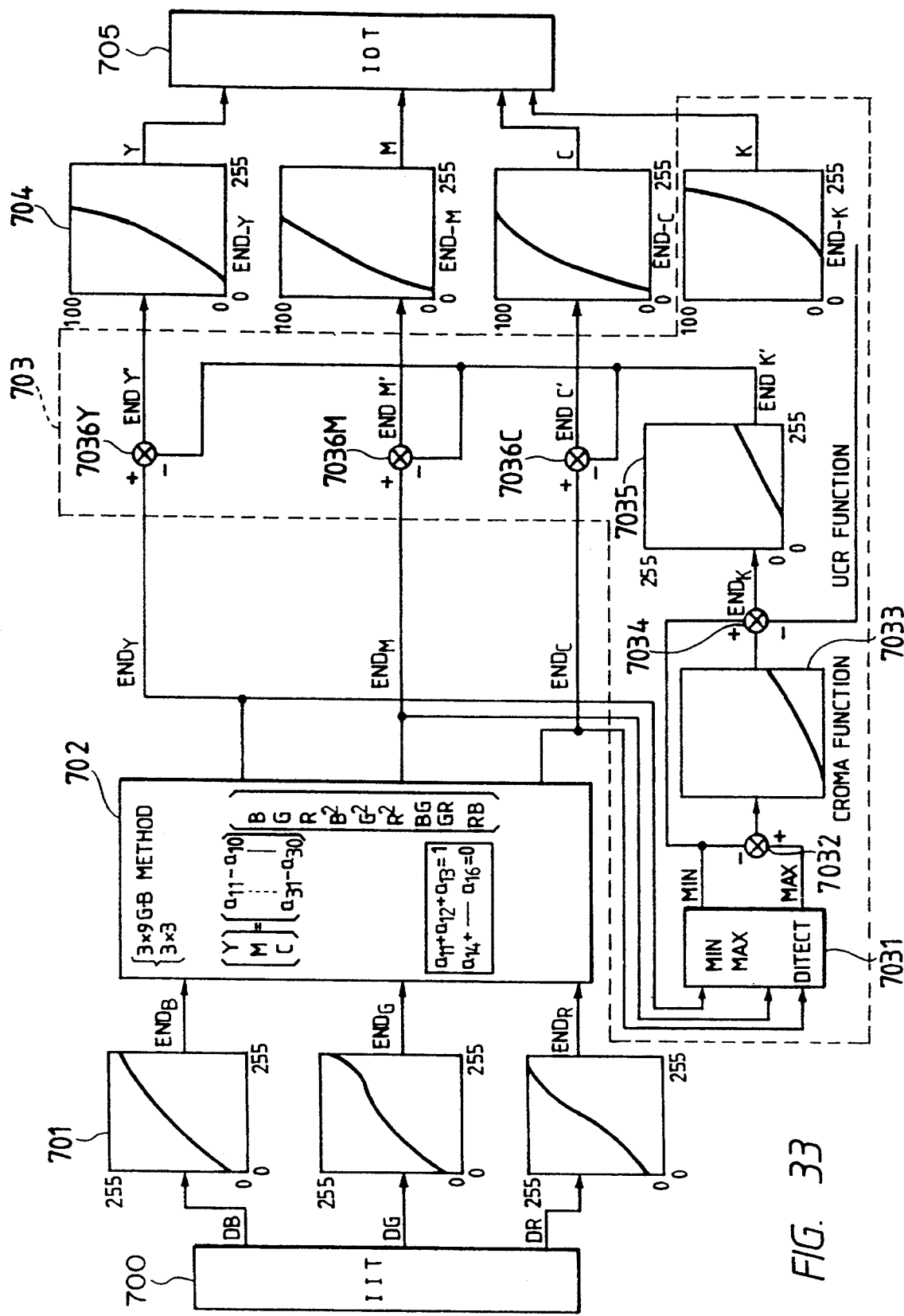
FIG. 33 shows in block form a gray balance and color correction system.

As shown in FIG. 32, the high-order RAM table data consisting of 2 bytes is formatted such that the lower 2 bits are located in decimal places, and the MSB consists of a sign bit. The low-order table data consisting of 2 bytes is formatted such that the lower 5 bits are located in decimal places, and the MSB consists of sign bits. Accordingly, the upper and the low-order data are shifted one from the other so as to position at the decimal point, and those items of data are added to carry.

When the sum is negative, it is rounded to zero. When it exceeds "FF", it is rounded to be "FF".

Such an arrangement of the table consisting of two blocks of bits, the upper 4 bits and the lower four bits, resulting in a small table size of 16. Therefore, the memory capacity can remarkably be reduced. Accordingly, the number of gates of the LSI is reduced, leading to reduction of size and cost of the LSI. For example, if the 8-bit data is used as intact, the required table size in 256. This needs a memory capacity much larger than the table arrangement consisting of two bits blocks. The above discussion is for only one color. Actually, however, three colors are used, and hence the memory capacity required is greatly increased. It is evident that in the case of the 3×3 matrix, a multiplication circuit system, not the multiplication LUT, may be used.

(E) Setting of Multiplication Table

In the circuit as mentioned above, the toner signals are generated by using only the addition calculation. Accordingly, the sum values outputted as the toner signals Y, M and C must satisfy the matrix, such as matrices given below.

For the 3×3 matrix,

| Y | = | a11 a12 a13 | B |
|---|---|---|---|
| M | | a21 a22 a23 | G |
| C | | a31 a32 a33 | R |

For the 3×6 matrix,

| Y | = | a11 ... a16 | B |
|---|---|---|---|
| M | | a21 ... a26 | G |
| C | | a31 ... a36 | R |
| | | | $B^2$ |
| | | | $G^2$ |
| | | | $R^2$ |

To this end, the multiplication results of the input data and the coefficients for the input data of the separated color signals B, G and R are prestored in the RAM tables 731B, 731G, 731R, 732B, 732G, and 732R. In this case, if the coefficients of the matrix are arbitrarily selected, the reproduced gray is not the original gray. To cope with this, the present invention employs a gray balance method (G. B. method), and the coefficients are selected as follows:

| a11 + a12 + a13 = 1 |
|---|
| a21 + a22 + a23 |
| a31 + a32 + a33 |
| a14 + a15 + a16 = 0 |
| a24 + a25 + a26 |
| a34 + a35 + a36 |

Thus, the coefficients are selected so that when the separated color signals B, G and R have equal values, the toner signals Y, M and C must also have equal values.

The square term in the 3×6 matrix, together with the first degree term, is stored in the conversion table. For example, a11B + a14B$^2$ is stored in the B conversion table. In this way, the conversion values can be obtained by only the addition operations. When a matrix of 3×9 or more is used, terms BG, GR, ... are contained. In this case, the coefficients are aijBG, ..., and hence the values of the conversion tables of B and G must be multiplied, but the following relations hold $$\{B^2+G^2-(B-G)^2\}/2 \text{ or}$$

$$\{(B^2+G)^2-(B^2-G^2)\}/2.$$

Therefore, the matrix operation is possible, without using multipliers, by using the above conversion tables, adders (subtractors) for the B and G, and conversion tables storing the sums (differences) by the adders. The combination of the adders and conversion tables provides a higher color masking operations than the arrangement using the multipliers.

The CPU is used for setting the conversion values in the RAM tables 731B, 731G, 731B, 732G, and 732R. The CPU contains the coefficients that are made to correspond to the upper four bits and the lower four bits. A total of nine types of coefficients are provided for the full color, B, G and R coefficients for each of the Y, M and C. For the mono color, three types of coefficients B, G and R are provided, these three coefficients being prepared for all the Y, M and C. The coefficient consists of 2 bytes, in order to secure the number of bits free from overflow. When the start key is operated and the copier starts its copying process, an operator selects the coefficients in accordance with the type of an original, photograph, character, print, or the combination of these, and mono color. Using the coefficients, the products are obtained and stored into the LUT conversion tables. The calculation using the storage area of 2 byte will inevitably be attendant with overflow. The storage are of 2 bytes+2 bytes, a total of 4 bytes, is used, enabling 0 to 15 times calculations. At the time of the setting of it, the discarding and the rounding of the least significant 1 byte are applied to the data values, and the processed data is written into the LUT.

The data write into the RAM tables 731B, 731G, 731R, 732B, 732G, and 732R are under control of a RAM table write clock WCK, a RAM table write mode select signal WMD, and RAM table write enable signal NWE. With a RAM table write address MA 8 to 0, RAM table write data is written into the tables.

It should be understood that the present invention is not limited to the above-mentioned embodiment, but may variously be changed and modified with the spirits and scope of the appended claims. In the embodiment as mentioned above, any of colors including neutral tints may be used for the color of a mono color image reproduced, and only one TRC is used. Alternatively, TRC curves may be provided for the different colors. The mixing ratios of 100:50 and 100:60 for the neutral tints may be replaced by mixing ratios best suitable for the neutral tints.

As seen from the foregoing description, in the present invention, the gradation property of the value information of an input original is linearly compressed so as to correspond to that of the color different from the white paper state to the mesh 100% state in the output section. This feature ensures the outputting of a good mono color image. Further, in the present invention, the low and high value portions are saturated for contrast adjustment. This feature provides a good overall contrast adjustment, with a high density portion being not thin and with a high light portion being not foggy. Additionally, the TRCs for the respective colors are averaged, and the resultant mean TRC is applied commonly for the respective primitive colors and their neutral tints. In other words, those primitive colors and the neutral tints can be produced by a single TRC. In addition, the mixing ratios are standardized. This feature enables many colors to be formed with less amount of mixing ratio data.

Furthermore, in the mono color by a designated color, a tone of a designated color is read, a mixing ratio is extracted, and the TRC is controlled. Therefore, a mono color image of a desired color can readily be obtained.

It will be apparent to those skilled in the art that various modifications and variations can be made in the color image outputting system of the present invention and in construction of this color image outputting system without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An image processing apparatus having a monochrome image producing system, comprising:
   an input section for receiving an input signal;
   means for converting said input signal into a first luminous signal;
   means for linearly compressing said first luminous signal and generating a second luminous signal;
   means for producing a recording signal based on said second luminous signal and a specified color signal; and
   output means for forming a monochrome image on a paper in accordance with the recording signal and the specified color signal.

2. An image processing apparatus having a monochrome image producing system, comprising:
   an input section for receiving an input signal;
   means for converting said input signal into a first luminous signal, said converting means including means for generating an equivalent neutral density signal from the input signal;
   means for linearly compressing said first luminous signal and generating a second luminous signal; and
   means for producing a recording signal based on said second luminous signal and a specified color signal.

3. An image processing apparatus having a monochrome image producing system, comprising:
   an input section for receiving an input signal;
   means for converting said input signal into a first luminous signal;
   means for linearly compressing said first luminous signal and generating a second luminous signal;
   means for producing a recording signal based on said second luminous signal and a specified color signal; and
   output means for forming a monochrome image on a paper in accordance with the recording signal and the specified color signal, the linearly compressing means matching a luminous range of the input section to a luminous range of the output means.

* * * * *